US012748503B2

(12) United States Patent
Goto et al.

(10) Patent No.: US 12,748,503 B2
(45) Date of Patent: Sep. 29, 2026

(54) POSITION DETECTION METHOD, POSITION DETECTOR, AND INTEGRATED CIRCUIT

(71) Applicant: Wacom Co., Ltd., Saitama (JP)

(72) Inventors: Fumitaka Goto, Saitama (JP); Hiroshi Mizuhashi, Saitama (JP); Takaya Oyama, Saitama (JP); Joo Hoon Lee, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/412,600

(22) Filed: Dec. 8, 2025

(65) Prior Publication Data

US 2026/0111079 A1 Apr. 23, 2026

Related U.S. Application Data

(63) Continuation of application No. PCT/JP2024/023263, filed on Jun. 24, 2024.

(Continued)

(30) Foreign Application Priority Data

Oct. 5, 2023 (JP) ................................ 2023-173294

(51) Int. Cl.

*G06F 3/0354* (2013.01)
*G06F 3/041* (2006.01)

(Continued)

(52) U.S. Cl.

CPC ........ *G06F 3/03545* (2013.01); *G06F 3/0416* (2013.01); *G06F 3/046* (2013.01); *G06F 3/0442* (2019.05)

(58) Field of Classification Search

CPC ........ G06F 3/044–0448; G06F 3/0416–04186; G06F 3/047

See application file for complete search history.

(56) References Cited

U.S. PATENT DOCUMENTS 5,748,110 A * 5/1998 Sekizawa ................ G06F 3/046 345/173
5,751,229 A * 5/1998 Funahashi ............... G06F 3/046 178/18.05

(Continued)

FOREIGN PATENT DOCUMENTS

JP H07295729 A 11/1995
JP 2000099259 A 4/2000

(Continued)

OTHER PUBLICATIONS

International Search Report, mailed Aug. 13, 2024, for International Application No. PCT/JP2024/023084. (4 pages).

(Continued)

*Primary Examiner* — Patrick F Marinelli
(74) *Attorney, Agent, or Firm* — Seed Intellectual Property Law Group LLP

(57) ABSTRACT

A position detecting method in a position detector is provided. The position detector includes a first sensor coil group and a second sensor coil group. The position detecting method includes a first step of the position detector generating an alternating magnetic field from the first sensor coil group; a second step of the position detector obtaining a level of a pen signal which a pen, having stored the alternating magnetic field, generates as a response alternating magnetic field, by using at least the second sensor coil group; and a third step of the position detector deriving information regarding a position of the pen by using a two-dimensional distribution of the level of the pen signal at each of points of intersection of the plurality of electrodes of the first sensor coil group and the plurality of electrodes of the second sensor coil group.

3 Claims, 39 Drawing Sheets

Related U.S. Application Data

(60) Provisional application No. 63/510,440, filed on Jun. 27, 2023.

(51) Int. Cl.

*G06F 3/044* (2006.01)
*G06F 3/046* (2006.01)

(56) References Cited

U.S. PATENT DOCUMENTS

| | | | | |
|---|---|---|---|---|
| 10,180,736 | B2 * | 1/2019 | Krumpelman | G06F 3/03545 |
| 10,331,235 | B2 * | 6/2019 | Fleck | G06F 3/0441 |
| 11,209,938 | B2 * | 12/2021 | Nomura | G06F 3/04162 |
| 11,604,521 | B2 * | 3/2023 | Maeyama | G06F 3/03545 |
| 11,816,292 | B2 * | 11/2023 | Nomura | G06F 3/044 |
| 11,841,999 | B2 * | 12/2023 | Maeyama | G06F 3/03545 |
| 12,026,326 | B2 * | 7/2024 | Maeyama | G06F 3/03545 |
| 12,216,846 | B2 * | 2/2025 | Maeyama | G06F 3/03545 |
| 12,236,054 | B1 * | 2/2025 | Lim | G06F 3/0446 |
| 12,265,668 | B2 * | 4/2025 | Maeyama | G06F 3/03545 |
| 12,314,516 | B2 * | 5/2025 | Nomura | G06F 3/038 |
| 12,524,087 | B2 * | 1/2026 | Maeyama | G06F 3/03545 |
| 2016/0098127 | A1 * | 4/2016 | Wilson | G06F 3/0442 345/174 |
| 2016/0147320 | A1 * | 5/2016 | Krumpelman | G06F 3/04166 345/179 |
| 2017/0024037 | A1 | 1/2017 | Ishizaki et al. | |
| 2018/0260061 | A1 | 9/2018 | Hirota | |
| 2020/0225773 | A1 | 7/2020 | Yamamoto et al. | |
| 2020/0333939 | A1 * | 10/2020 | Nomura | G06F 3/038 |
| 2021/0208709 | A1 | 7/2021 | Shin et al. | |
| 2021/0389833 | A1 * | 12/2021 | Maeyama | G06F 3/03545 |
| 2022/0091632 | A1 | 3/2022 | Hong et al. | |
| 2022/0107703 | A1 | 4/2022 | Lee et al. | |
| 2022/0113856 | A1 * | 4/2022 | Nomura | G06F 3/03545 |
| 2023/0071229 | A1 | 3/2023 | Lee et al. | |
| 2023/0146504 | A1 * | 5/2023 | Maeyama | G06F 3/03545 345/173 |
| 2024/0036681 | A1 * | 2/2024 | Nomura | G06F 3/044 |
| 2024/0053835 | A1 * | 2/2024 | Maeyama | G06F 3/03545 |
| 2024/0111372 | A1 * | 4/2024 | Maeyama | G06F 3/03545 |
| 2024/0310933 | A1 * | 9/2024 | Maeyama | G06F 3/03545 |
| 2025/0094011 | A1 * | 3/2025 | Mizuhashi | G06F 3/046 |
| 2025/0147603 | A1 * | 5/2025 | Maeyama | G06F 3/03545 |
| 2025/0199628 | A1 * | 6/2025 | Maeyama | G06F 3/03545 |
| 2025/0264946 | A1 | 8/2025 | Moon et al. | |
| 2025/0264965 | A1 * | 8/2025 | Nomura | G06F 3/038 |
| 2025/0355527 | A1 * | 11/2025 | Mizuhashi | G06F 3/0442 |
| 2025/0362770 | A1 * | 11/2025 | Mizuhashi | G06F 3/04164 |
| 2026/0086682 | A1 * | 3/2026 | Nomura | G06F 3/0442 |
| 2026/0093350 | A1 * | 4/2026 | Lee | G06F 3/0383 |

FOREIGN PATENT DOCUMENTS

| | | | |
|---|---|---|---|
| JP | 2002244806 | A | 8/2002 |
| JP | 2007157107 | A | 6/2007 |
| JP | 2012133704 | A | 7/2012 |
| JP | 2014035631 | A | 2/2014 |
| JP | 2018147348 | A | 9/2018 |
| JP | 2018185559 | A | 11/2018 |
| JP | 2019091291 | A | 6/2019 |
| JP | 2019121330 | A | 7/2019 |
| JP | 6612075 | B2 | 11/2019 |
| JP | 2021103459 | A | 7/2021 |
| JP | 2021157849 | A | 10/2021 |
| JP | 2021168204 | A | 10/2021 |
| JP | 2021193625 | A | 12/2021 |
| JP | 2022012385 | A | 1/2022 |
| KR | 1020140003067 | A | 1/2014 |
| KR | 1020220096768 | A | 7/2022 |
| KR | 1020230041449 | A | 3/2023 |
| WO | 2020202352 | A1 | 10/2020 |

OTHER PUBLICATIONS

Written Opinion of the International Searching Authority, mailed Aug. 13, 2024, for International Application No. PCT/JP2024/023084. (6 pages).

International Search Report, mailed Sep. 10, 2024, for corresponding International Application No. PCT/JP2024/023263. (5 pages)(with Translation).

International Search Report, mailed Sep. 17, 2024, for corresponding International Application No. PCT/JP2024/023181. (7 pages)(with Translation).

Notice of Reasons for Refusal, mailed Jan. 28, 2025, for corresponding Japanese Patent Application No. 2024-559116. (12 pages)(with Translation).

* cited by examiner

FIG. 2A

| | TX0 | TX1 | TX2 | TX3 | TX4 | TX5 | TX6 | TX7 | TX8 | TX9 | TX10 | TX11 | TX12 | TX13 |
|---|---|---|---|---|---|---|---|---|---|---|---|---|---|---|
| RX14 | 4.24 | 4.24 | 5 | 5 | -1.4 | -2.2 | -11 | -6.7 | -4.1 | 4.47 | 2.24 | 4.12 | 3.61 | -3.2 |
| RX13 | 13.6 | 12.2 | 12.2 | 10.4 | 9.22 | -7.8 | -11 | -8.1 | 9.9 | 15.2 | 14.4 | 13 | 13 | 9.22 |
| RX12 | 16.6 | 15.5 | 17.1 | 20.2 | 11 | -13 | -24 | -13 | 13.9 | 17.3 | 15.5 | 16.3 | 13.6 | 13.4 |
| RX11 | 7.81 | 10 | 9.43 | 9.43 | 5.39 | -15 | -31 | -16 | 3.61 | 8.94 | 7.81 | 7.07 | 9.22 | 3.61 |
| RX10 | 9.85 | 11.7 | 11.4 | 15.3 | 7.07 | -22 | -42 | -22 | 8.6 | 16.2 | 13 | 10.3 | 11.2 | 7.07 |
| RX9 | 9.85 | 10.4 | 13.3 | 13 | 8.06 | -16 | -33 | -16 | 11.2 | 15.1 | 12 | 11.4 | 8.25 | 12.1 |
| RX8 | -4.1 | -10 | -13 | -19 | -8.2 | 51 | [illegible] | 40.8 | -6.4 | -14 | -12 | -5.8 | -3 | -4.1 |
| RX7 | -24 | -37 | -51 | [illegible] | -28 | [illegible] | [illegible] | 51 | -20 | [illegible] | -39 | -32 | -19 | -13 |
| RX6 | -9.5 | -15 | -16 | -20 | -11 | 39.6 | [illegible] | 40.7 | -7.2 | -17 | -13 | -11 | -9.2 | -3.8 |
| RX5 | 15.6 | 17.2 | 17.8 | 16.1 | 12.7 | -4.5 | -14 | -7.8 | 14.9 | 15.6 | 15.6 | 16.3 | 17.8 | 15 |
| RX4 | 10.8 | 11.4 | 12 | 16.5 | 8.06 | -17 | -38 | -20 | 9.43 | 15.2 | 13.3 | 12.6 | 10.3 | 6.71 |
| RX3 | 9.06 | 10 | 10 | 14 | 9 | -16 | -32 | -15 | 9.22 | 13.2 | 13 | 12.4 | 8.25 | 8.54 |
| RX2 | 12.7 | 13 | 14.1 | 15.6 | 10 | -8.6 | -17 | -6.3 | 13 | 12.7 | 14.2 | 11.3 | 9.9 | 9.9 |
| RX1 | 3 | 3.61 | 3.16 | 3.61 | 3 | -8 | -17 | -9 | 3 | 1.41 | 2 | 2.24 | 4.12 | 5.66 |
| RX0 | 11.7 | 11.2 | 12.2 | 9.43 | 9.85 | 9.22 | -11 | 8.06 | 11.7 | 11.2 | 11.7 | 13.4 | 10.6 | 10.8 |

FIG. 2B

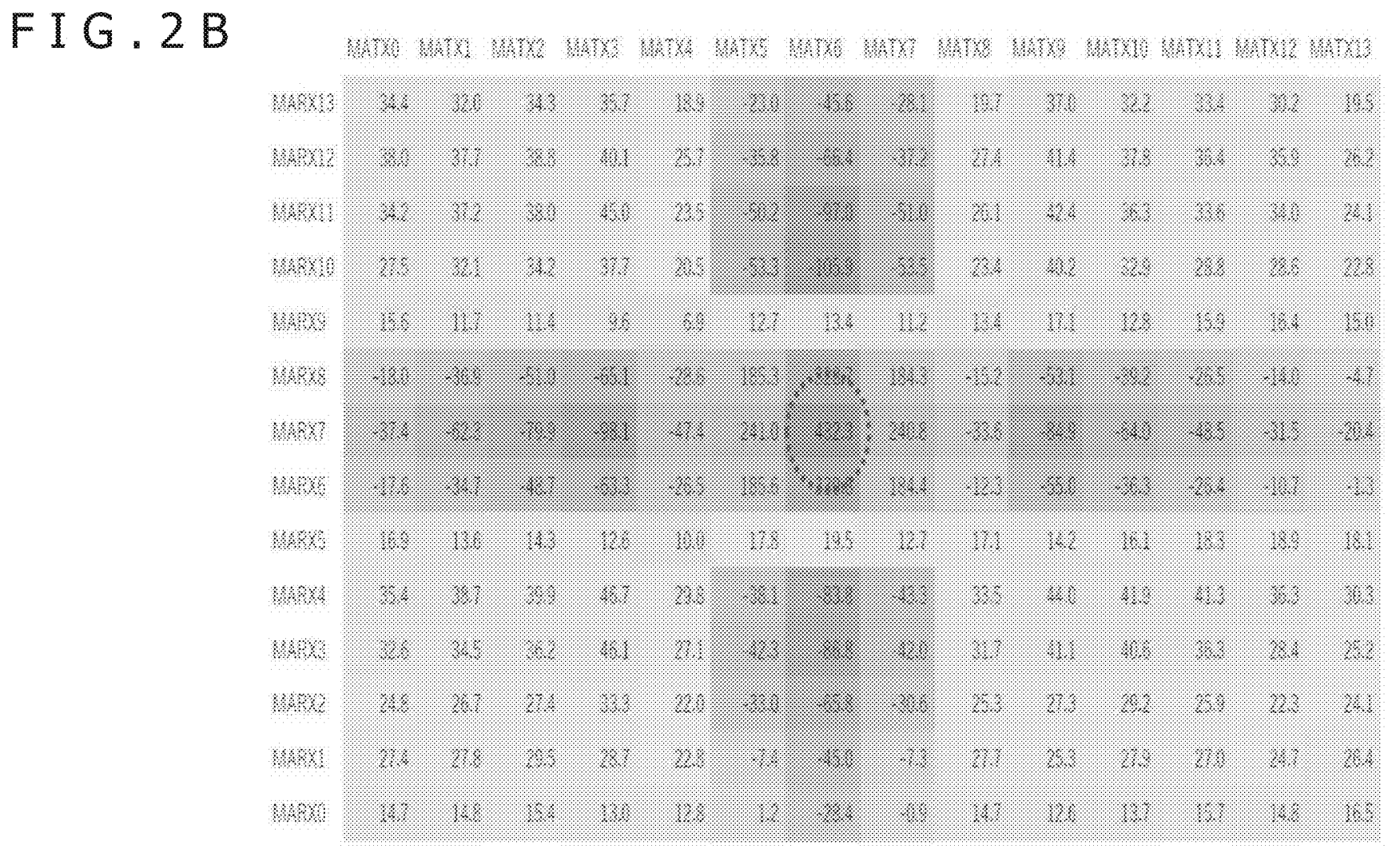

| | MATX0 | MATX1 | MATX2 | MATX3 | MATX4 | MATX5 | MATX6 | MATX7 | MATX8 | MATX9 | MATX10 | MATX11 | MATX12 | MATX13 |
|---|---|---|---|---|---|---|---|---|---|---|---|---|---|---|
| MARX13 | 34.4 | 32.6 | 34.3 | 35.7 | 18.9 | -23.0 | -45.6 | -28.1 | 19.7 | 37.0 | 32.2 | 33.4 | 30.2 | 19.5 |
| MARX12 | 38.0 | 37.7 | 38.8 | 40.1 | 25.7 | -35.8 | -66.4 | -37.2 | 27.4 | 41.4 | 37.8 | 36.4 | 35.9 | 26.2 |
| MARX11 | 34.2 | 37.2 | 38.0 | 45.0 | 23.5 | -50.2 | [illegible] | -51.0 | 26.1 | 42.4 | 36.3 | 33.6 | 34.0 | 24.1 |
| MARX10 | 27.5 | 32.1 | 34.2 | 37.7 | 20.5 | -53.3 | [illegible] | -52.5 | 23.4 | 40.2 | 32.9 | 28.8 | 28.6 | 22.8 |
| MARX9 | 15.6 | 11.7 | 11.4 | 9.6 | 6.9 | 12.7 | 13.4 | 11.2 | 13.4 | 17.1 | 12.8 | 15.9 | 18.4 | 15.0 |
| MARX8 | -18.0 | -36.8 | -53.3 | -65.1 | -22.6 | 185.3 | [illegible] | 194.3 | -15.2 | -53.1 | -39.2 | -26.5 | -14.0 | -4.7 |
| MARX7 | -37.4 | -82.2 | -79.9 | -98.1 | -47.4 | 241.0 | [illegible] | 240.8 | -33.8 | -84.8 | -64.0 | -48.5 | -31.5 | -20.4 |
| MARX6 | -17.6 | -34.7 | -48.7 | -63.3 | -26.5 | 185.6 | [illegible] | 184.4 | -12.3 | -55.6 | -36.3 | -26.4 | -10.7 | -1.3 |
| MARX5 | 16.9 | 13.6 | 14.3 | 12.6 | 10.0 | 17.8 | 19.5 | 12.7 | 17.1 | 14.2 | 16.1 | 18.3 | 18.9 | 18.1 |
| MARX4 | 35.4 | 38.7 | 39.9 | 46.7 | 29.8 | -38.1 | [illegible] | -43.3 | 33.5 | 44.0 | 41.9 | 41.3 | 36.3 | 30.3 |
| MARX3 | 32.6 | 34.5 | 36.2 | 46.1 | 27.1 | -42.3 | [illegible] | -42.0 | 31.7 | 41.1 | 40.6 | 38.3 | 28.4 | 25.2 |
| MARX2 | 24.8 | 26.7 | 27.4 | 33.3 | 22.0 | -33.0 | [illegible] | -30.6 | 25.3 | 27.3 | 29.2 | 25.9 | 22.3 | 24.1 |
| MARX1 | 27.4 | 27.8 | 29.5 | 28.7 | 22.8 | -7.4 | -45.0 | -7.3 | 27.7 | 25.3 | 27.9 | 27.0 | 24.7 | 26.4 |
| MARX0 | 14.7 | 14.8 | 15.4 | 13.0 | 12.8 | 1.2 | -28.4 | -0.9 | 14.7 | 12.6 | 13.7 | 15.7 | 14.8 | 16.5 |

FIG.3A

| | TX0 | TX1 | TX2 | TX3 | TX4 | TX5 | TX6 | TX7 | TX8 | TX9 | TX10 | TX11 | TX12 | TX13 |
|---|---|---|---|---|---|---|---|---|---|---|---|---|---|---|
| RX14 | 3.61 | 3 | 2.24 | 6.08 | 3.16 | -2.8 | -12 | -5.1 | -3.6 | 3.61 | 3 | 2 | 3.61 | 1 |
| RX13 | 7.62 | 7.07 | 9.43 | 9.43 | 10.8 | -6.4 | -19 | -5 | 6.6 | 6.4 | 6.4 | 8.06 | 7.07 | 6.4 |
| RX12 | 8.06 | 11 | 11.2 | 14 | 13 | -17 | -34 | -15 | 15.1 | 15.3 | 10 | 9.22 | 8.25 | 6 |
| RX11 | 5 | 10.2 | 12.4 | 19.2 | 13.4 | -38 | -63 | -27 | 11 | 16.8 | 9.06 | 7.62 | -5.1 | 5.39 |
| RX10 | 11.4 | 16.1 | 22 | 31.1 | 25.9 | -52 | -108 | -43 | 26.2 | 30.4 | 14.9 | 13.5 | 10.6 | 7.81 |
| RX9 | 10 | 13 | 17 | 27.1 | 23.1 | -46 | -87 | -40 | 23.3 | 26.2 | 17.3 | 14 | 10.4 | 4 |
| RX8 | -12 | -22 | -34 | -48 | -41 | 99.2 | 193 | 58.6 | -41 | -44 | -31 | -20 | -14 | 7.28 |
| RX7 | -19 | -29 | -47 | -64 | -52 | 136 | [illegible] | 120 | -52 | -58 | -38 | -29 | -17 | -6.4 |
| RX6 | 2 | -4 | -5.1 | -5.4 | -6.1 | 11.4 | 22.8 | 11 | -5 | -5 | -3 | -1.4 | 2 | -3.6 |
| RX5 | 7.62 | 9.49 | 7.21 | 11.7 | 8.94 | -3 | -17 | -5.1 | 7.21 | 8.54 | 4.47 | 5.66 | 2.24 | 7.81 |
| RX4 | 6.71 | 3.61 | 3.61 | 7.21 | 5.83 | -9.2 | -21 | -7.6 | 7.21 | 5.66 | 5.83 | 5 | 4.12 | 2.24 |
| RX3 | 3.16 | 5 | 6.32 | 6.08 | 9.06 | -6.3 | -12 | -6.3 | 5.39 | 7.07 | 7.28 | 3 | 7.07 | 5 |
| RX2 | 3.61 | 5.66 | 7.21 | 7.62 | 5.39 | 4.24 | -10 | -2.2 | 5.39 | 6.4 | 5.39 | 5 | 4 | 6.71 |
| RX1 | 3.16 | 6.32 | 5 | 4.47 | 2.83 | -3.6 | -11 | -4 | 5 | 2.24 | 2.24 | -1 | -4.1 | 1.41 |
| RX0 | 5.1 | 5 | 5.39 | 5.1 | 3.16 | -1 | -3.2 | -1 | 4.12 | 3 | 7.07 | 4 | 5 | 4 |

FIG. 3B

| | MATX0 | MATX1 | MATX2 | MATX3 | MATX4 | MATX5 | MATX6 | MATX7 | MATX8 | MATX9 | MATX10 | MATX11 | MATX12 | MATX13 |
|---|---|---|---|---|---|---|---|---|---|---|---|---|---|---|
| MARX13 | 19.3 | 21.1 | 22.9 | 29.6 | 26.8 | -25.8 | -64.4 | -25.0 | 20.1 | 25.3 | 19.5 | 19.3 | 18.9 | 13.4 |
| MARX12 | 20.7 | 28.3 | 33.0 | 42.7 | 37.1 | -53.0 | -116.1 | -46.8 | 34.8 | 38.5 | 25.5 | 24.9 | 10.2 | 17.8 |
| MARX11 | 24.5 | 37.3 | 45.6 | 64.3 | 52.4 | -90.0 | -205.1 | -65.2 | 52.4 | 62.5 | 34.0 | 30.3 | 13.8 | 19.2 |
| MARX10 | 26.5 | 38.4 | 51.4 | 77.4 | 62.4 | -128.5 | [illegible] | -110.4 | 80.6 | 73.3 | 41.2 | 35.1 | 16.0 | 17.2 |
| MARX9 | 9.1 | 7.2 | 5.0 | 9.8 | 7.7 | 1.0 | -1.9 | 3.2 | 8.7 | 12.2 | 1.1 | 7.4 | 6.8 | 19.1 |
| MARX8 | -20.9 | -38.3 | -64.2 | -85.4 | -70.6 | 189.9 | 371.2 | 166.4 | -69.1 | -76.9 | -52.0 | -35.0 | -20.9 | 4.9 |
| MARX7 | -29.0 | -55.3 | -86.3 | -117.8 | -93.7 | 247.4 | [illegible] | 217.5 | -97.4 | -108.1 | -72.2 | -50.4 | -29.3 | -2.7 |
| MARX6 | -9.0 | -24.0 | -45.1 | -57.8 | -49.5 | 144.9 | 270.6 | 125.8 | -49.4 | -55.2 | -36.7 | -24.8 | -12.8 | -2.2 |
| MARX5 | 16.3 | 9.0 | 5.7 | 13.5 | 8.7 | -0.8 | -14.8 | -1.7 | 9.4 | 9.2 | 7.3 | 9.2 | 8.4 | 6.4 |
| MARX4 | 17.5 | 18.0 | 17.1 | 25.0 | 23.8 | -18.5 | -49.8 | -19.0 | 19.8 | 21.3 | 17.6 | 13.7 | 13.4 | 15.0 |
| MARX3 | 13.5 | 14.3 | 17.1 | 20.9 | 20.3 | -11.3 | -43.1 | -16.2 | 18.0 | 19.1 | 18.5 | 13.0 | 15.2 | 13.9 |
| MARX2 | 9.9 | 17.0 | 18.5 | 18.2 | 17.3 | -5.7 | -32.8 | -12.6 | 15.8 | 15.7 | 14.9 | 7.0 | 6.9 | 13.1 |
| MARX1 | 11.9 | 17.0 | 17.6 | 17.2 | 11.4 | -0.4 | -24.8 | -7.2 | 14.5 | 11.6 | 14.7 | 8.0 | 4.9 | 12.1 |
| MARX0 | 8.3 | 11.3 | 10.4 | 9.6 | 6.0 | -4.6 | -14.3 | -5.0 | 9.1 | 5.2 | 9.3 | 3.0 | 0.9 | 5.4 |

FIG. 4A

| | TX0 | TX1 | TX2 | TX3 | TX4 | TX5 | TX6 | TX7 | TX8 | TX9 | TX10 | TX11 | TX12 | TX13 |
|---|---|---|---|---|---|---|---|---|---|---|---|---|---|---|
| RX14 | 1 | 2 | -2.2 | 5.83 | 4.12 | -2 | -7.2 | -5.8 | -3.6 | 8.06 | 6.32 | 5 | -2.2 | -2.2 |
| RX13 | 10 | 10.6 | 12.7 | 11.3 | 10.8 | 7.62 | -9.2 | -8.2 | 12.8 | 20 | 15 | 11.7 | 10 | 12 |
| RX12 | 11.4 | 16.2 | 15.3 | 12.6 | 13.6 | 5.39 | -18 | -14 | 16.2 | 26.3 | 21.6 | 19 | 14.9 | 13 |
| RX11 | 4.47 | 6.4 | 3.16 | 10 | 7.62 | -5.4 | -27 | -23 | 10 | 20.6 | 17.2 | 11.7 | 2.83 | 6.32 |
| RX10 | 7.07 | 9.85 | 9.49 | 10.8 | 9.49 | -12 | -51 | -44 | 14.2 | 34 | 25.9 | 16.6 | 11.4 | 9.22 |
| RX9 | 9.22 | 12.6 | 13.2 | 13 | 11.2 | -16 | -62 | -48 | 18.4 | 40 | 28.2 | 21.2 | 14.3 | 13 |
| RX8 | 3.16 | 2.83 | -1 | 2 | -2.8 | 17 | 48.4 | 41.4 | -4.5 | -19 | -11 | -5.4 | -2.8 | 2.24 |
| RX7 | -14 | -27 | -34 | -41 | -30 | 12 | [illegible] | [illegible] | -70 | [illegible] | [illegible] | 76 | [illegible] | [illegible] |
| RX6 | -4.5 | -7.8 | -6.7 | -8.5 | -5.4 | 16 | 52.2 | 45.6 | -10 | -26 | -20 | -14 | -6.4 | -2.8 |
| RX5 | 17.2 | 18.4 | 16.4 | 20.6 | 17 | 4.12 | -41 | -37 | 21.6 | 42.6 | 31.9 | 26.9 | 16.4 | 15.6 |
| RX4 | 7.21 | 10.8 | 8.54 | 10.2 | 9.49 | -10 | -50 | -42 | 15 | 34.4 | 25.1 | 17.9 | 9.43 | 10.8 |
| RX3 | 9.43 | 8.94 | 11.2 | 10.2 | 8 | -7.1 | -32 | -28 | 13.6 | 26.1 | 21.1 | 15.3 | 11.7 | 8.54 |
| RX2 | 12.2 | 12 | 13.5 | 13.5 | 12 | 0 | -15 | -14 | 16.4 | 22.2 | 18.4 | 14.8 | 12.5 | 12 |
| RX1 | 4.24 | 2.83 | 6.32 | 5 | 6.4 | -7.2 | -14 | -12 | 6.4 | 8.94 | 5.83 | 5.39 | -8.1 | 3 |
| RX0 | 11.4 | 14.8 | 13.4 | 11.2 | 12.5 | 10 | -9.2 | -8.5 | 12.2 | 13.9 | 13.9 | 10.3 | 10.3 | 11.4 |

FIG. 4B

| | MATX0 | MATX1 | MATX2 | MATX3 | MATX4 | MATX5 | MATX6 | MATX7 | MATX8 | MATX9 | MATX10 | MATX11 | MATX12 | MATX13 |
|---|---|---|---|---|---|---|---|---|---|---|---|---|---|---|
| MARX13 | 22.4 | 28.8 | 25.8 | 29.8 | 28.5 | 11.0 | -34.8 | -28.3 | 25.4 | 54.4 | 42.9 | 35.6 | 22.6 | 22.8 |
| MARX12 | 25.9 | 33.2 | 31.2 | 34.0 | 32.0 | 7.6 | -54.5 | -45.1 | 39.0 | 66.9 | 53.8 | 42.3 | 27.7 | 31.4 |
| MARX11 | 22.9 | 32.4 | 27.9 | 33.4 | 30.7 | -12.2 | -96.3 | -81.2 | 40.4 | 80.9 | 64.7 | 47.3 | 29.1 | 28.5 |
| MARX10 | 20.8 | 28.9 | 25.8 | 33.8 | 28.3 | -34.0 | -139.0 | -115.3 | 42.7 | 94.7 | 71.3 | 48.5 | 28.5 | 28.5 |
| MARX9 | 19.5 | 25.3 | 21.6 | 25.8 | 17.8 | -11.6 | -64.8 | -51.3 | 28.2 | 54.8 | 42.9 | 32.5 | 22.9 | 24.5 |
| MARX8 | -1.8 | -11.7 | -22.1 | -26.4 | -21.7 | 125.1 | -403.2 | -334.7 | -56.1 | -177.1 | -116.5 | -59.9 | -27.1 | 0.2 |
| MARX7 | -15.5 | -32.1 | -41.9 | -47.9 | -38.3 | 181.6 | -507.4 | -428.7 | -85.1 | -244.8 | -164.8 | -94.7 | -47.8 | -15.6 |
| MARX6 | -1.4 | -16.5 | -24.5 | -29.3 | -18.5 | 148.7 | -418.0 | -349.5 | -59.0 | -181.6 | -121.7 | -82.4 | -28.6 | -2.2 |
| MARX5 | 19.9 | 21.4 | 18.2 | 22.3 | 21.1 | 9.7 | -38.9 | -33.5 | 26.2 | 50.8 | 36.8 | 31.2 | 19.4 | 23.6 |
| MARX4 | 33.8 | 38.2 | 36.1 | 41.0 | 34.5 | -13.4 | -122.7 | -106.9 | 50.2 | 103.2 | 78.1 | 60.1 | 37.5 | 35.0 |
| MARX3 | 28.9 | 31.8 | 33.2 | 33.8 | 29.5 | -17.5 | -96.5 | -83.1 | 45.0 | 82.7 | 64.6 | 48.0 | 33.7 | 31.4 |
| MARX2 | 25.9 | 23.8 | 31.0 | 28.7 | 26.4 | -14.3 | -60.4 | -53.6 | 36.4 | 57.2 | 45.3 | 35.4 | 19.1 | 23.6 |
| MARX1 | 27.9 | 29.6 | 33.2 | 29.6 | 31.0 | 2.8 | -38.0 | -34.3 | 35.0 | 45.0 | 38.1 | 30.4 | 17.7 | 26.4 |
| MARX0 | 15.6 | 17.8 | 19.7 | 19.2 | 18.9 | 2.8 | -23.1 | -20.7 | 18.6 | 22.8 | 19.8 | 15.7 | 5.2 | 14.4 |

FIG. 5A

| | TX0 | TX1 | TX2 | TX3 | TX4 | TX5 | TX6 | TX7 | TX8 | TX9 | TX10 | TX11 | TX12 | TX13 |
|---|---|---|---|---|---|---|---|---|---|---|---|---|---|---|
| RX14 | 2.83 | 3.61 | -3.2 | -2.2 | -4.2 | 4.12 | 8.06 | 9.06 | 3 | -5 | 5.39 | 4.12 | 1 | 1 |
| RX13 | 8.54 | 8.94 | 8.54 | 9.43 | 8.6 | 7.81 | 15.1 | 8.54 | 11.4 | 14.9 | 10 | 12 | 6.71 | 9.43 |
| RX12 | 11 | 13.2 | 14.1 | 13 | 14.1 | 5.1 | -21 | -14 | 16.5 | 24.7 | 19.3 | 13.3 | 12 | 12 |
| RX11 | 4.47 | 4.47 | 5.83 | 9.06 | 5 | 15.5 | 45.2 | 31.1 | 13 | 22 | [illegible] | 10.2 | 5.1 | 2.24 |
| RX10 | 10.6 | 12 | 11.4 | 14.4 | 13.5 | -27 | -83 | -57 | 25.5 | 43.4 | 27.7 | 18 | 13 | 7.81 |
| RX9 | 13.3 | 16.5 | 16.5 | 16.5 | 17.1 | -26 | -89 | -61 | 30 | [illegible] | 32.2 | 23.8 | 14.8 | 11.7 |
| RX8 | 6.32 | 9.06 | 11.4 | -14 | -9.5 | -43 | [illegible] | -83 | [illegible] | 50.4 | 34 | 17.7 | 10 | 7.07 |
| RX7 | -15 | -23 | -31 | -38 | -25 | 114 | [illegible] | [illegible] | -83 | [illegible] | -87 | -50 | -28 | -14 |
| RX6 | -1 | 1.41 | -1.4 | -5.4 | -1.4 | 12 | 31.9 | 21 | -6.3 | -11 | -7.6 | -6.1 | -3.2 | 2 |
| RX5 | 11.4 | 10 | 11.7 | 7.21 | 8.94 | 12.7 | 24.4 | 15.7 | 13.9 | 15.3 | 13 | 13.6 | 8.6 | 8.49 |
| RX4 | 5.39 | 6.4 | 7.81 | 5.39 | 8.6 | -7.6 | -25 | -18 | 12 | 15.6 | 14.2 | 7.81 | 6.4 | 8.06 |
| RX3 | 10.4 | 8.25 | 7.62 | 7 | 9.06 | -3.2 | -15 | -8.6 | 11.7 | 15.2 | 11.2 | 8.25 | 11 | 9.49 |
| RX2 | 6.4 | 5.66 | 8.06 | 6.4 | 8.06 | 8.54 | 15.3 | 11.2 | 8.49 | 11.7 | 8.49 | 7.81 | 9.9 | 5 |
| RX1 | 1.41 | 3 | 3.61 | 2.83 | 3.61 | -3.6 | -9.4 | -7.1 | 4.47 | 7 | 4.47 | 2 | 4 | -5.4 |
| RX0 | 12.1 | 9.06 | 9.06 | 9.22 | 9.22 | 4 | -2 | 4.24 | 8.94 | 13 | 10.2 | 10.4 | 7.28 | 8.25 |

F I G . 5 B

| | MATX0 | MATX1 | MATX2 | MATX3 | MATX4 | MATX5 | MATX6 | MATX7 | MATX8 | MATX9 | MATX10 | MATX11 | MATX12 | MATX13 |
|---|---|---|---|---|---|---|---|---|---|---|---|---|---|---|
| MARX13 | 22.4 | 25.7 | 19.5 | 20.2 | 18.5 | 17.0 | 2.6 | 3.2 | 30.9 | 34.6 | 34.7 | 29.5 | 19.7 | 22.5 |
| MARX12 | 24.1 | 26.6 | 28.5 | 31.5 | 27.7 | 28.4 | 39.7 | 25.2 | 40.9 | 18.0 | 43.3 | 35.6 | 23.8 | 23.7 |
| MARX11 | 26.1 | 29.7 | 31.4 | 36.5 | 32.6 | -6.6 | -58.6 | -40.6 | 55.0 | 46.5 | -92.0 | -42.6 | 30.2 | 22.1 |
| MARX10 | 26.4 | 33.0 | 33.7 | 40.0 | 35.6 | -37.3 | -126.9 | -87.5 | 68.5 | -71.0 | 73.9 | 52.0 | 32.9 | 21.8 |
| MARX9 | 30.3 | 37.6 | 39.3 | 16.8 | 21.1 | -96.2 | [illegible] | -201.5 | 44.6 | 141.0 | -93.9 | 59.5 | 37.8 | 26.6 |
| MARX8 | 4.4 | 2.2 | -2.9 | -35.3 | -17.4 | 44.6 | 119.0 | 98.9 | -23.7 | -40.1 | -20.8 | -8.8 | -2.9 | 4.8 |
| MARX7 | -9.9 | -12.9 | -20.8 | -57.2 | -35.9 | 82.2 | 239.7 | 169.2 | -161.1 | -160.1 | -60.6 | -38.7 | -20.8 | -4.9 |
| MARX6 | -4.9 | -11.9 | -20.6 | -35.8 | -17.5 | 138.4 | [illegible] | [illegible] | -75.3 | -135.1 | -81.5 | -42.8 | -22.2 | -3.5 |
| MARX5 | 15.8 | 17.8 | 18.1 | 7.2 | 16.1 | 17.2 | 30.8 | 18.3 | 19.6 | 20.1 | 19.6 | 15.3 | 11.8 | 18.5 |
| MARX4 | 27.2 | 24.6 | 27.1 | 19.6 | 26.6 | 1.9 | -16.1 | -11.3 | 37.6 | 46.1 | 38.4 | 29.7 | 26.1 | 26.0 |
| MARX3 | 22.2 | 20.3 | 23.5 | 18.8 | 25.7 | -2.2 | -25.2 | -15.8 | 32.2 | 42.6 | 33.9 | 23.9 | 27.3 | 22.5 |
| MARX2 | 18.3 | 16.9 | 19.3 | 16.2 | 20.7 | 1.8 | -9.2 | -4.5 | 24.7 | 33.9 | 24.1 | 18.1 | 24.9 | 9.1 |
| MARX1 | 19.9 | 17.7 | 20.7 | 18.5 | 20.9 | 8.9 | 3.8 | 6.4 | 21.9 | 31.7 | 23.2 | 20.3 | 21.2 | 7.9 |
| MARX0 | 13.5 | 12.1 | 12.7 | 12.0 | 12.8 | 0.4 | -11.4 | -2.8 | 13.4 | 20.0 | 14.7 | 12.4 | 11.3 | 2.9 |

FIG. 6A

| | TX0 | TX1 | TX2 | TX3 | TX4 | TX5 | TX6 | TX7 | TX8 | TX9 | TX10 | TX11 | TX12 | TX13 |
|---|---|---|---|---|---|---|---|---|---|---|---|---|---|---|
| RX14 | -2.8 | 2 | -2 | -1 | 2.24 | -3 | -9.2 | -5.8 | 3 | -4.2 | 4.47 | 0 | -3 | 2 |
| RX13 | 7.62 | 9.43 | 8.25 | 10.3 | 11.7 | 5 | -4.1 | 4.24 | 10 | 10.8 | 9.9 | 7.81 | 8.06 | 6.71 |
| RX12 | 11 | 10 | 12 | 13.6 | 8.54 | 5 | -7.3 | -4 | 13 | 17.1 | 13.2 | 11 | 13.2 | 12.2 |
| RX11 | 3.61 | 3.61 | 1 | 2.24 | 6 | 6.08 | -19 | -13 | 7.28 | 5.39 | 6.71 | 5.39 | -3.2 | 3 |
| RX10 | 4.24 | 5.83 | 6.32 | 7.21 | 6.4 | -5.1 | -23 | -14 | 12 | 17 | 11.7 | 7.21 | 5 | 3.16 |
| RX9 | 8 | 8.06 | 10.2 | 9.06 | 8.06 | -4.1 | -16 | -9.5 | 11.2 | 16.5 | 10.4 | 11.2 | 9.22 | 6.08 |
| RX8 | 2.83 | 3.16 | 1.41 | 4.47 | 2.24 | 6.32 | 15 | 11.2 | 2 | 7.28 | 5.39 | 3.16 | 2.24 | 2.24 |
| RX7 | -9.2 | -16 | -23 | -29 | -18 | 97.3 | 259 | 176 | -69 | -104 | -63 | -36 | -19 | 10 |
| RX6 | -9.2 | -14 | -15 | -22 | -15 | 55.9 | 156 | 103 | -43 | -64 | -39 | -24 | -16 | -6.3 |
| RX5 | 12 | 14.9 | 14.9 | 14.2 | 17 | 22.4 | -76 | -49 | 26.9 | 38.8 | 28.6 | 17 | 14.9 | 13.4 |
| RX4 | 10 | 11.7 | 14.1 | 17 | 10.8 | -25 | -79 | -52 | 25.5 | 44.1 | 27 | 17 | 12 | 8.6 |
| RX3 | 11 | 9 | 12.2 | 13 | 10.2 | -13 | -43 | -27 | 19.7 | 30.1 | 20.2 | 13 | 10.3 | 10.2 |
| RX2 | 8.6 | 9.43 | 10 | 10.6 | 8.94 | 8.49 | 26.2 | 18.1 | 12.5 | 18.4 | 13.4 | 8.6 | 10.8 | 8.6 |
| RX1 | 4 | 1 | -4.1 | 3 | 3.61 | -7.6 | -17 | -9.2 | 5.83 | 9.85 | 4.47 | -4.1 | 3 | 3 |
| RX0 | 10 | 7.28 | 9.22 | 7.28 | 7 | 4.12 | -4.5 | 3.16 | 11.7 | 10.4 | 11.4 | 12.6 | 9.85 | 10.8 |

F I G . 6 B

| | MATX0 | MATX1 | MATX2 | MATX3 | MATX4 | MATX5 | MATX6 | MATX7 | MATX8 | MATX9 | MATX10 | MATX11 | MATX12 | MATX13 |
|---|---|---|---|---|---|---|---|---|---|---|---|---|---|---|
| MARX13 | 15.8 | 21.4 | 18.3 | 22.9 | 22.5 | 7.0 | -20.6 | -5.6 | 26.0 | 23.7 | 27.5 | 18.8 | 18.2 | 20.9 |
| MARX12 | 22.2 | 23.0 | 21.3 | 26.1 | 26.2 | 16.1 | -30.4 | -12.8 | 30.3 | 33.3 | 29.8 | 24.2 | 18.1 | 21.9 |
| MARX11 | 18.8 | 19.4 | 19.4 | 23.0 | 20.9 | 6.0 | -49.3 | -31.5 | 32.4 | 39.5 | 31.5 | 23.6 | 15.0 | 18.3 |
| MARX10 | 15.8 | 17.5 | 17.5 | 18.5 | 20.5 | -3.1 | -58.5 | -36.9 | 30.5 | 38.9 | 28.8 | 23.8 | 11.1 | 12.2 |
| MARX9 | 15.1 | 17.1 | 17.9 | 20.7 | 16.7 | -2.9 | -24.5 | -12.7 | 25.2 | 40.8 | 27.5 | 21.6 | 16.5 | 11.5 |
| MARX8 | 1.6 | -4.4 | -11.1 | -15.5 | -7.7 | 99.4 | 257.7 | 178.3 | -55.3 | -80.0 | -47.1 | -21.9 | -7.5 | 18.4 |
| MARX7 | -15.6 | -26.5 | -36.3 | -46.6 | -30.9 | 159.5 | [illegible] | [illegible] | -109.0 | -160.5 | -96.5 | -57.4 | -32.9 | 6.0 |
| MARX6 | -6.4 | -14.8 | -22.8 | -36.9 | -16.1 | 175.5 | [illegible] | 223.7 | -94.1 | 129.0 | -73.2 | -43.6 | -20.3 | 17.1 |
| MARX5 | 12.6 | 12.5 | 14.0 | 9.2 | 12.7 | 53.1 | 0.5 | -5.1 | 9.8 | -65.9 | 16.8 | 9.7 | 10.8 | 15.7 |
| MARX4 | 33.0 | 35.5 | 41.2 | 44.3 | 38.8 | -15.9 | -196.5 | -124.6 | 72.4 | 110.0 | -75.9 | 47.0 | 37.2 | 32.2 |
| MARX3 | 29.6 | 30.1 | 36.3 | 40.7 | 30.0 | -29.8 | -96.3 | -60.5 | 57.7 | 59.6 | 60.7 | 38.6 | 33.2 | 27.4 |
| MARX2 | 23.6 | 19.4 | 18.0 | 26.7 | 22.7 | -12.2 | -34.3 | -17.7 | 38.1 | 58.3 | 38.8 | 17.5 | 24.1 | 21.8 |
| MARX1 | 22.7 | 17.7 | 15.1 | 20.9 | 19.5 | 5.0 | 4.7 | 12.1 | 30.1 | 38.7 | 23.3 | 17.1 | 23.7 | 22.4 |
| MARX0 | 14.0 | 8.3 | 5.1 | 10.3 | 10.6 | -3.5 | -21.4 | -6.1 | 17.5 | 20.3 | 15.9 | 8.5 | 12.8 | 13.8 |

| | R0 | R1 | R2 | R3 | R4 |
|---|---|---|---|---|---|
| T0 | 19 | 22 | 34 | 37 | 44 |
| T1 | 33 | 105 | 118 | 121 | 110 |
| T2 | 25 | 100 | 249 | 187 | 99 |
| T3 | 38 | 112 | 192 | 208 | 144 |
| T4 | 40 | 113 | 107 | 168 | 120 |

POSITION DETECTION METHOD, POSITION DETECTOR, AND INTEGRATED CIRCUIT

BACKGROUND

Technical Field

The present disclosure relates to a position detecting method, a position detector, and an integrated circuit.

Description of the Related Art

Recently, an electromagnetic induction type position input device has been used as an input device of a tablet PC or the like.

This position input device includes a position indicator in a pen shape (pen type position indicator) and a position detecting device having an input surface on which a pointing operation and the input of a character, a figure, and the like are performed by using the pen type position indicator.

The position indicator includes a resonance circuit constituted by a coil and a capacitor.

On the other hand, as illustrated in FIG. 34, in order to obtain the coordinate in an X-axis direction of the position indicator within an active area AA, the position detecting device includes

- an X-sensor coil group including X-sensor coils X0, . . . X4 arranged in an X-direction,
- a switch connected to the X-sensor coil group, and
- an X-axis TX/RX circuit that
  - generates an alternating magnetic field (transmission magnetic field, the same applies hereinafter) by feeding a current through each coil of the X-sensor coil group arranged on an X-axis in a transmission period, and,
  - in a detection period after the transmission period, detects, through a current or a voltage, an electromotive force generated in each coil of the X-sensor coil group by a pen signal which the position indicator, having stored energy in the resonance circuit in the transmission period, continuously generates even after the transmission period (the pen signal is an alternating magnetic field generated by a circuit of the position indicator).

Similarly, in order to obtain the coordinate in a Y-axis direction of the position indicator, the position detecting device includes

- a Y-sensor coil group including Y-sensor coils Y0, . . . Y4 arranged in a Y-direction,
- a switch connected to the Y-sensor coil group, and
- a Y-axis TX/RX circuit that
  - generates a transmission magnetic field by feeding a current through each coil of the X-sensor coil group arranged on a Y-axis in the transmission period, and,
  - in a detection period after the transmission period, detects, through a current or a voltage, an electromotive force generated in each coil of the Y-sensor coil group by a pen signal which the position indicator, having stored energy in the resonance circuit in the transmission period, continuously generates even after the transmission period.

The position detecting device, for example, selects one sensor coil at a time in predetermined order from the plurality of sensor coils constituting the position detecting sensor, sends out a transmission signal from this selected sensor coil to the position indicator, and thereby charges the capacitor within the position indicator.

On the other hand, the position detecting device connects the sensor coil used for the transmission to a receiving circuit, and receives a signal transmitted from the resonance circuit of the position indicator.

The position detecting device detects the position of the position indicator on the position detecting device by performing such signal transmission and reception while sequentially changing the sensor coils.

The following provides a detailed description of detection of the position of the position indicator in the position detecting device. First, (1) an approximate position on the position detecting sensor is identified by performing global scanning, which detects the position indicated by the position indicator while sequentially selecting all of the sensor coils, in order to detect the approximate position where the position indicator is present on the indicated position detecting sensor, and (2) the position indicated by the position indicator is identified accurately by performing sector scanning, which performs signal transmission and reception while selecting, in order, only a predetermined number of sensor coils in the vicinity of the identified approximate position (see Japanese Patent Laid-open No. 2002-244806, for example).

Here, in the example of FIG. 34, as illustrated in RX data (above) in the figure, the coordinate in the Y-axis direction of the position indicator, that is, the coordinate in the Y-direction, is derived by interpolation computation or the like from a distribution of level values in a one-axis direction, such as a level value of 34 obtained by the Y-sensor coil Y0, a level value of 118 obtained by the Y-sensor coil Y1, . . . a level value of 107 obtained by the Y-sensor coil Y4.

Similarly, as illustrated in RX data (below) in the figure, the coordinate in the X-axis direction of the position indicator, that is, the coordinate in the X-direction is derived by interpolation computation or the like from a distribution of level values in a one-axis direction, such as a level of 25 obtained by the X-sensor coil X0, a level value of 100 obtained by the X-sensor coil X1, . . . a level value of 99 obtained by the X-sensor coil X4.

Thus, in obtaining the two-dimensional coordinates of the position indicator, the position detecting device of FIG. 34 separately obtains levels on the two respective axes, obtains the coordinate for each dimension with respect to each of the X-axis and the Y-axis on the basis of each of the distributions (RX data), combines these two coordinates with each other and performs certain processing, and thereafter outputs the coordinates as two-dimensional coordinates.

As described above, in order to detect the position of the position indicator, the conventional position detecting device independently performs signal transmission and reception to and from the sensor coils in the X-axis direction and the Y-axis direction. Therefore, one-dimensional information is obtained in each of the X-axis direction and the Y-axis direction. The coordinates of the position indicator, the inclination of the position indicator, and the like are derived on the basis of the information.

BRIEF SUMMARY

However, in the conventional position detecting device, whereas the coordinates of the position indicator can be derived from a small amount of information, information in an oblique direction is dispersed in the X-axis direction and the Y-axis direction and, therefore, in a case where the position indicator is inclined in an oblique direction, the accuracy of deriving the coordinates is degraded.

According to one aspect, the present disclosure provides a position detecting method, a position detector, and an integrated circuit that improve the accuracy of deriving the coordinates.

Embodiment 1; one or more embodiments of the present disclosure propose a position detecting method in a position detector, the position detector including a first sensor coil group including a plurality of conducting wires having a plurality of electrodes arranged in parallel with each other in a first direction and a second sensor coil group including a plurality of conducting wires having a plurality of electrodes arranged in parallel with each other in a second direction intersecting the first direction, the position detecting method including a first step of the position detector generating an alternating magnetic field from the first sensor coil group, a second step of the position detector obtaining a level of a pen signal which a pen, having stored the alternating magnetic field, generates as a response alternating magnetic field, by using at least the second sensor coil group, and a third step of the position detector deriving information regarding a position of the pen by using a two-dimensional distribution of the level of the pen signal at each of points of intersection of the plurality of electrodes of the first sensor coil group and the plurality of electrodes of the second sensor coil group.

Embodiment 2; one or more embodiments of the present disclosure propose a position detecting method in a position detector, the position detector including a first sensor coil group including a plurality of conducting wires having a plurality of electrodes arranged in parallel with each other in a first direction and a second sensor coil group including a plurality of conducting wires having a plurality of electrodes arranged in parallel with each other in a second direction intersecting the first direction, the position detecting method including a first step of the position detector generating an alternating magnetic field from the first sensor coil group, a second step of the position detector obtaining a level of a pen signal which a pen, having stored the alternating magnetic field, generates as a response alternating magnetic field, or a signal level according to capacitive coupling with a finger, by using at least the second sensor coil group, and a third step of the position detector deriving information regarding a position of the pen or the finger by using a two-dimensional distribution of the level of the pen signal, or the signal level according to capacitive coupling with the finger, at each of points of intersection of the plurality of electrodes of the first sensor coil group and the plurality of electrodes of the second sensor coil group, the first step including a fourth step of the position detector generating the alternating magnetic field by using the first sensor coil group a predetermined number of times while changing the positions of the alternating magnetic field in the first direction, and a fifth step of the position detector obtaining the level of the pen signal which the pen, having stored the alternating magnetic field, generates as the response alternating magnetic field, or the signal level according to the capacitive coupling with the finger, for the predetermined number of times, and determining the next order of scanning the predetermined number of times such that one conducting wire corresponding to a highest level of the signal from the pen, among the plurality of conducting wires arranged in parallel with each other in the first direction in the first sensor coil group, is set as a start position.

Embodiment 3; one or more embodiments of the present disclosure propose a position detector including a first sensor coil group including a plurality of conducting wires having a plurality of electrodes arranged in parallel with each other in a first direction, a second sensor coil group including a plurality of conducting wires having a plurality of electrodes arranged in parallel with each other in a second direction intersecting the first direction, an alternating magnetic field generating section configured to generate an alternating magnetic field from the first sensor coil group, a pen signal level obtaining section configured to obtain, by using the second sensor coil group, a level of a pen signal which a position indicator, having stored the alternating magnetic field, generates as a response alternating magnetic field, and an information deriving section configured to derive information regarding a position of the position indicator by using a two-dimensional distribution of the level of the pen signal at each of points of intersection of the plurality of conducting wires of the first sensor coil group and the plurality of electrodes of the second sensor coil group.

Embodiment 4; one or more embodiments of the present disclosure propose a position detector including a first sensor coil group including a plurality of conducting wires having a plurality of electrodes arranged in parallel with each other in a first direction, a second sensor coil group including a plurality of conducting wires having a plurality of electrodes arranged in parallel with each other in a second direction intersecting the first direction, an alternating magnetic field generating section configured to generate an alternating magnetic field from the first sensor coil group, a signal level obtaining section configured to obtain, by using the second sensor coil group, a level of a pen signal which a position indicator, having stored the alternating magnetic field, generates as a response alternating magnetic field, or a signal level according to capacitive coupling with a finger, an information deriving section configured to derive information regarding a position of the pen or the finger by using a two-dimensional distribution of the level of the pen signal or the signal level according to the capacitive coupling with the finger at each of points of intersection of the plurality of electrodes of the first sensor coil group and the plurality of electrodes of the second sensor coil group, and a control section configured to control operation. The control section is configured to make the alternating magnetic field generating section generate the alternating magnetic field by using the first sensor coil group a predetermined number of times of while changing the positions of the alternating magnetic field in the first direction, make the signal level obtaining section obtain the level of the pen signal which the pen, having stored the alternating magnetic field, generates as the response alternating magnetic field, or the signal level according to the capacitive coupling with the finger, for the predetermined number of times, and determine the next order of scanning the predetermined number of times such that one conducting wire corresponding to a highest level of the signal from the pen or a highest signal level according to the capacitive coupling with the finger, among the plurality of conducting wires arranged in parallel with each other in the first direction in the first sensor coil group, is set as a start position.

Embodiment 5; one or more embodiments of the present disclosure propose an integrated circuit for deriving information regarding a position indicated by a position indicator, the integrated circuit being connected to a first sensor coil group including a plurality of conducting wires having a plurality of electrodes arranged in parallel with each other in a first direction and a second sensor coil group including a plurality of conducting wires having a plurality of electrodes arranged in parallel with each other in a second direction intersecting the first direction. The integrated circuit is configured to generate an alternating magnetic field from the first sensor coil group, obtain, by using the second sensor coil group, a level of a pen signal which the position indicator, having stored the alternating magnetic field, generates as a response alternating magnetic field, and derive information regarding the position of the position indicator by using a two-dimensional distribution of the level of the pen signal at each of points of intersection of the plurality of conducting wires of the first sensor coil group and the plurality of electrode of the second sensor coil group.

Embodiment 6; one or more embodiments of the present disclosure propose an integrated circuit for deriving information regarding a position indicated by a position indicator. The integrated circuit is configured to generate an alternating magnetic field from a first sensor coil group, obtain, by using a second sensor coil group, a level of a pen signal which the position indicator, having stored the alternating magnetic field, generates as a response alternating magnetic field, or a signal level according to capacitive coupling with a finger, and derive information regarding a position of the pen or the finger by using a two-dimensional distribution of the level of the pen signal or the signal level according to the capacitive coupling with the finger at each of points of intersection of a plurality of electrodes of the first sensor coil group and a plurality of electrodes of the second sensor coil group. When obtaining the level of the pen signal or the signal level according to the capacitive coupling with the finger, the integrated circuit generates the alternating magnetic field by using the first sensor coil group a predetermined number of times while changing the positions of the alternating magnetic field in a first direction, obtain the level of the pen signal which the pen, having stored the alternating magnetic field, generates as the response alternating magnetic field, or the signal level according to the capacitive coupling with the finger, for the predetermined number of times, and determine the next order of scanning the predetermined number of times such that one conducting wire corresponding to a highest level of the signal from the pen, among a plurality of conducting wires arranged in parallel with each other in the first direction in the first sensor coil group, is set as a start position.

One or more embodiments of the present disclosure have an effect of being able to improve the accuracy of deriving the coordinates.

BRIEF DESCRIPTION OF THE SEVERAL VIEWS OF THE DRAWINGS

FIG. 2A is a diagram illustrating pen signal levels in a case where a position indicator has a tilt angle of 90 degrees with respect to a normal to a sensor plane and an angle of 0 degrees in a region in which TX sensor coils cross RX sensor coils in the position detector according to the first embodiment of the present disclosure;

FIG. 2B is a diagram in which the pen signal level values in FIG. 2A are organized by moving averages;

FIG. 3A is a diagram illustrating pen signal levels in a case where the position indicator has a tilt angle of 30 degrees with respect to the normal to the sensor plane and an angle of 90 degrees with respect to the sensor plane in the region in which the TX sensor coils cross the RX sensor coils in the position detector according to the first embodiment of the present disclosure;

FIG. 3B is a diagram in which the pen signal level values in FIG. 3A are organized by moving averages;

FIG. 4A is a diagram illustrating pen signal levels in a case where the position indicator has a tilt angle of 30 degrees with respect to the normal to the sensor plane and an angle of 0 degrees with respect to the sensor plane in the region in which the TX sensor coils cross the RX sensor coils in the position detector according to the first embodiment of the present disclosure;

FIG. 4B is a diagram in which the pen signal level values in FIG. 4A are organized by moving averages;

FIG. 5A is a diagram illustrating pen signal levels in a case where the position indicator has a tilt angle of 30 degrees with respect to the normal to the sensor plane and an angle of 45 degrees with respect to the sensor plane in the region in which the TX sensor coils cross the RX sensor coils in the position detector according to the first embodiment of the present disclosure;

FIG. 5B is a diagram in which the pen signal level values in FIG. 5A are organized by moving averages;

FIG. 6A is a diagram illustrating pen signal levels in a case where the position indicator has a tilt angle of 30 degrees with respect to the normal to the sensor plane and an angle of −45 degrees with respect to the sensor plane in the region in which the TX sensor coils cross the RX sensor coils in the position detector according to the first embodiment of the present disclosure;

FIG. 6B is a diagram in which the pen signal level values in FIG. 6A are organized by moving averages;

DETAILED DESCRIPTION

Embodiments of the present disclosure will hereinafter be described with reference to FIGS. 1 to 33B.

First Embodiment

A position detector 1 according to the present embodiment will be described with reference to FIGS. 1 to 7.

Configuration of Position Detector 1

Figure 1:
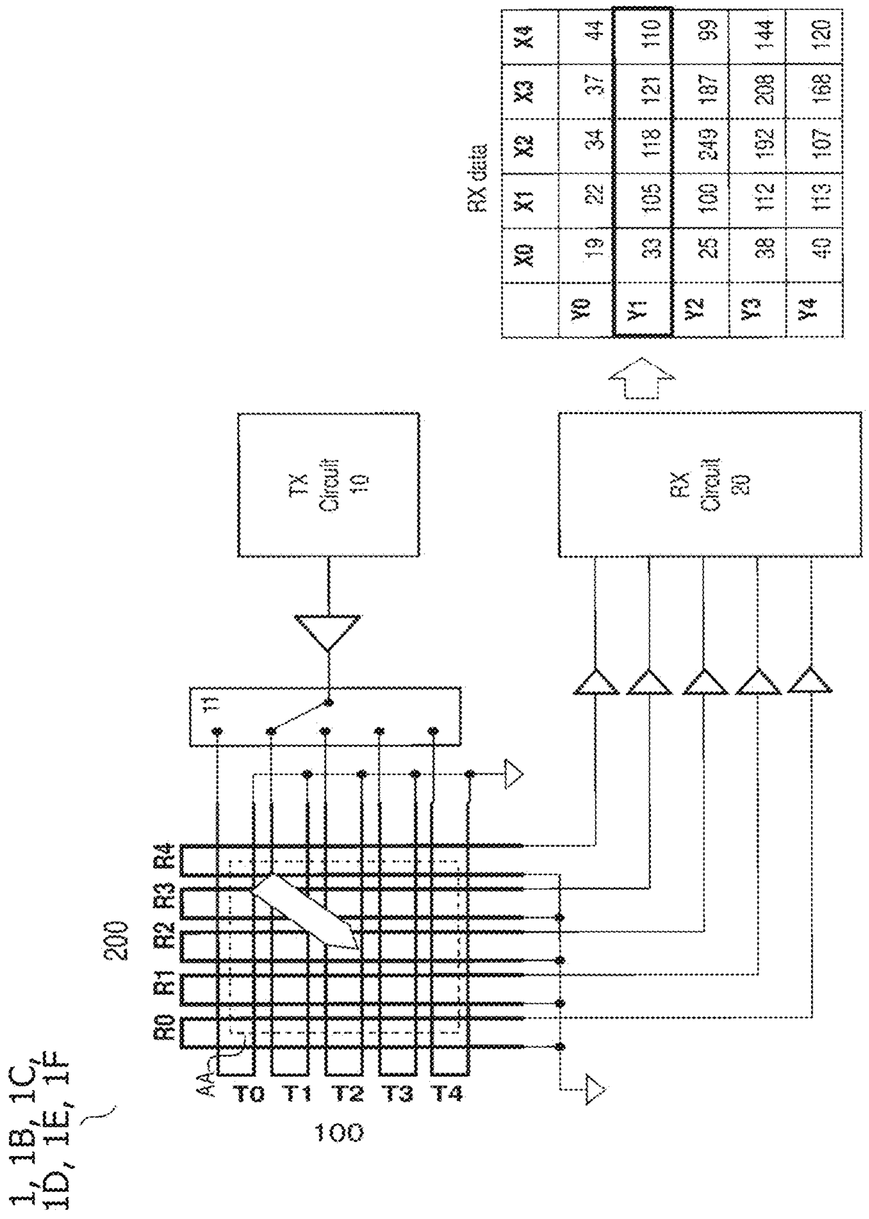
FIG. 1 is a conceptual diagram illustrating a coordinate deriving operation of a position detector according to a first embodiment of the present disclosure.

As illustrated in FIG. 1, the position detector 1 includes a TX circuit 10, a switch 11, a TX sensor coil group (first sensor coil group) 100, an RX sensor coil group (second sensor coil group) 200, an RX circuit 20, and a peripheral circuit such as an amplifier.

The TX sensor coil group (first sensor coil group) 100 is a plurality of conducting wires arranged in parallel with each other in a first direction (X-axis direction) of the sensor. TX sensor coils constituting the TX sensor coil group (first sensor coil group) 100 are formed by rectangular loop coils, for example.

In addition, the TX sensor coils constituting the TX sensor coil group (first sensor coil group) 100 are arranged side by side at equal intervals, for example.

The RX sensor coil group (second sensor coil group) 200 is a plurality of conducting wires having a plurality of electrodes arranged in parallel with each other in a second direction (Y-axis direction) intersecting the first direction (X-axis direction). RX sensor coils constituting the RX sensor coil group (second sensor coil group) 200 are formed by rectangular loop coils, for example.

In addition, the RX sensor coils constituting the RX sensor coil group (second sensor coil group) 200 are arranged side by side at equal intervals, for example.

The TX circuit 10 functions as an alternating magnetic field generating unit that transmits a signal to the TX sensor coil group (first sensor coil group) 100 via the switch 11, and thereby makes an alternating magnetic field generated from the TX sensor coil group (first sensor coil group) 100.

That is, in the position detector 1 according to the present embodiment, the TX sensor coils T0, T1, . . . T4 are connected to the TX circuit 10 and used to generate the alternating magnetic field, but is not used to detect a pen signal.

The RX circuit 20 functions as a pen signal level obtaining unit that receives a pen signal which a position indicator, having stored the alternating magnetic field, generates as a response alternating magnetic field and obtains the level of the pen signal by using the plurality of electrodes of the RX sensor coil group (second sensor coil group) 200.

That is, the RX sensor coils R0, R1, . . . R4 are connected to the RX circuit 20 and used to detect the pen signal, but are not used to generate the transmission magnetic field.

In addition, the RX circuit 20 functions as an information deriving unit that derives information regarding the position of the position indicator by using a two-dimensional distribution of the level of the pen signal at each of points of intersection of the plurality of conducting wires of the TX sensor coil group (first sensor coil group) 100 and the plurality of electrodes of the RX sensor coil group (second sensor coil group) 200.

Here, the information regarding the position of the pen (position indicator) includes either the inclination (angle) of the pen with respect to a normal to a sensor plane (XY plane formed by an X-axis and a Y-axis) or the direction of the inclination of the pen with respect to the sensor plane (i.e., the direction on the sensor plane as the pen is projected onto the sensor plane).

The information deriving unit of the RX circuit 20 derives either the inclination of the pen with respect to the normal to the sensor plane or the direction of the inclination of the pen with respect to the sensor plane on the basis of an asymmetry of the two-dimensional distribution.

The information deriving unit of the RX circuit 20 obtains a first reference position as a position indicated by a pen tip of the pen, obtains an upwardly displaced or downwardly displaced second reference position on the sensor plane, and derives the direction of the inclination of the pen with respect to the sensor plane on the basis of the direction of the second reference position with respect to the first reference position.

In addition, the information deriving unit of the RX circuit 20 derives the inclination of the pen with respect to the normal to the sensor plane on the basis of the level strength of the pen signal at the first reference position and the level strength of the pen signal at the second reference position.

Here, FIG. 2A, FIG. 3A, FIG. 4A, FIG. 5A, and FIG. 6A are map data obtained by converting the levels of the pen signal at positions at which the RX sensor coils R0, R1, . . . R15 and the TX sensor coils T0, T1, . . . T15 intersect one another in the sensor plane into numerical values. FIG. 2B, FIG. 3B, FIG. 4B, FIG. 5B, and FIG. 6B are data obtained by organizing the data of FIG. 2A, FIG. 3A, FIG. 4A, FIG. 5A, and FIG. 6A by moving averages. FIG. 2C, FIG. 3C, FIG. 4C, FIG. 5C, and FIG. 6C are graphs obtained by 3D conversion of FIG. 2B, FIG. 3B, FIG. 4B, FIG. 5B, and FIG. 6B.

Figure 2C:
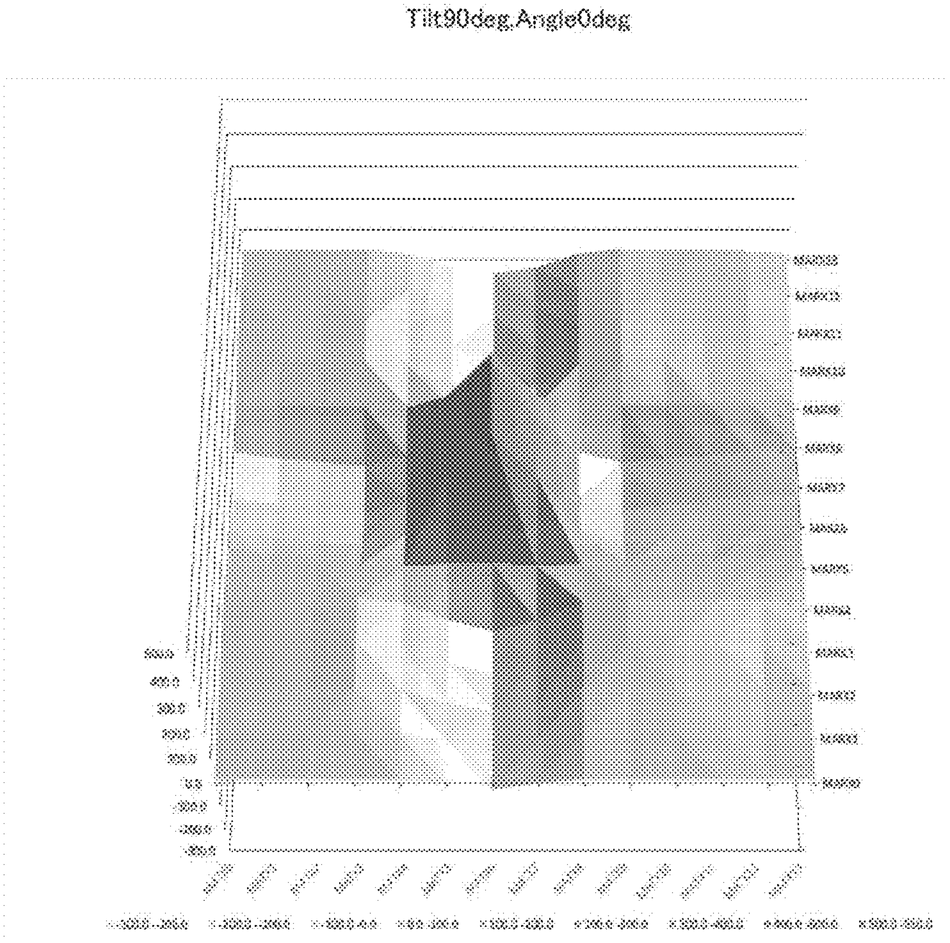
FIG. 2C is a diagram illustrating, in a 3D view, the pen signal level data illustrated in FIG. 2B in the position detector according to the first embodiment of the present disclosure.

FIGS. 2A to 2C illustrate level changes in a case where the inclination of the pen with respect to the normal to the sensor plane (tilt angle) is 90 degrees and the direction of the inclination of the pen with respect to the sensor plane (angular angle) is 0 degrees (the rightward direction as shown). In each of the figures, MATX and MARX refer to sensor coils corresponding to TX and RX in FIG. 2A.

In FIG. 2A, a peak value is exhibited at (TX6, RX7), and In FIG. 2B, a peak value is exhibited at (MATX6, MARX7). In FIG. 2A and in FIG. 2B, similar changes in the level of the pen signal appear concentrically. FIG. 2C also illustrates a similar state.

From FIG. 2A and FIG. 2B, (TX6, RX7) or (MATX6, MARX7) is the first reference position as the position indicated by the pen tip of the pen.

A method for deriving the inclination of the pen with respect to the normal to the sensor plane (tilt angle) and the direction of the inclination of the pen with respect to the sensor plane (angular angle) in this case is similar to that of a conventional example, and therefore, details thereof will be omitted.

Figure 3C:
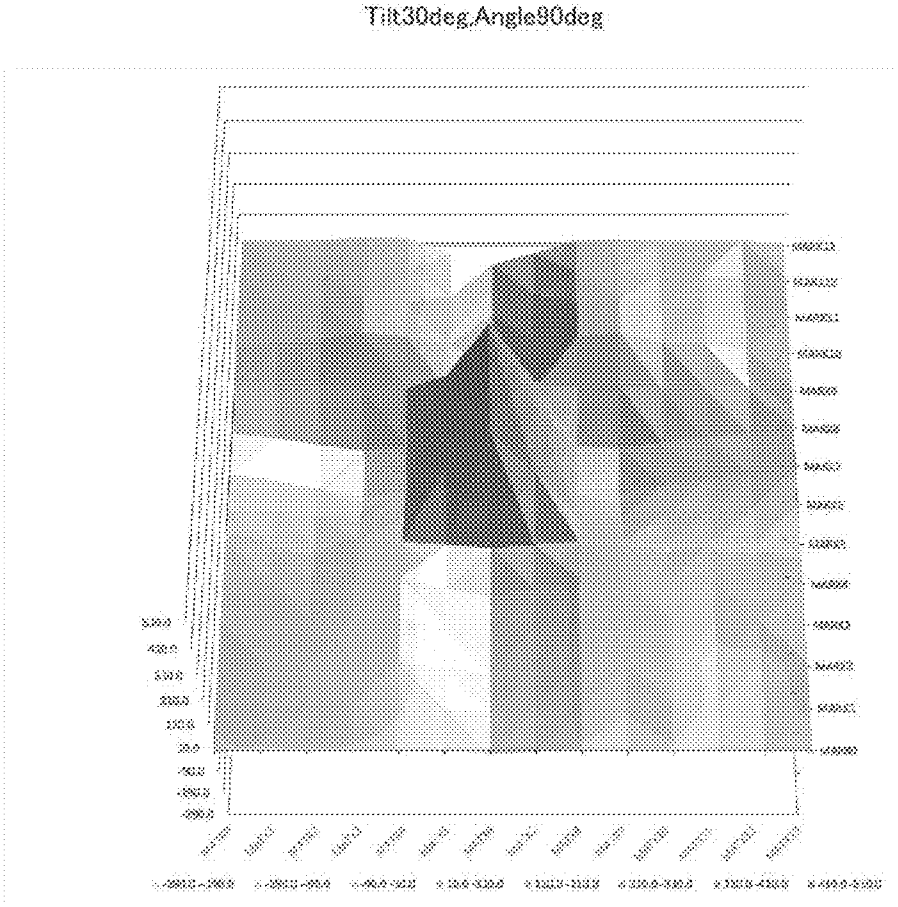
FIG. 3C is a diagram illustrating, in a 3D view, the pen signal level data illustrated in FIG. 3B in the position detector according to the first embodiment of the present disclosure.

FIGS. 3A to 3C illustrate level changes in a case where the inclination of the pen with respect to the normal to the sensor plane (tilt angle) is 30 degrees and the direction of the inclination of the pen with respect to the sensor plane (angular angle) is 90 degrees (the upward direction as shown).

In FIG. 3A, a peak value is exhibited at (TX6, RX7), and in FIG. 3B, a peak value is exhibited at (MATX6, MARX7). Changes in the level of the pen signal are noticeable in a direction of going upward in the sensor plane from the peak value. FIG. 3C also illustrates a similar state.

From FIG. 3A and FIG. 3B, (TX6, RX7) or (MATX6, MARX7) is the first reference position as the position indicated by the pen tip of the pen.

A method for deriving the inclination of the pen with respect to the normal to the sensor plane (tilt angle) and the direction of the inclination of the pen with respect to the sensor plane (angular angle) in this case is similar to that of the conventional example, and therefore, details thereof will be omitted.

Figure 4C:
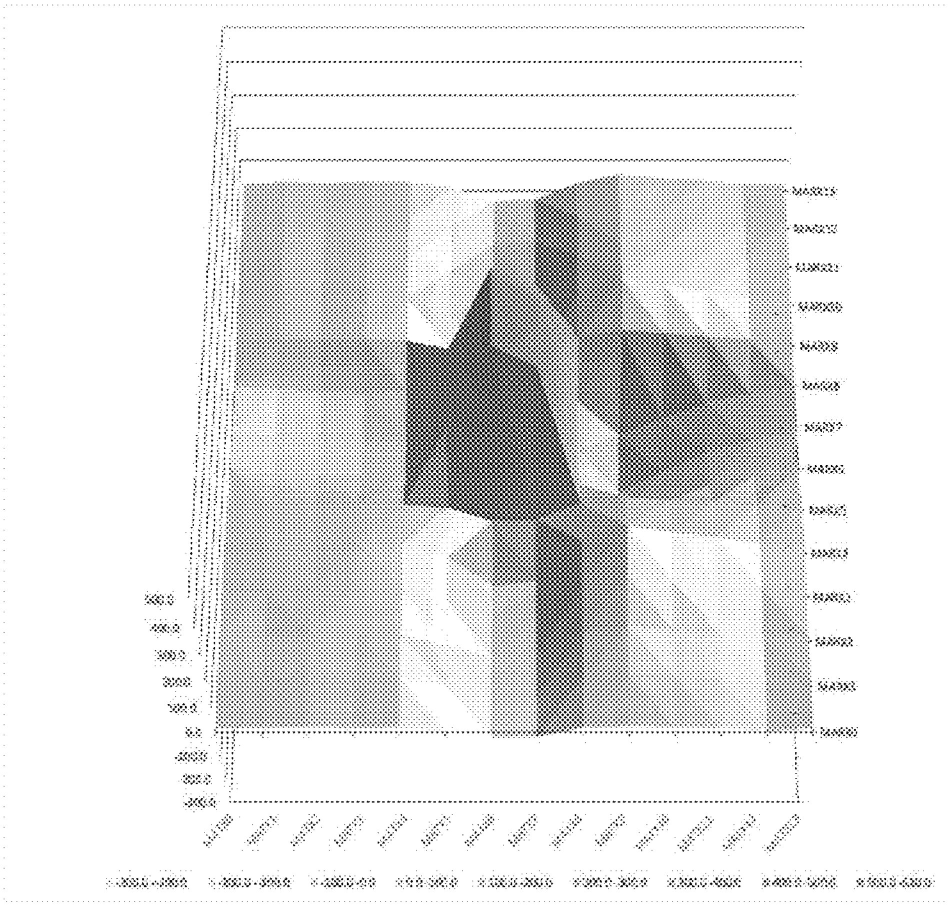
FIG. 4C is a diagram illustrating, in a 3D view, the pen signal level data illustrated in FIG. 4B in the position detector according to the first embodiment of the present disclosure.

FIGS. 4A to 4C illustrate level changes in a case where the inclination of the pen with respect to the normal to the sensor plane (tilt angle) is 30 degrees and the direction of the inclination of the pen with respect to the sensor plane (angular angle) is 0 degrees (the rightward direction as shown).

In FIG. 4A, a peak value is exhibited at (TX6, RX7), and in FIG. 4B, a peak value is exhibited at (MATX6, MARX7). Changes in the level of the pen signal are noticeable in a direction of going rightward in the sensor plane from the peak value. FIG. 4C also illustrates a similar state.

From FIG. 4A and FIG. 4B, (TX6, RX7) or (MATX6, MARX7) is the first reference position as the position indicated by the pen tip of the pen.

A method for deriving the inclination of the pen with respect to the normal to the sensor plane (tilt angle) and the direction of the inclination of the pen with respect to the sensor plane (angular angle) in this case is similar to that of the conventional example described, for example, in JP Publication H7-295729 paragraphs [0008]&[0009], and therefore, details thereof will be omitted.

Figure 5C:
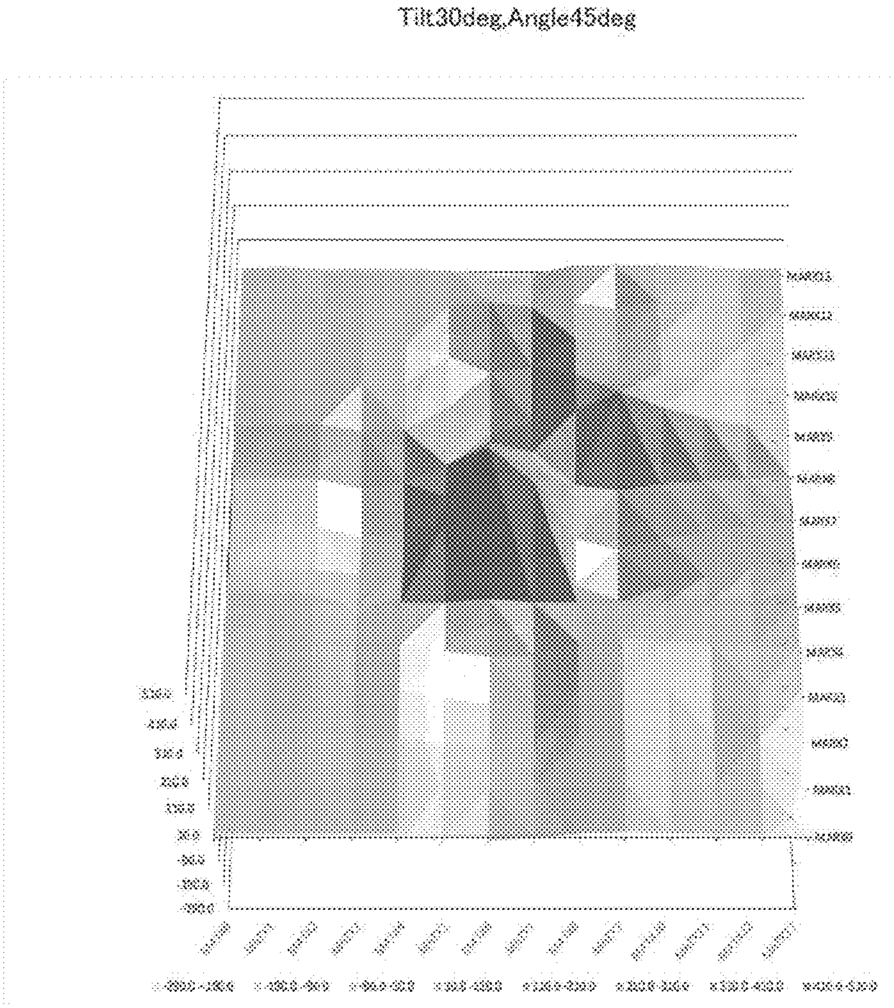
FIG. 5C is a diagram illustrating, in a 3D view, the pen signal level data illustrated in FIG. 5B in the position detector according to the first embodiment of the present disclosure.

FIGS. 5A to 5C illustrate level changes in a case where the inclination of the pen with respect to the normal to the sensor plane (tilt angle) is 30 degrees and the direction of the inclination of the pen with respect to the sensor plane (angular angle) is 45 degrees (the upper-right direction as shown).

In FIG. 5B, a peak value is exhibited at (MATX6, MARX6). This point is the first reference position as the position indicated by the pen tip of the pen.

In addition, in FIG. 5B, a second peak value is exhibited at (MATX9, MARX9). This point is the second reference position.

Then, the information deriving unit of the RX circuit 20 obtains the first reference position as the position indicated by the pen tip of the pen, obtains the upwardly displaced or downwardly displaced second reference position, and derives the direction of the inclination of the pen with respect to the sensor plane on the basis of the direction of the second reference position with respect to the first reference position.

Figure 6C:
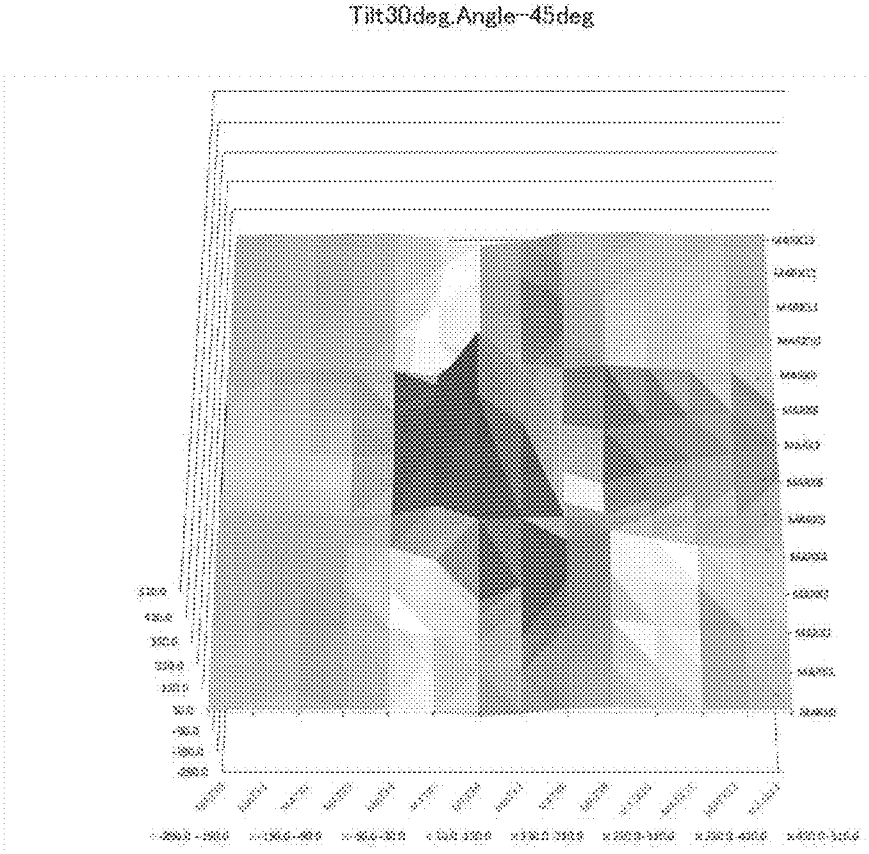
FIG. 6C is a diagram illustrating, in a 3D view, the pen signal level data illustrated in FIG. 6B in the position detector according to the first embodiment of the present disclosure.

FIGS. 6A to 6C illustrate level changes in a case where the inclination of the pen with respect to the normal to the sensor plane (tilt angle) is 30 degrees and the direction of the inclination of the pen with respect to the sensor plane (angular angle) is −45 degrees (the lower-right direction as shown).

In FIG. 6B, a peak value is exhibited at (MATX6, MARX7). This point is the first reference position as the position indicated by the pen tip of the pen.

In addition, in FIG. 6B, a second peak value is exhibited at (MATX9, MARX4). This point is the second reference position.

Then, the information deriving unit of the RX circuit 20 obtains the first reference position as the position indicated by the pen tip of the pen, obtains the upwardly displaced or downwardly displaced second reference position, and derives the direction of the inclination of the pen with respect to the sensor plane on the basis of the direction of the second reference position with respect to the first reference position.

Processing of Position Detector 1

Figure 7:
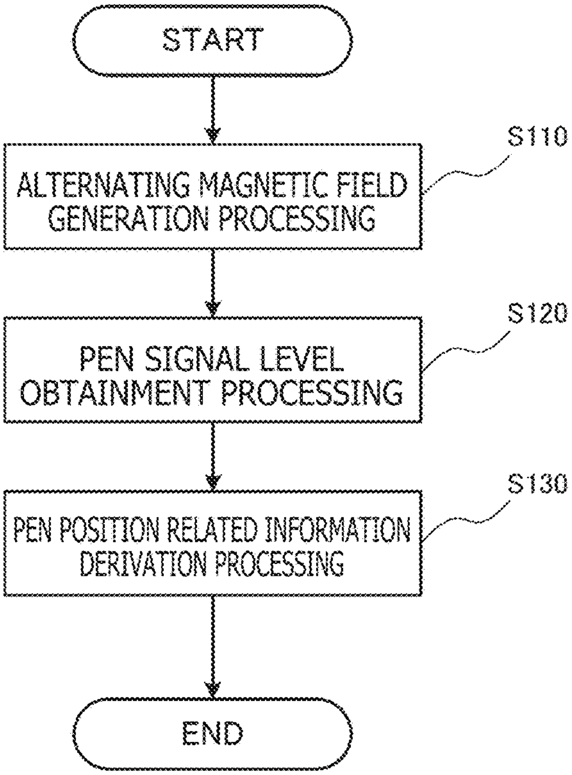
FIG. 7 is a diagram illustrating coordinate derivation processing of the position detector according to the first embodiment of the present disclosure.

Processing of the position detector 1 according to the present embodiment will be described with reference to FIG. 7.

The position detector 1 selects, through switching by the switch 11, one TX sensor coil of the TX sensor coil group (first sensor coil group) 100 for generating the transmission magnetic field, and sends out the transmission magnetic field by driving the selected TX sensor coil by the TX circuit 10 (step S110).

FIG. 1 illustrates a state in which the TX sensor coil T1 is selected.

After a certain transmission period, that is, after a period in which predetermined energy will be stored in the pen when the pen is present in the vicinity of the TX sensor coil, the position detector 1 obtains the level of the pen signal at the positions of all of the RX sensor coils.

The position detector 1 detects level values (33, 105, 118, 121, and 110 in the figure) of the pen signal in regions in which the TX sensor coil T1 crosses the RX sensor coils R0, R1, R2, . . . R4 (which regions will hereinafter be referred to as coil cross point regions).

The position detector 1 obtains signal levels at respective coil cross points, that is, two-dimensional heat map data RX data by sequentially changing the selection of the TX sensor coil (step S120).

After obtaining the two-dimensional heat map data RX data, the position detector 1 performs coordinate processing, and thereby obtains the coordinates of the pen and the inclination of the pen (the angle from the normal to the sensor surface) or the orientation of the pen (the inclining direction) on the basis of the two-dimensional heat map data RX data (step S130).

Functions and Effects

As described above, the position detector 1 according to the present embodiment performs a first step of generating an alternating magnetic field from the plurality of conducting wires arranged in parallel with each other in the first direction of the sensor, a second step of obtaining the level of a pen signal which the pen, having stored the alternating magnetic field, generates as a response alternating magnetic field by using at least the plurality of electrodes arranged in parallel with each other in the second direction intersecting the first direction, and a third step of deriving information regarding the position of the pen by using a two-dimensional distribution of the level of the pen signal at each of the points of intersection of the plurality of conducting wires arranged in parallel with each other in the first direction of the sensor and the plurality of electrodes arranged in parallel with each other in the second direction intersecting the first direction.

That is, the position detector 1 according to the present embodiment uses the plurality of conducting wires arranged in parallel with each other in the first direction of the sensor (for example, the TX sensor coils T0, T1, . . . T4) only for the generation of the alternating magnetic field, uses the plurality of electrodes arranged in parallel with each other in the second direction intersecting the first direction (for example, the RX sensor coils R0, R1, . . . R4) for the detection of only the level of the pen signal, and derives the information regarding the position of the pen by using the two-dimensional distribution of the level of the pen signal at each of the points of intersection of the plurality of conducting wires arranged in parallel with each other in the first direction of the sensor and the plurality of electrodes arranged in parallel with each other in the second direction intersecting the first direction.

Therefore, by using the two-dimensional distribution of the level of the pen signal, it is possible to improve the accuracy of deriving the coordinates even when the position indicator is inclined in an oblique direction.

In the position detector 1 according to the present embodiment, the information regarding the position of the pen includes either the inclination of the pen with respect to the normal to the sensor plane or the direction of the inclination of the pen with respect to the sensor plane (along the sensor plane).

That is, by using the two-dimensional distribution of the level of the pen signal, the position detector 1 according to the present embodiment accurately derives not only the coordinate information of the pen tip of the pen but also the inclination of the pen with respect to the normal to the sensor plane or the direction of the inclination of the pen with respect to the sensor plane.

Therefore, the accuracy of deriving the coordinates can be improved even when the position indicator is inclined in an oblique direction.

The position detector 1 according to the present embodiment derives either the inclination of the pen with respect to the normal to the sensor plane or the direction of the inclination of the pen with respect to the sensor plane on the basis of an asymmetry of the two-dimensional distribution as described, for example, in JP Publication H7-295729 paragraphs [0008]&[0009].

That is, because the position detector 1 according to the present embodiment derives the inclination of the pen with respect to the normal to the sensor plane or the direction of the inclination of the pen with respect to the sensor plane on the basis of an asymmetry of the two-dimensional distribution, the position detector 1 according to the present embodiment can accurately derive not only the coordinate information of the pen tip of the pen but also the inclination of the pen with respect to the normal to the sensor plane or the direction of the inclination of the pen with respect to the sensor plane.

Therefore, the accuracy of deriving the coordinates can be improved even when the position indicator is inclined in an oblique direction.

The position detector 1 according to the present embodiment obtains the first reference position as the position indicated by the pen tip of the pen, and obtains the upwardly displaced or downwardly displaced second reference position.

Then, the position detector 1 derives the direction of the inclination of the pen with respect to the sensor plane on the basis of the direction (orientation) of the second reference position with respect to the first reference position.

That is, because the position detector 1 according to the present embodiment obtains the first reference position as the position indicated by the pen tip of the pen and the upwardly displaced or downwardly displaced second reference position, and derives the direction of the inclination of the pen with respect to the sensor plane on the basis of the direction of the second reference position with respect to the first reference position, the position detector 1 according to the present embodiment can accurately derive not only the coordinate information of the pen tip of the pen but also the direction of the inclination of the pen with respect to the sensor plane.

Therefore, the accuracy of deriving the coordinates can be improved even when the position indicator is inclined in an oblique direction.

The position detector 1 according to the present embodiment derives the inclination of the pen with respect to the normal to the sensor plane on the basis of the level strength of the pen signal at the first reference position and the level strength of the pen signal at the second reference position.

That is, because the position detector 1 according to the present embodiment derives the inclination of the pen with respect to the normal to the sensor plane on the basis of the level strength of the pen signal at the first reference position and the level strength of the pen signal at the second reference position, the position detector 1 according to the present embodiment can accurately derive not only the coordinate information of the pen tip of the pen but also the inclination of the pen with respect to the normal to the sensor plane.

Therefore, the accuracy of deriving the coordinates can be improved even when the position indicator is inclined in an oblique direction.

The position detector 1 according to the present embodiment generates the transmission magnetic field, sends out the transmission magnetic field to the plurality of conducting wires arranged in parallel with each other in the first direction of the sensor as selected by the switch 11 and, after a certain transmission period, obtains the level of the pen signal at each of the points of intersection of the plurality of conducting wires arranged in parallel with each other in the first direction of the sensor and all of the plurality of electrodes arranged in parallel with each other in the second direction intersecting the first direction.

Therefore, the circuit configuration of the position detector 1 can be simplified.

First Modification

In the present embodiment, the RX circuit 20 of the position detector 1 receives the pen signal which the position indicator, having stored the alternating magnetic field, generates as the response alternating magnetic field, and obtains the level of the pen signal by using the plurality of electrodes of the RX sensor coil group (second sensor coil group) 200. However, according to the number of RX channels possessed by the RX circuit 20, the RX circuit 20 may perform the detection simultaneously by using all of the RX sensor coils included in the RX sensor coil group (second sensor coil group) 200 or may perform the detection simultaneously by using some of a plurality of RX sensor coils.

Second Embodiment

A position detector 1A according to the present embodiment will be described with reference to FIG. 8 and FIG. 9.

Configuration of Position Detector 1A

Figure 8:
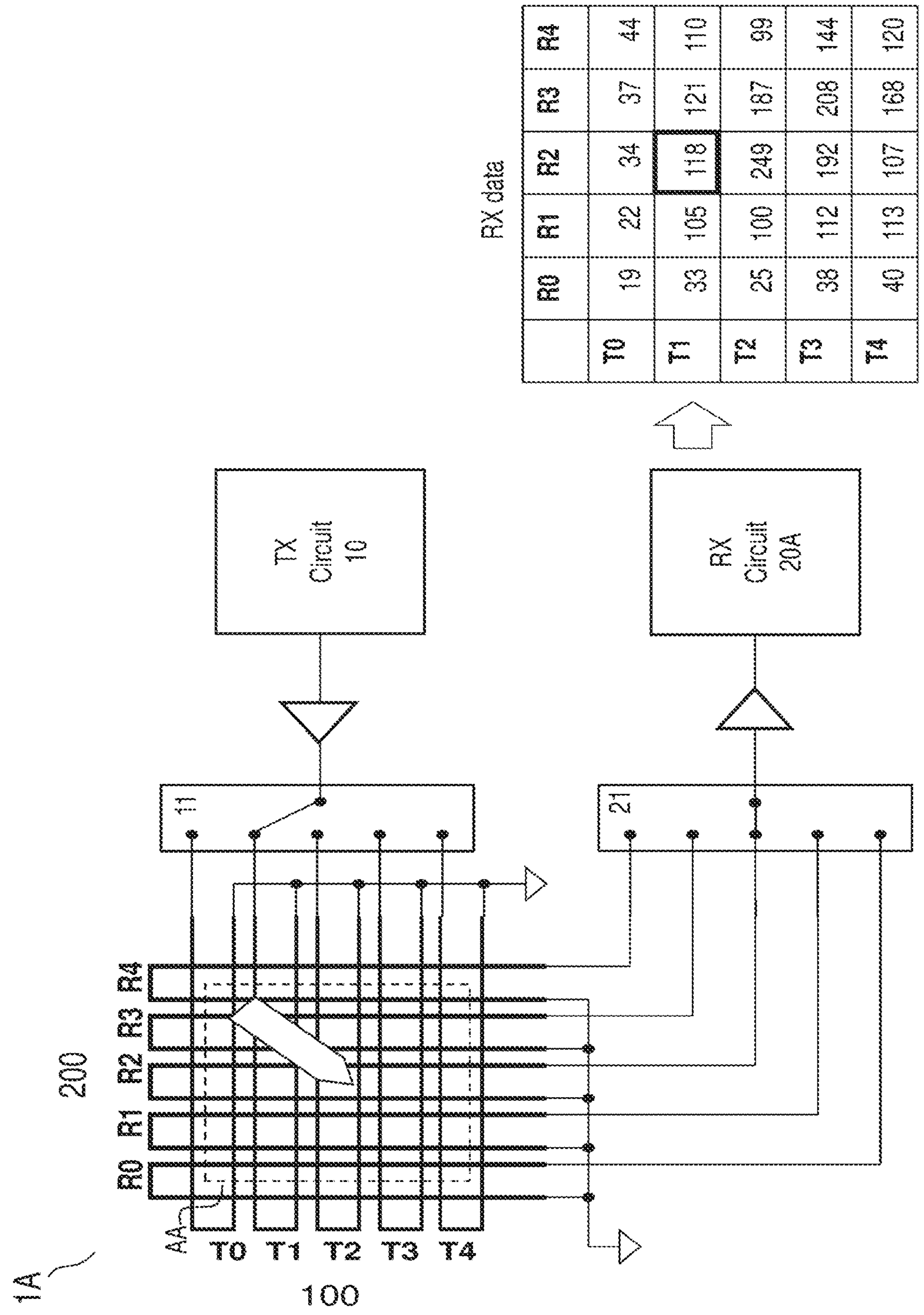
FIG. 8 is a conceptual diagram illustrating a coordinate deriving operation in a position detector according to a second embodiment of the present disclosure.
Figure 9:
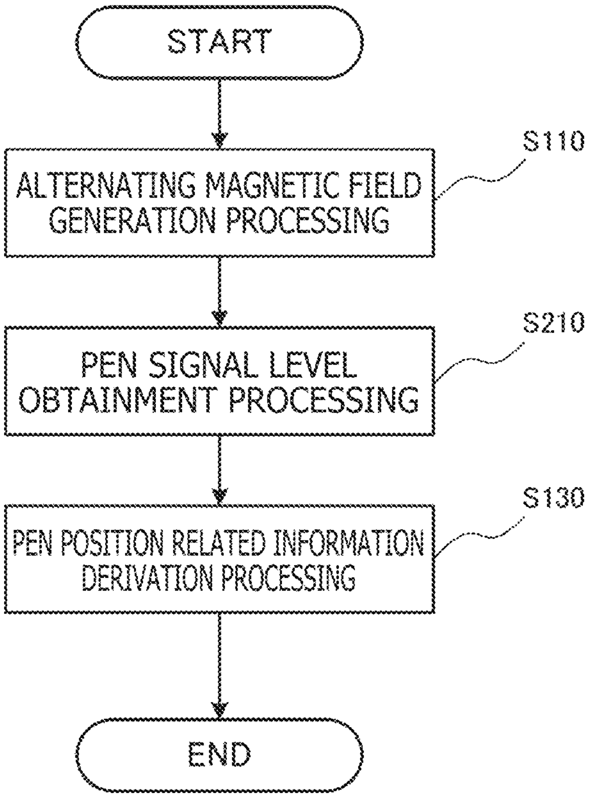
FIG. 9 is a diagram illustrating coordinate derivation processing of the position detector according to the second embodiment of the present disclosure.

As illustrated in FIG. 8, the position detector 1A includes a TX circuit 10, a switch 11, a switch 21, a TX sensor coil group (first sensor coil group) 100, an RX sensor coil group (second sensor coil group) 200, an RX circuit 20A, and a peripheral circuit such as an amplifier.

Incidentally, constituent elements identified by the same reference numerals as in the first embodiment have similar functions, and therefore, a detailed description thereof will be omitted.

The RX circuit 20A functions as a pen signal level obtaining section that receives a signal from the RX sensor coil group (second sensor coil group) 200 via the switch 21, and obtains the level of the pen signal which the position indicator, having stored the alternating magnetic field, generates as a response alternating magnetic field.

That is, the RX sensor coils R0, R1, . . . R4 are connected to the RX circuit 20A and used to detect the pen signal, but are not used to generate the transmission magnetic field.

In addition, the RX circuit 20A functions as an information deriving section that derives information regarding the position of the position indicator by using a two-dimensional distribution of the level of the pen signal at each of the points of intersection of the plurality of conducting wires of the TX sensor coil group (first sensor coil group) 100 and the plurality of electrodes of the RX sensor coil group (second sensor coil group) 200.

Here, the information regarding the position of the pen (position indicator) includes either the inclination of the pen with respect to the normal to the sensor plane (XY plane formed by the X-axis and the Y-axis) or the direction of the inclination of the pen with respect to the sensor plane.

The RX circuit 20A derives either the inclination of the pen with respect to the normal to the sensor plane or the direction of the inclination of the pen with respect to the sensor plane on the basis of an asymmetry of the two-dimensional distribution.

The RX circuit 20A obtains a first reference position as a position indicated by the pen tip of the pen, obtains an upwardly displaced or downwardly displaced second reference position, and derives the direction of the inclination of the pen with respect to the sensor plane on the basis of the direction of the second reference position with respect to the first reference position.

In addition, the RX circuit 20A derives the inclination of the pen with respect to the normal to the sensor plane on the basis of the level strength of the pen signal at the first reference position and the level strength of the pen signal at the second reference position.

Processing of Position Detector 1A

Processing of the position detector 1A according to the present embodiment will be described with reference to FIG. 9.

The position detector 1A selects, through switching by the switch 11, one TX sensor coil of the TX sensor coil group (first sensor coil group) 100 for generating the transmission magnetic field, and sends out the transmission magnetic field by driving the selected TX sensor coil by the TX circuit 10 (step S110).

FIG. 8 illustrates a state in which the TX sensor coil T1 is selected.

After a certain transmission period, that is, after a period in which predetermined energy will be stored in the pen when the pen is present in the vicinity of the TX sensor coil, the position detector 1A selects an RX sensor coil from which to detect the pen signal by controlling the switch 21, and obtains the level of the pen signal at the position of the selected RX sensor coil.

FIG. 8 illustrates a state in which the RX sensor coil R2 is selected.

The position detector 1A detects a level value (118 in the figure) of the pen signal in a region in which the TX sensor coil T1 and the RX sensor coils R0, R1, . . . R4 cross each other (which region will hereinafter be referred to as a coil cross point region).

The position detector 1A obtains the signal level at each coil cross point, that is, the two-dimensional heat map data RX data by sequentially fixing the TX sensor coil and changing the selection of the RX sensor coil (step S210).

After obtaining the two-dimensional heat map data RX data, the position detector 1A performs coordinate processing, and thereby obtains the coordinates of the pen and the inclination of the pen (angle from the normal to the sensor surface) or the orientation of the pen (inclining direction) on the basis of the two-dimensional heat map data RX data (step S130).

Functions and Effects

As described above, the position detector 1A according to the present embodiment has functions and effects similar to those of the position detector 1 according to the first embodiment.

Third Embodiment

A position detector 1B according to the present embodiment will be described with reference to FIGS. 1 and 10 to 13.

Configuration of Position Detector 1B

The position detector 1B includes a TX circuit 10A, a switch 11, a TX sensor coil group (first sensor coil group) 100, an RX sensor coil group (second sensor coil group) 200, an RX circuit 20, and a peripheral circuit such as an amplifier.

Thus, the position detector 1B differs from the position detector 1 of FIG. 1 in terms of the function of the TX circuit 10A, as described below.

Incidentally, constituent elements identified by the same reference numerals as in the first embodiment and the second embodiment have similar functions, and therefore, a detailed description thereof will be omitted.

Configuration of TX Circuit 10A

Figure 10:
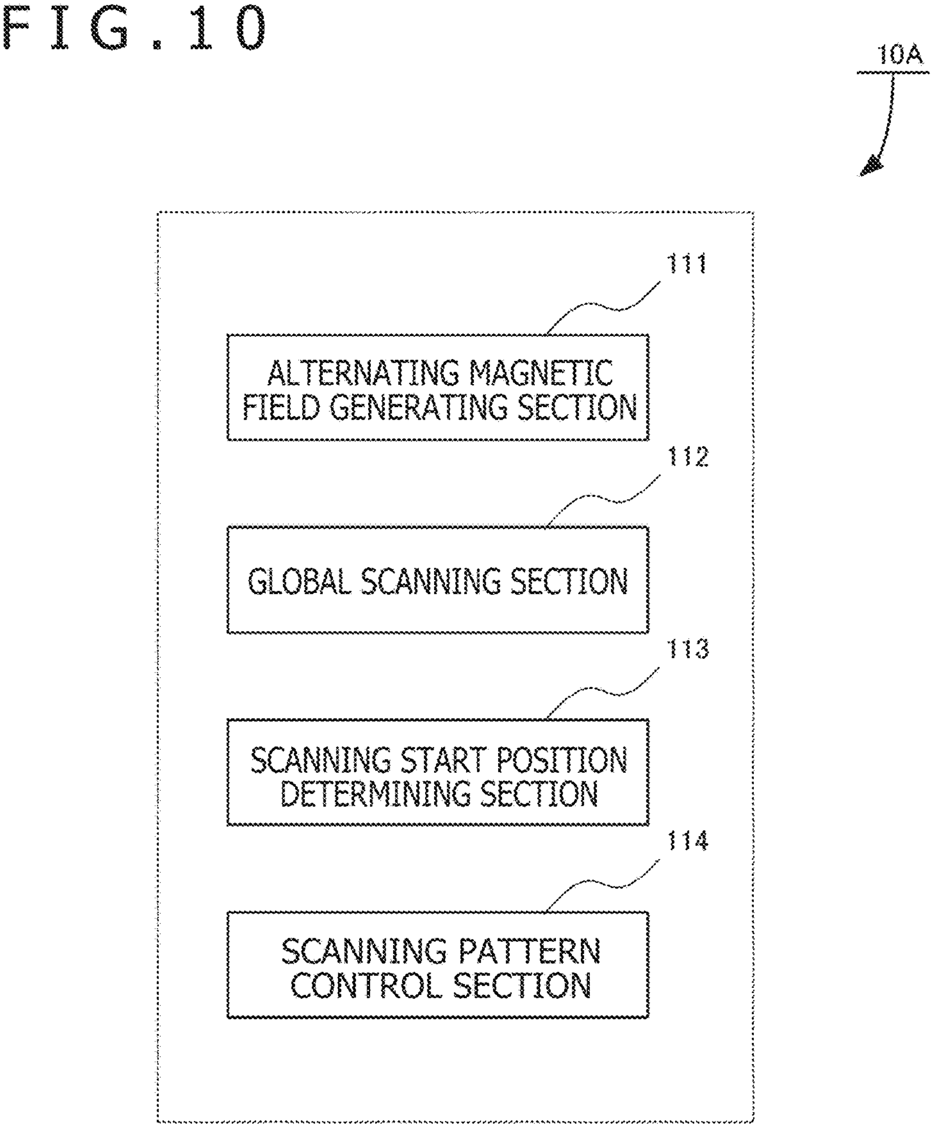
FIG. 10 is a diagram illustrating a configuration of a TX circuit in a position detector according to a third embodiment of the present disclosure.

As illustrated in FIG. 10, the TX circuit 10A includes an alternating magnetic field generating section 111, a global scanning section 112, a scanning start position determining section 113, and a scanning pattern control section 114.

The alternating magnetic field generating section 111 transmits a TX signal to the TX sensor coil group (first sensor coil group) 100 via the switch 11, and thereby makes an alternating magnetic field generated from the TX sensor coil group (first sensor coil group) 100.

The alternating magnetic field generating section 111 transmits the TX signal according to a control signal from the scanning pattern control section 114 to be described later.

Specifically, the alternating magnetic field generating section 111 generates the alternating magnetic field by using, for example, the plurality of conducting wires arranged in parallel with each other in the first direction of the sensor (for example, the TX sensor coil group (first sensor coil group) 100) a predetermined number of times, while changing the positions of the alternating magnetic field in the first direction (for example, the direction in which the TX sensor coil group (first sensor coil group) 100 are arranged in parallel with each other).

In order to detect an approximate position where the position indicator is present in the TX sensor coil group (first sensor coil group) 100, the global scanning section 112 detects the position indicated by the position indicator while sequentially selecting all of the TX sensor coil group (first sensor coil group) 100.

Specifically, for example, the global scanning section 112 obtains the level of the pen signal as a response alternating magnetic field from the pen stored according to the alternating magnetic field, at each of the predetermined number of times.

A result of the detection by the global scanning section 112 is output to the scanning start position determining section 113 to be described later.

The scanning start position determining section 113 determines on the basis of the result of the detection by the global scanning section 112 that one conducting wire corresponding to a highest level of the signal from the pen among the plurality of conducting wires arranged in parallel with each other in the first direction of the sensor (for example, the direction in which the TX sensor coil group (first sensor coil group) 100 are arranged in parallel with each other) is set as a start position.

The scanning start position information determined in the scanning start position determining section 113 is output to the scanning pattern control section 114 to be described later.

The scanning pattern control section 114 determines a scanning pattern on the basis of the scanning start position information, and controls output timing of the TX signal in the alternating magnetic field generating section 111 and switching timing of the switch 11 on the basis of the scanning pattern.

Figure 11:
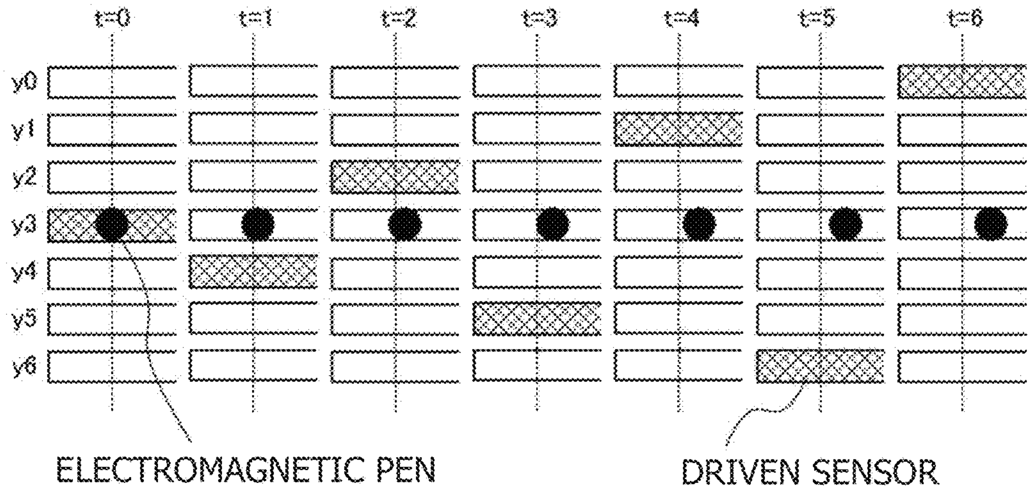
FIG. 11 is a diagram illustrating a scanning pattern in the TX circuit of the position detector according to the third embodiment of the present disclosure.

Specifically, as illustrated in FIG. 11, for example, the scanning pattern control section 114 sets the scanning pattern such that scanning order is determined to select a conducting wire, which is adjacent to a previously scanned conducting wire corresponding to a highest level of the signal from the pen.

In addition, as illustrated in FIG. 11, for example, the scanning pattern control section 114 sets the scanning pattern such that the scanning order is determined to select a conducting wire, which is adjacent to a previously scanned conducting wire corresponding to a highest level of the signal from the pen, and to sequentially select conducting wires while skipping the previously scanned conducting wire(s).

Processing of Position Detector 1B

Figure 12:
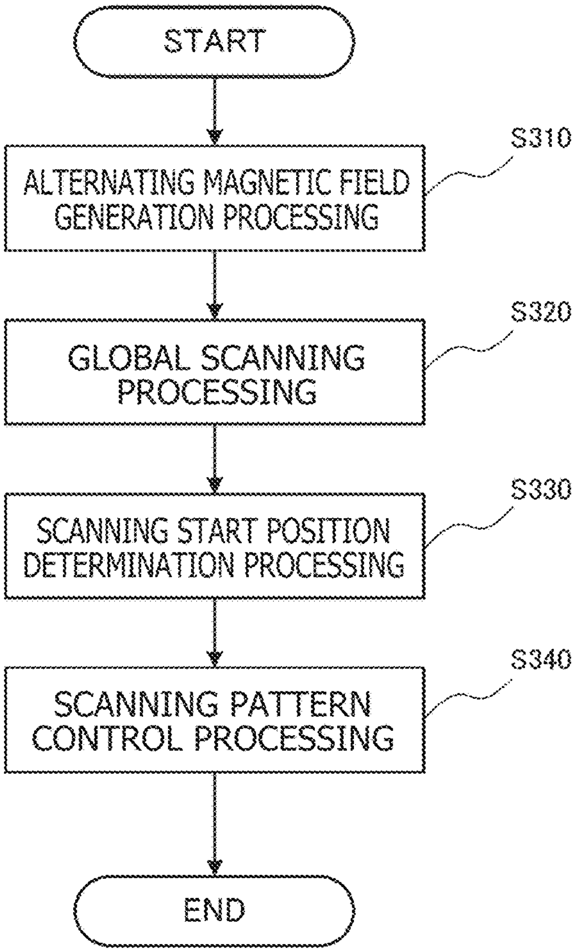
FIG. 12 is a diagram illustrating coordinate derivation processing of the position detector according to the third embodiment of the present disclosure.

Processing of the position detector 1B according to the present embodiment will be described with reference to FIG. 12.

The alternating magnetic field generating section 111 generates the alternating magnetic field by using, for example, the plurality of conducting wires arranged in parallel with each other in the first direction of the sensor (for example, the TX sensor coil group (first sensor coil group) 100) a predetermined number of times, while changing the positions of the alternating magnetic field in the first direction (for example, the direction in which the TX sensor coil group (first sensor coil group) 100 are arranged in parallel with each other) (step S310).

The global scanning section 112, for example, obtains the level of the pen signal which the pen, having stored the alternating magnetic field, generates as the response alternating magnetic field, for the predetermined number of times (step S320).

The scanning start position determining section 113 determines on the basis of a detection result of the global scanning section 112 that one conducting wire corresponding to a highest level of the signal from the pen among the plurality of conducting wires arranged in parallel with each other in the first direction of the sensor (for example, the direction in which the TX sensor coil group (first sensor coil group) 100 are arranged in parallel with each other) is set as a start position (step S330).

The scanning pattern control section 114, for example, sets the scanning pattern such that scanning order is determined to select a conducting wire, which is adjacent to a previously scanned conducting wire corresponding to a highest level of the signal from the pen.

In addition, the scanning pattern control section 114, for example, sets the scanning pattern such that the scanning order is determined to select a conducting wire, which is adjacent to a previously scanned conducting wire corresponding to a highest level of the signal from the pen, and to sequentially select conducting wires while skipping the previously scanned conducting wire(s) (step S340).

Functions and Effects

As described above, the position detector 1B according to the present embodiment generates the alternating magnetic field by using the plurality of conducting wires arranged in parallel with each other in the first direction of the sensor (for example, the TX sensor coil group (first sensor coil group) 100) a predetermined number of times, while changing the position of the alternating magnetic field in the first direction, obtains the level of the pen signal which the pen, having stored the alternating magnetic field, generates as the response alternating magnetic field, for the predetermined number of times, and determines the next order of scanning the predetermined number of times such that one conducting wire corresponding to a highest level of the signal from the pen, among the plurality of conducting wires arranged in parallel with each other in the first direction of the sensor, is set as a start position.

That is, the position detector 1B performs global scanning by the global scanning section 112, and determines the next order of scanning the predetermined number of times such that one conducting wire corresponding to a highest level of the signal from the pen, among the plurality of conducting wires arranged in parallel with each other in the first direction of the sensor, is set as a start position.

This is based on insight that when obtaining the position information of a fast-moving pen, any delay in driving the sensor would cause jitter in the obtained data.

Specifically, it is known that when writing or drawing is performed by the pen at high speed, coordinate accuracy is degraded, and a drawn line becomes wavy, for example.

On the other hand, information that is important in the coordinate calculation is data corresponding to a highest signal strength immediately below the pen, and data more distant therefrom is less involved in the coordinate calculation.

Therefore, by determining the next order of scanning the predetermined number of times such that one conducting wire corresponding to a highest level of the signal from the pen, among the plurality of conducting wires arranged in parallel with each other in the first direction of the sensor is set as a start position, it becomes possible to improve the accuracy of deriving the coordinates even in a case where writing or drawing is performed by the pen at high speed and the pen is inclined in an oblique direction.

Figure 13A:
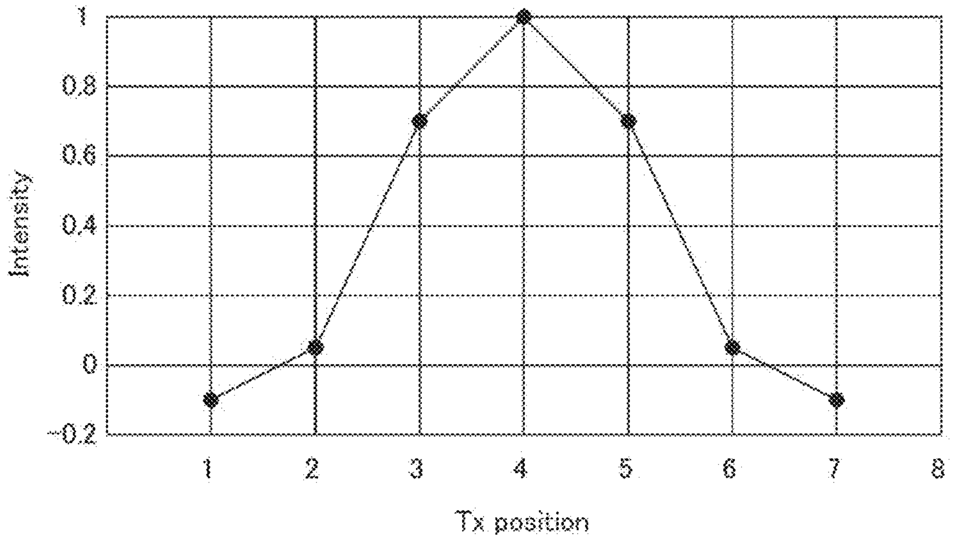
FIG. 13A is a diagram illustrating an ideal distribution of pen signal levels.
Figure 13B:
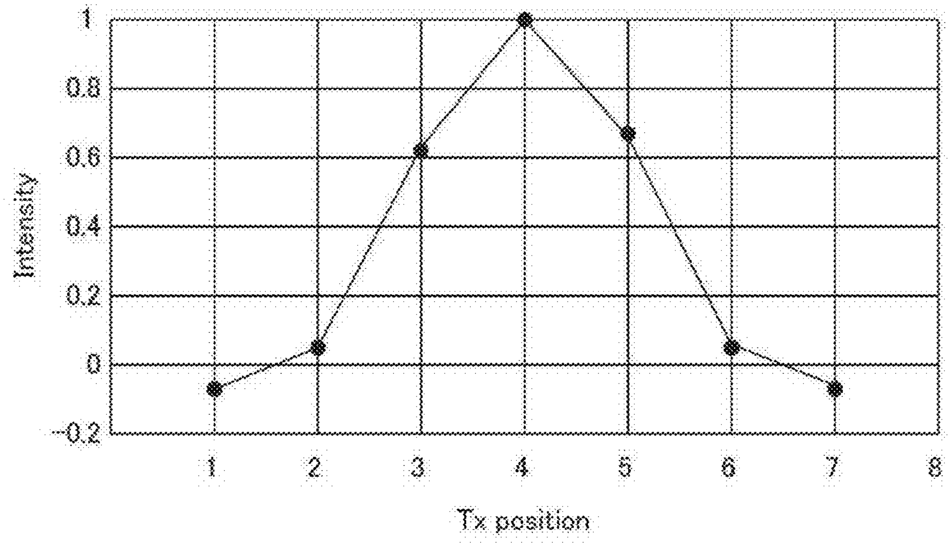
FIG. 13B is a diagram illustrating a distribution of pen signal levels obtained in the position detector according to the third embodiment of the present disclosure.

FIG. 13A is a diagram illustrating an ideal distribution of pen signal levels. FIG. 13B is a diagram illustrating a distribution of pen signal levels obtained in the position detector 1B according to the present embodiment.

As is understood from these figures, the distribution of the pen signal levels obtained in the position detector 1B according to the present embodiment represents a result comparable to the ideal distribution of the pen signal levels.

The position detector 1B according to the present embodiment determines the scanning order so as to select a conducting wire, which is adjacent to a previously scanned conducting wire corresponding to a highest level of the signal from the pen.

As described above, information important in the coordinate calculation is data corresponding to a highest signal strength immediately below the pen, and data more distant therefrom is less involved in the coordinate calculation.

Therefore, by adopting the scanning pattern such that scanning is performed in order from a conducting wire closest to the pen, it is possible to reduce jitter in data important in the coordinate calculation, and consequently to suppress degradation in the coordinate accuracy.

FIG. 13A is a diagram illustrating an ideal distribution of pen signal levels. FIG. 13B is a diagram illustrating a distribution of pen signal levels obtained in the position detector 1B according to the present embodiment.

As is understood from these figures, the distribution of the pen signal levels obtained in the position detector 1B according to the present embodiment represents a result comparable to the ideal distribution of the pen signal levels.

The position detector 1B according to the present embodiment determines the scanning order to select a conducting wire, which is adjacent to a previously scanned conducting wire corresponding to a highest level of the signal from the pen, and to sequentially select conductive wires while skipping the previously scanned conducting wire(s).

As described above, information important in the coordinate calculation is data corresponding to a highest signal strength immediately below the pen, and data more distant therefrom is less involved in the coordinate calculation.

Therefore, by determining the scanning order to select a conducting wire, which is adjacent to a previously selected conducting wire corresponding to a highest level of the signal from the pen, and to sequentially select conductive wires while skipping the previously scanned conducting wire(s), it becomes possible to reduce jitter in data important in the coordinate calculation and to consequently suppress degradation in the coordinate accuracy.

FIG. 13A is a diagram illustrating an ideal distribution of pen signal levels. FIG. 13B is a diagram illustrating a distribution of pen signal levels obtained in the position detector 1B according to the present embodiment.

As is understand from these figures, the distribution of the pen signal levels obtained in the position detector 1B according to the present embodiment represents a result comparable to the ideal distribution of the pen signal levels.

Second Modification

Figure 34:
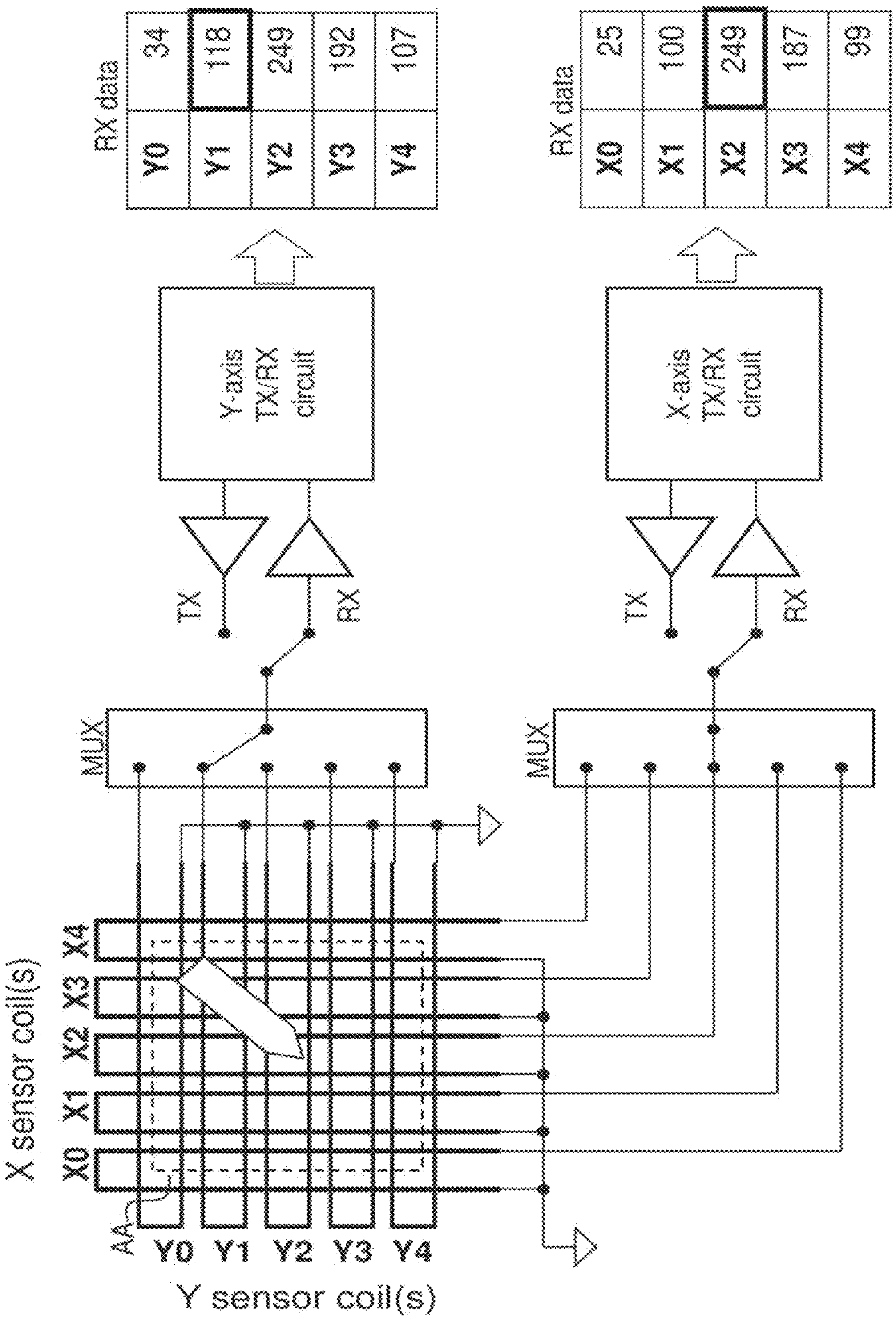
FIG. 34 is a conceptual diagram illustrating a coordinate deriving operation of a position detector according to a conventional example.

While the foregoing third embodiment has been described using the position detector 1B as an example, the third embodiment can be applied also in the conventional position detecting device illustrated in FIG. 34, for example.

Fourth Embodiment

A position detector 1C according to the present embodiment will be described with reference to FIGS. 1 and 14 to 17.

Configuration of Position Detector 1C

The position detector 1C includes a TX circuit 10B, a switch 11, a TX sensor coil group (first sensor coil group) 100, an RX sensor coil group (second sensor coil group) 200, an RX circuit 20, and a peripheral circuit such as an amplifier.

Thus, the position detector 1C differs from the position detector 1B in terms of the function of the TX circuit 10B, as described below.

Incidentally, constituent elements identified by the same reference numerals as in the first to third embodiments have similar functions, and therefore, a detailed description thereof will be omitted.

Configuration of TX Circuit 10B

Figure 14:
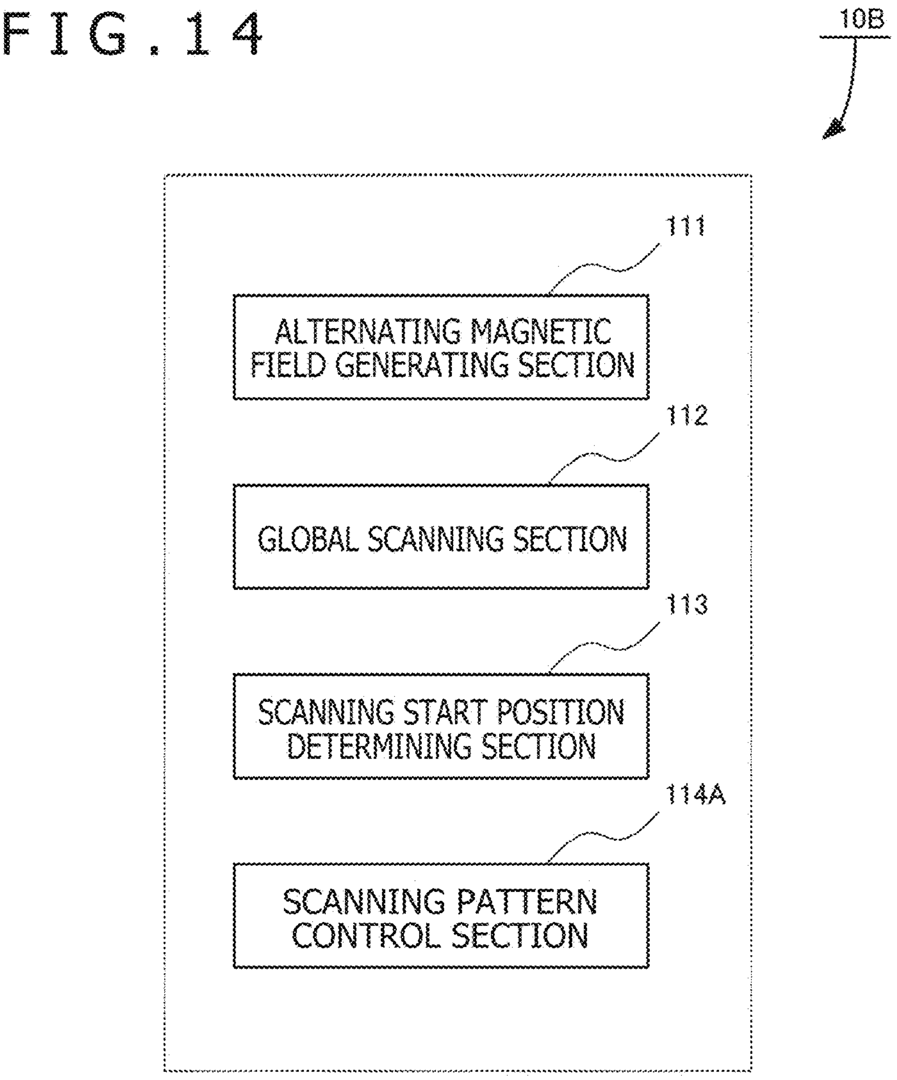
FIG. 14 is a diagram illustrating a configuration of a TX circuit in a position detector according to a fourth embodiment of the present disclosure.

As illustrated in FIG. 14, the TX circuit 10B includes an alternating magnetic field generating section 111, a global scanning section 112, a scanning start position determining section 113, and a scanning pattern control section 114A.

Incidentally, constituent elements identified by the same reference numerals as in the third embodiment have similar functions, and therefore, a detailed description thereof will be omitted.

The scanning pattern control section 114A determines a scanning pattern on the basis of scanning start position information, and controls output timing of the TX signal in the alternating magnetic field generating section 111 and switching timing of the switch 11 on the basis of the scanning pattern.

Specifically, for example, the scanning pattern control section 114A sets the scanning pattern such that scanning order is determined to select a conducting wire, which is adjacent to a previously scanned conducting wire corresponding to a highest level of the signal from the pen.

Figure 15:
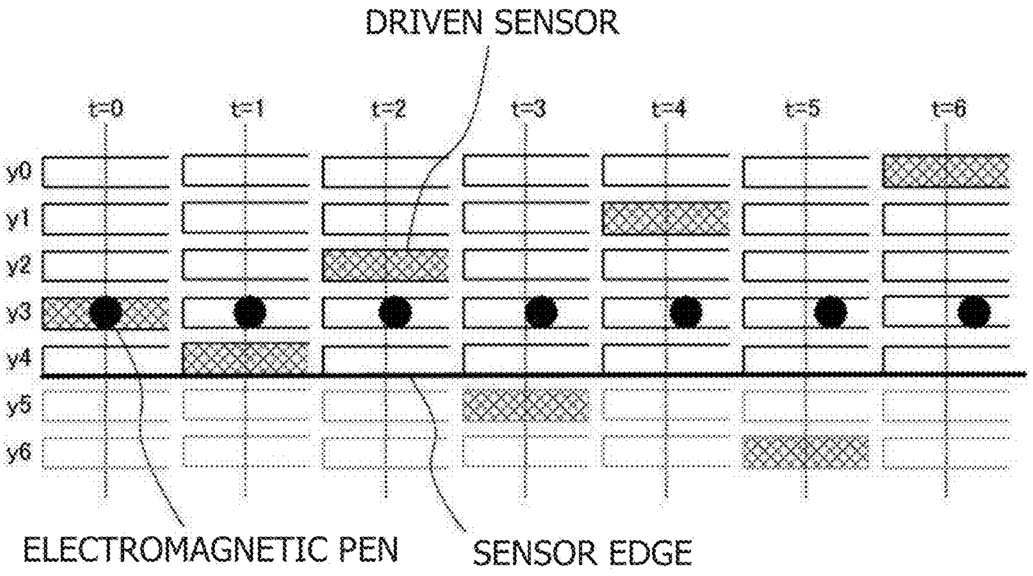
FIG. 15 is a diagram illustrating a scanning pattern in the TX circuit of the position detector according to the fourth embodiment of the present disclosure.

In addition, as illustrated in FIG. 15, for example, the scanning pattern control section 114A sets the scanning pattern such that the scanning order is determined to select a conducting wire, which is adjacent to a previously scanned conducting wire corresponding to a highest level of the signal from the pen, and to sequentially select conducting wires while skipping the previously scanned conducting wire(s).

In the present embodiment, as illustrated in FIG. 15, for example, in a case where a scanning region exceeds an arrangement region of the plurality of conducting wires arranged in parallel with each other in the first direction of the sensor, the scanning pattern control section 114A extends the scanning region to a region beyond the arrangement region (for example, y5 and y6 in FIG. 15).

Processing of Position Detector 1C

Figure 16:
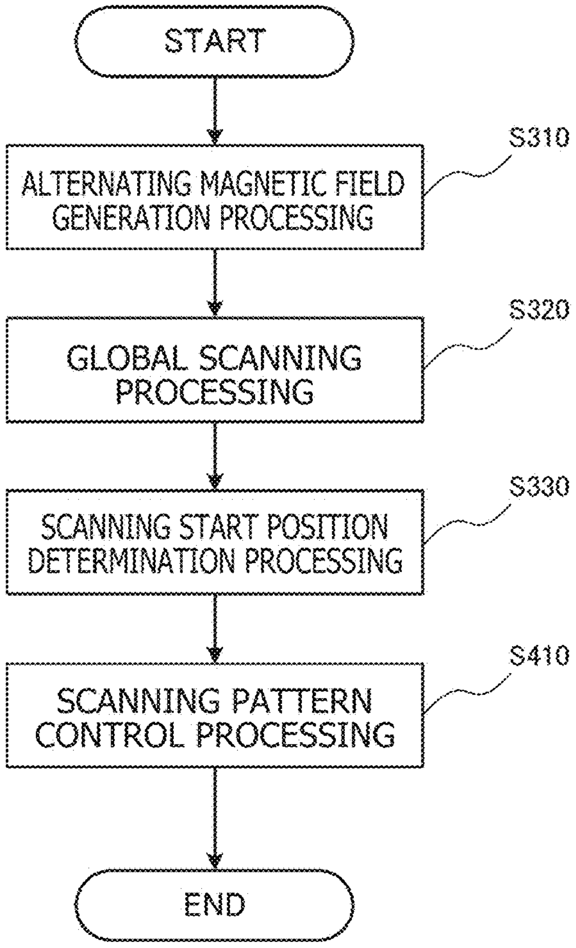
FIG. 16 is a diagram illustrating coordinate derivation processing of the position detector according to the fourth embodiment of the present disclosure.

Processing of the position detector 1C according to the present embodiment will be described with reference to FIG. 16.

The alternating magnetic field generating section 111 generates the alternating magnetic field by using, for example, the plurality of conducting wires arranged in parallel with each other in the first direction of the sensor (for example, the TX sensor coil group (first sensor coil group) 100) a predetermined number of times, while changing the positions of the alternating magnetic field in the first direction (for example, the direction in which the TX sensor coil group (first sensor coil group) 100 are arranged in parallel with each other) (step S310).

The global scanning section 112, for example, obtains the level of the pen signal which the pen, having stored the alternating magnetic field, generates as the response alternating magnetic field, for the predetermined number of times (step S320).

The scanning start position determining section 113 determines on the basis of a detection result of the global scanning section 112 that one conducting wire corresponding to a highest level of the signal from the pen, among the plurality of conducting wires arranged in parallel with each other in the first direction of the sensor (for example, the direction in which the TX sensor coil group (first sensor coil group) 100 are arranged in parallel with each other),, is set as a start position (step S330).

The scanning pattern control section 114A, for example, sets the scanning pattern such that the scanning order is determined to select a conducting wire, which is adjacent to a previously scanned conducting wire corresponding to a highest level of the signal from the pen.

In addition, the scanning pattern control section 114A, for example, sets the scanning pattern such that the scanning order is determined to select a conducting wire, which is adjacent to a previously scanned conducting wire corresponding to a highest level of the signal from the pen, and to sequentially select conducting wires while skipping the previously scanned conducting wire(s).

In addition, in a case where the scanning region exceeds the arrangement region of the plurality of conducting wires arranged in parallel with each other in the first direction of the sensor, for example, the scanning pattern control section 114A extends the scanning region to a region beyond the arrangement region, and causes scanning to be performed (step S410).

Functions and Effects

As described above, in a case where the scanning region exceeds the arrangement region of the plurality of conducting wires arranged in parallel with each other in the first direction of the sensor (for example, the TX sensor coil group (first sensor coil group) 100), the position detector 1C according to the present embodiment extends the scanning region to a region beyond the arrangement region (for example, y5 and y6 in FIG. 15).

That is, the position detector 1C performs global scanning by the global scanning section 112, and determines the next order of scanning the predetermined number of times such that one conducting wire corresponding to a highest level of the signal from the pen, among the plurality of conducting wires arranged in parallel with each other in the first direction of the sensor, is set as a start position.

This is based on insight that when obtaining the position information of a pen moving at a fast speed, any delay in driving the sensor would cause jitter in the obtained data.

Specifically, it is known that when writing or drawing is performed by the pen at high speed, coordinate accuracy is degraded, and a drawn line becomes wavy, for example.

On the other hand, information that is important in the coordinate calculation is data corresponding to a highest signal strength immediately below the pen, and data more distant therefrom is less involved in the coordinate calculation.

Therefore, by determining the next order of scanning the predetermined number of times such that one conducting wire corresponding to a highest level of the signal from the pen, among the plurality of conducting wires arranged in parallel with each other in the first direction of the sensor, is set as a start position, it becomes possible to improve the accuracy of deriving the coordinates even in a case where writing or drawing is performed by the pen at high speed and the pen is inclined in an oblique direction.

Meanwhile, in a case where the scanning region exceeds the arrangement region of the plurality of conducting wires arranged in parallel with each other in the first direction of the sensor (for example, the TX sensor coil group (first sensor coil group) 100), the position detector 1C extends the scanning region to a region beyond the arrangement region (for example, y5 and y6 in FIG. 15), and causes scanning to be performed.

The above-described scanning method cannot obtain data of low signal strength but can capture data of high signal strength, and can therefore improve the accuracy of deriving the coordinates as compared with the conventional method even in a case where the pen is inclined in an oblique direction.

Figure 17A:
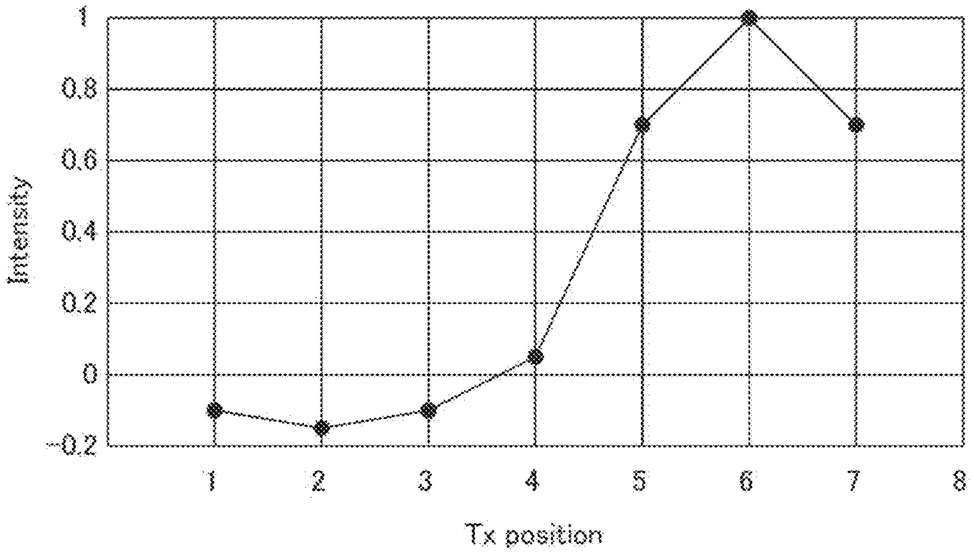
FIG. 17A is a diagram illustrating an ideal distribution of pen signal levels.
Figure 17B:
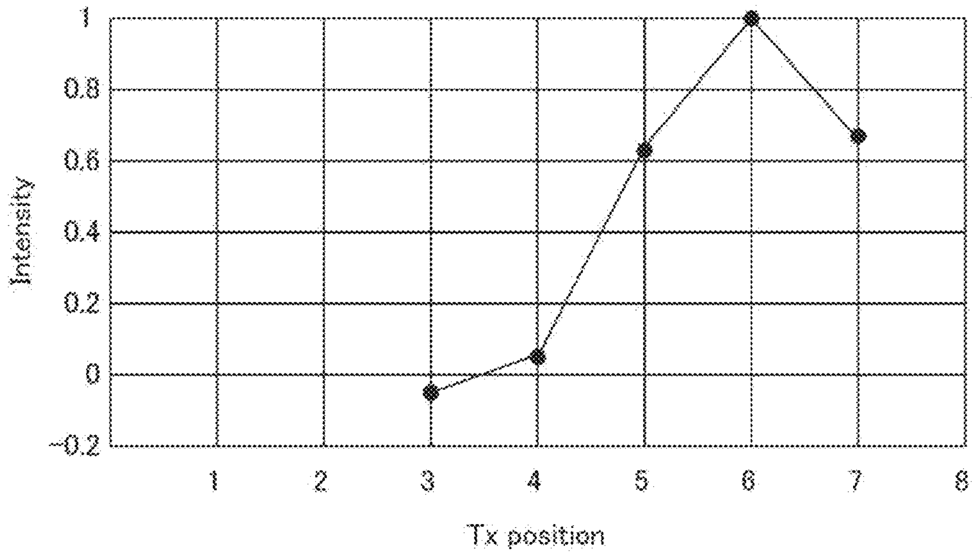
FIG. 17B is a diagram illustrating a distribution of pen signal levels obtained in the position detector according to the fourth embodiment of the present disclosure.

FIG. 17A is a diagram illustrating an ideal distribution of pen signal levels. FIG. 17B is a diagram illustrating a distribution of pen signal levels obtained in the position detector 1C according to the present embodiment.

As is understood from these figures, the distribution of the pen signal levels obtained in the position detector 1C according to the present embodiment represents a result comparable to the ideal distribution of the pen signal levels with regard to data of high signal strength.

Third Modification

While the foregoing fourth embodiment has been described using the position detector 1C as an example, the fourth embodiment can be applied also in the conventional position detecting device illustrated in FIG. 34, for example.

Fourth Modification

In the foregoing fourth embodiment, as illustrated in FIG. 15, in a case where the scanning region exceeds the arrangement region of the plurality of conducting wires arranged in parallel with each other in the first direction of the sensor, the scanning region is extended to a region beyond the arrangement region (for example, y5 and y6 in FIG. 15). Specifically, for example, at y5 and y6 in FIG. 15, dummies may be provided in advance, or y1 and y3 may be reused therefor, or the processing may be skipped.

In the case of the replacement with dummies or reuse, accuracy may be higher than in the case of skipping the processing. When there are a small number of conducting wires beyond the arrangement region, the skipping of the processing can increase processing speed while maintaining the accuracy to a certain degree.

Fifth Embodiment

A position detector 1D according to the present embodiment will be described with reference to FIGS. 1 and 18 to 21.

Configuration of Position Detector 1D

The position detector 1D includes a TX circuit 10C, a switch 11, a TX sensor coil group (first sensor coil group) 100, an RX sensor coil group (second sensor coil group) 200, an RX circuit 20, and a peripheral circuit such as an amplifier.

Thus, the position detector 1D differs from the position detector 1C in terms of the function of the TX circuit 10C, as described below.

Incidentally, constituent elements identified by the same reference numerals as in the first to fourth embodiments have similar functions, and therefore, a detailed description thereof will be omitted.

Configuration of TX Circuit 10*c*

Figure 18:
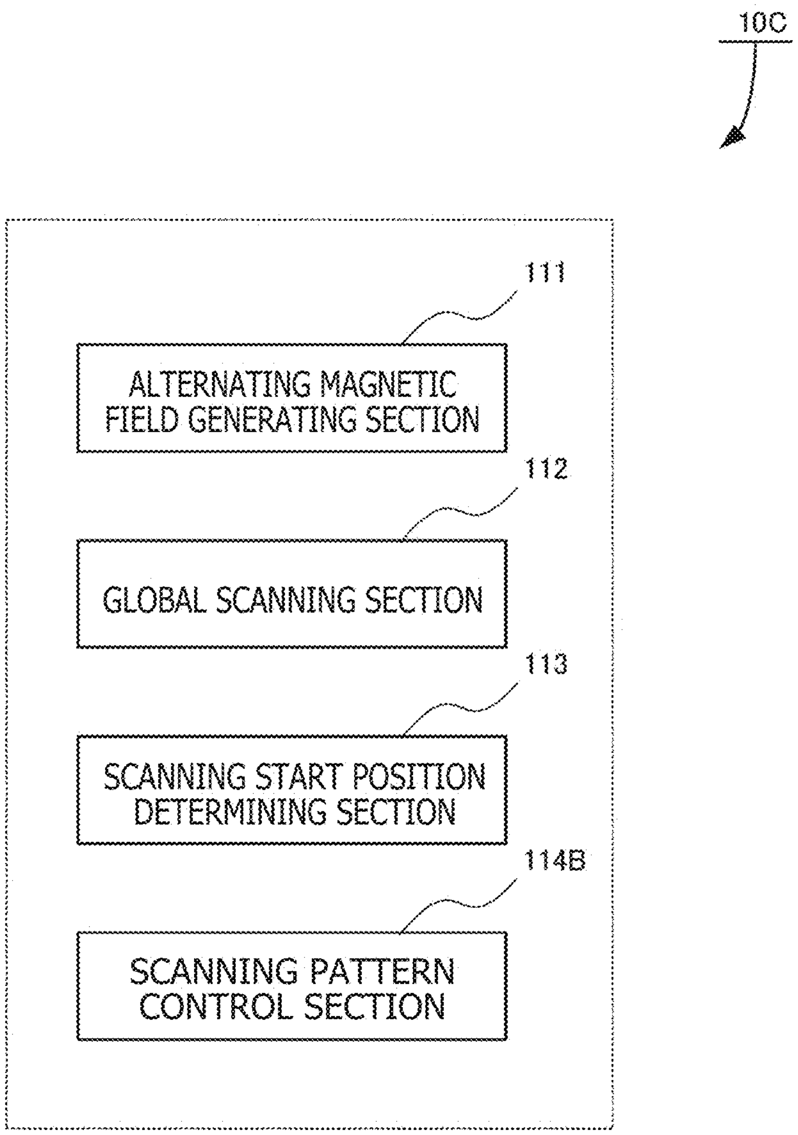
FIG. 18 is a diagram illustrating a configuration of a TX circuit in a position detector according to a fifth embodiment of the present disclosure.

As illustrated in FIG. 18, the TX circuit 10C includes an alternating magnetic field generating section 111, a global scanning section 112, a scanning start position determining section 113, and a scanning pattern control section 114B.

Incidentally, constituent elements identified by the same reference numerals as in the third embodiment and the fourth embodiment have similar functions, and therefore, a detailed description thereof will be omitted.

The scanning pattern control section 114B determines a scanning pattern on the basis of scanning start position information, and controls output timing of the TX signal in the alternating magnetic field generating section 111 and switching timing of the switch 11 on the basis of the scanning pattern.

Specifically, for example, the scanning pattern control section 114B sets the scanning pattern such that the scanning order is determined to select a conducting wire, which is adjacent to a previously scanned conducting wire corresponding to a highest level of the signal from the pen.

Figure 19:
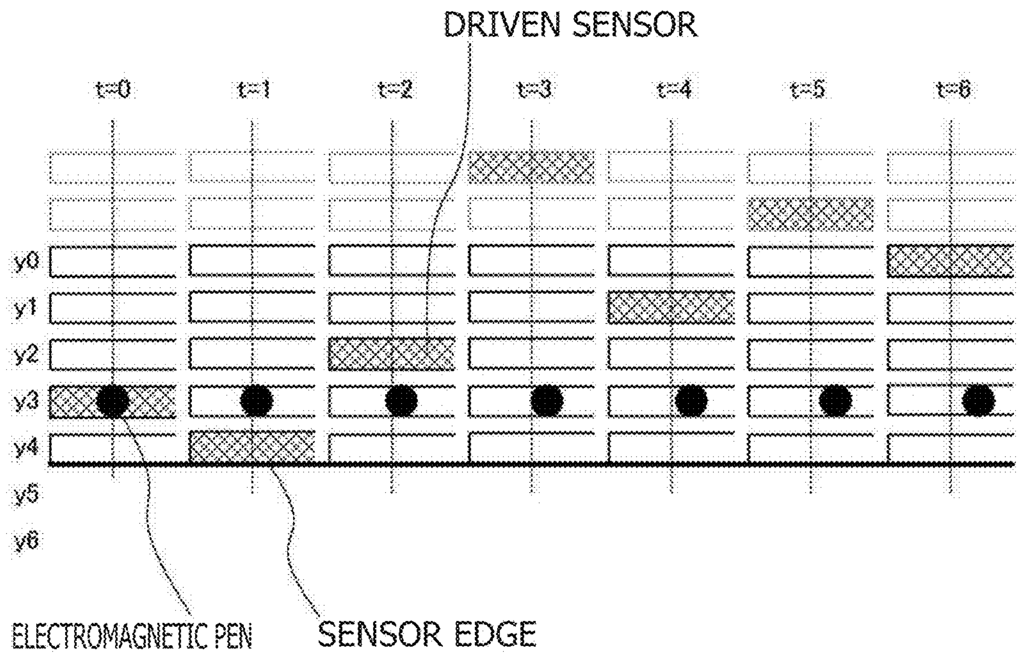
FIG. 19 is a diagram illustrating a scanning pattern in the TX circuit of the position detector according to the fifth embodiment of the present disclosure.

In addition, as illustrated in FIG. 19, for example, the scanning pattern control section 114B sets the scanning pattern such that the scanning order is determined to select a conducting wire, which is adjacent to a previously scanned conducting wire corresponding to a highest level of the signal from the pen, and to sequentially select conducting wires while skipping the previously scanned conducting wire(s).

In the present embodiment, as illustrated in FIG. 19, for example, in a case where the scanning region exceeds the arrangement region of the plurality of conducting wires arranged in parallel with each other in the first direction of the sensor, the scanning pattern control section 114B extends the scanning region exceeding the arrangement region to a region on an opposite side from the sensor edge (an end of the arrangement region).

Processing of Position Detector 1D

Figure 20:
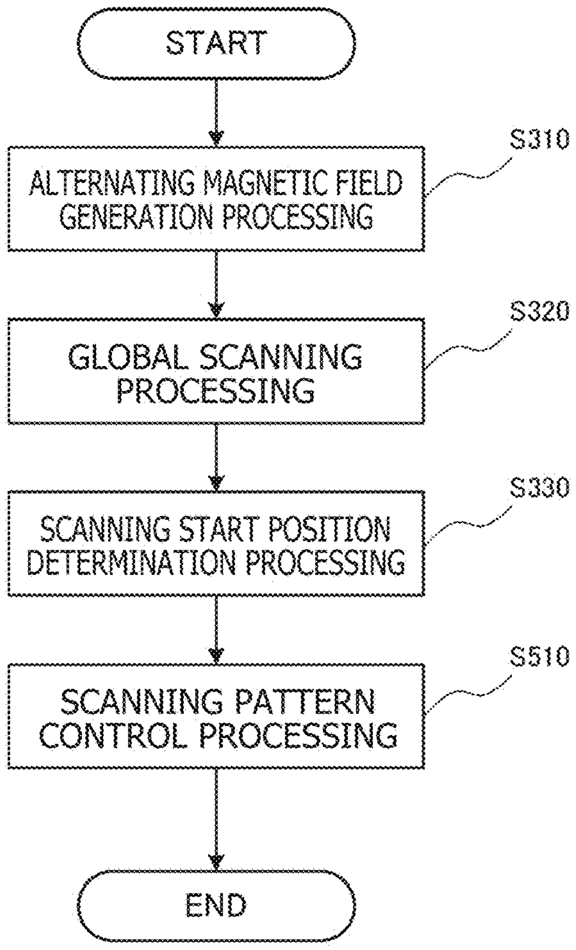
FIG. 20 is a diagram illustrating coordinate derivation processing of the position detector according to the fifth embodiment of the present disclosure.

Processing of the position detector 1D according to the present embodiment will be described with reference to FIG. 20.

The alternating magnetic field generating section 111 generates the alternating magnetic field by using, for example, the plurality of conducting wires arranged in parallel with each other in the first direction of the sensor (for example, the TX sensor coil group (first sensor coil group) 100) a predetermined number of times, while changing the positions of the alternating magnetic field in the first direction (for example, the direction in which the TX sensor coil group (first sensor coil group) 100 are arranged in parallel with each other) (step S310).

The global scanning section 112, for example, obtains the level of the pen signal which the pen, having stored the alternating magnetic field, generates as the response alternating magnetic field, for the predetermined number of times (step S320).

The scanning start position determining section 113 determines on the basis of a detection result of the global scanning section 112 that one conducting wire corresponding to a highest level of the signal from the pen, among the plurality of conducting wires arranged in parallel with each other in the first direction of the sensor (for example, the direction in which the TX sensor coil group (first sensor coil group) 100 are arranged in parallel with each other), is set as a start position (step S330).

The scanning pattern control section 114B, for example, sets the scanning pattern such that the scanning order is determined so as to select a conducting wire, which is adjacent to a previously scanned conducting wire corresponding to a highest level of the signal from the pen.

In addition, the scanning pattern control section 114B, for example, sets the scanning pattern such that the scanning order is determined to select a conducting wire, which is adjacent to a previously scanned conducting wire corresponding to a highest level of the signal from the pen, and to sequentially select conducting wires while skipping the previously scanned conducting wire(s).

In addition, in a case where the scanning region exceeds the arrangement region of the plurality of conducting wires arranged in parallel with each other in the first direction of the sensor, for example, the scanning pattern control section 114B extends the scanning region exceeding the arrangement region to a region on an opposite side from an end (edge) of the arrangement region, and causes scanning to be performed (step S510).

Functions and Effects

As described above, in a case where the scanning region exceeds the arrangement region of the plurality of conducting wires arranged in parallel with each other in the first direction of the sensor (for example, the TX sensor coil group (first sensor coil group) 100), the position detector 1D according to the present embodiment extends the scanning region as a region exceeding the arrangement region to a region on an opposite side from an end (edge) of the arrangement region.

That is, the position detector 1D performs global scanning by the global scanning section 112, and determines the next order of scanning the predetermined number of times such that one conducting wire corresponding to a highest level of the signal from the pen, among the plurality of conducting wires arranged in parallel with each other in the first direction of the senso, is set as a start position.

This is based on insight that when obtaining the position information of a fast-moving pen, any delay in driving the sensor would cause jitter in the obtained data.

Specifically, it is known that when writing or drawing is performed by the pen at high speed, coordinate accuracy is degraded, and a drawn line becomes wavy, for example.

On the other hand, information that is important in the coordinate calculation is data corresponding to a highest signal strength immediately below the pen, and data more distant therefrom is less involved in the coordinate calculation.

Therefore, by determining the next order of scanning the predetermined number of times such that one conducting wire corresponding to a highest level of the signal from the pen, among the plurality of conducting wires arranged in parallel with each other in the first direction of the sensor, is set as a start position, it becomes possible to improve the accuracy of deriving the coordinates even in a case where writing or drawing is performed by the pen at high speed and the pen is inclined in an oblique direction.

Meanwhile, in a case where the scanning region exceeds the arrangement region of the plurality of conducting wires arranged in parallel with each other in the first direction of the sensor (for example, the TX sensor coil group (first sensor coil group) 100), the position detector 1D extends the scanning region as a region exceeding the arrangement region to a region on an opposite side from an end (edge) of the arrangement region, and causes scanning to be performed.

The above-described scanning method can obtain data of low signal strength that cannot be captured in the third embodiment.

Here, the data of low signal strength may affect the accuracy of tilt correction.

However, the position detector 1D according to the present embodiment can obtain the data of low signal strength that cannot be captured in the third embodiment, so that the accuracy of deriving the coordinates can be improved even when the pen is inclined in an oblique direction.

Figure 21A:
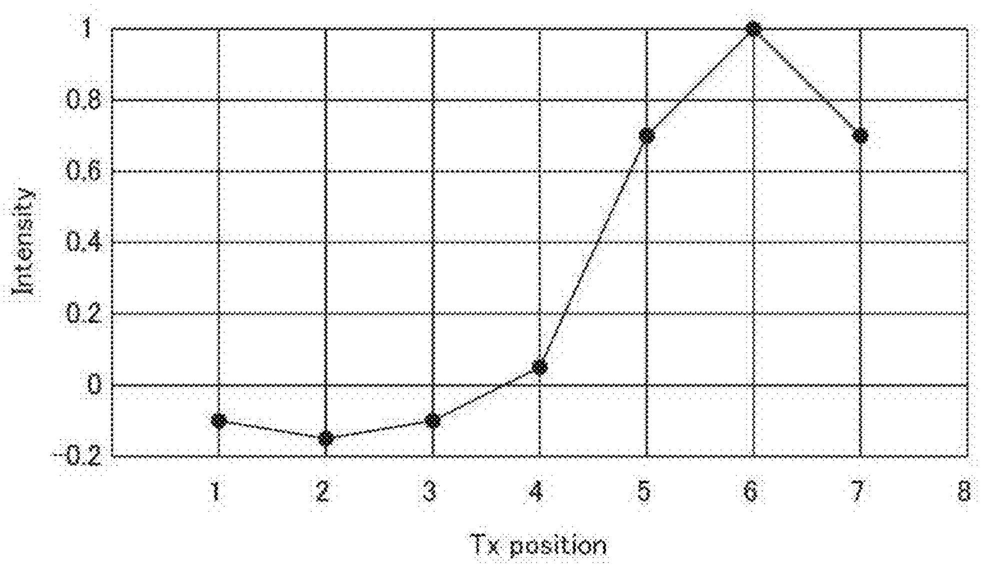
FIG. 21A is a diagram illustrating an ideal distribution of pen signal levels.
Figure 21B:
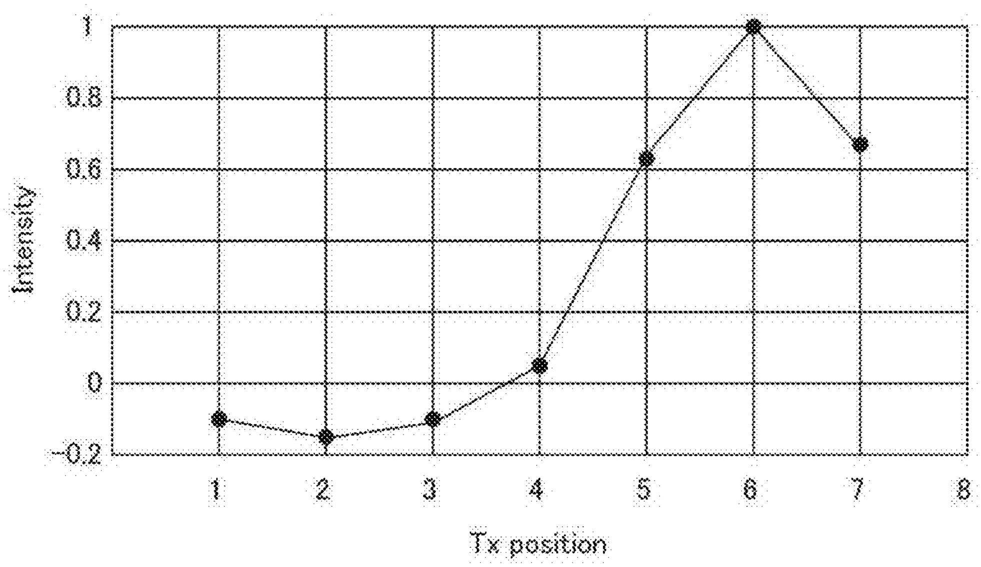
FIG. 21B is a diagram illustrating a distribution of pen signal levels obtained in the position detector according to the fifth embodiment of the present disclosure.

FIG. 21A is a diagram illustrating an ideal distribution of pen signal levels. FIG. 21B is a diagram illustrating a distribution of pen signal levels obtained in the position detector 1D according to the present embodiment.

As is understood from these figures, the distribution of the pen signal levels obtained in the position detector 1D according to the present embodiment represents a result comparable to the ideal distribution of the pen signal levels.

Fifth Modification

While the foregoing fifth embodiment has been described using the position detector 1D as an example, the fifth embodiment can be applied also in the conventional position detecting device illustrated in FIG. 34, for example.

Sixth Embodiment

A position detector 1E according to the present embodiment will be described with reference to FIGS. 1 and 22A to 29.

Stack Configuration

FIGS. 22A to 22F are diagrams illustrating examples of stack configuration in a case where the position detector 1E, a touch sensor for detecting a finger or the like by a capacitance (self-capacitance or mutual capacitance) system, and a display device are combined with one another (or incorporated).

In the figures, an upper side in the figures is a side closer to the pen, and a lower side is a side distant from the pen.

In the examples of the figures, a sheet formed of a material having predetermined magnetic permeability to enhance the pen signal strength may be provided on a further lower side of a lowermost layer.

Figure 22A:
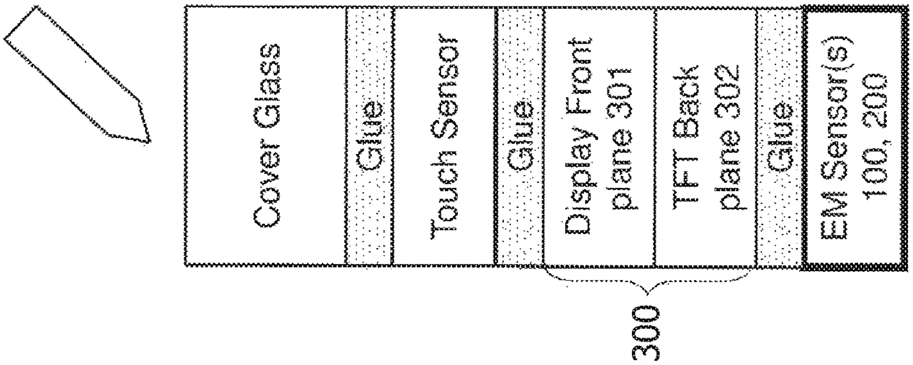
FIG. 22A is a diagram illustrating a conventional stack configuration in a case where a position detector, a touch sensor for detecting a finger or the like by using a capacitance (self-capacitance or mutual capacitance) system, and a display device are combined with one another (or incorporated)

FIG. 22A is a diagram of a conventional stack configuration.

A display 300 (including a display front plane layer 301 and a thin-film transistor (TFT) back plane layer 302) is provided, and a TX sensor coil group (first sensor coil group) 100 and a RX sensor coil group (second sensor coil group) 200 are provided to the lower side of the display 300 via a bonding layer.

A touch sensor is provided on the upper side of the display 300. A cover glass (including a cover film, the same applies hereinafter) with which the pen comes into contact is formed to be provided on the upper side of the touch sensor.

Figure 22B:
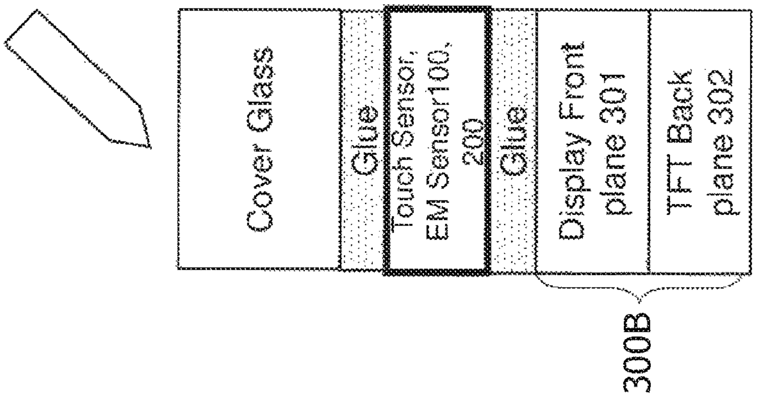
FIG. 22B is a diagram illustrating an example of a stack configuration in a case where the position detector according to the first to fifth embodiments of the present disclosure, a touch sensor for detecting a finger or the like by using the capacitance (self-capacitance or mutual capacitance) system, and a display device are combined with one another (or incorporated)

FIG. 22B is a diagram illustrating an example of another stack configuration.

A layer in which a capacitive type touch sensor is integrated with a TX sensor coil group (first sensor coil group) 100 and an RX sensor coil group (second sensor coil group) 200 is provided on the upper side of a display 300B. A cover glass is formed so as to be provided on the upper side of the layer.

Figure 22C:
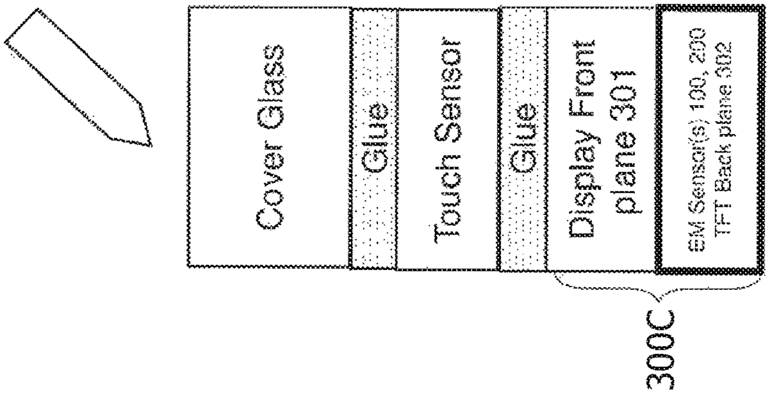
FIG. 22C is a diagram illustrating an example of a stack configuration in a case where the position detector according to the first to fifth embodiments of the present disclosure, a touch sensor for detecting a finger or the like by using the capacitance (self-capacitance or mutual capacitance) system, and a display device are combined with one another (or incorporated)
Figure 22D:
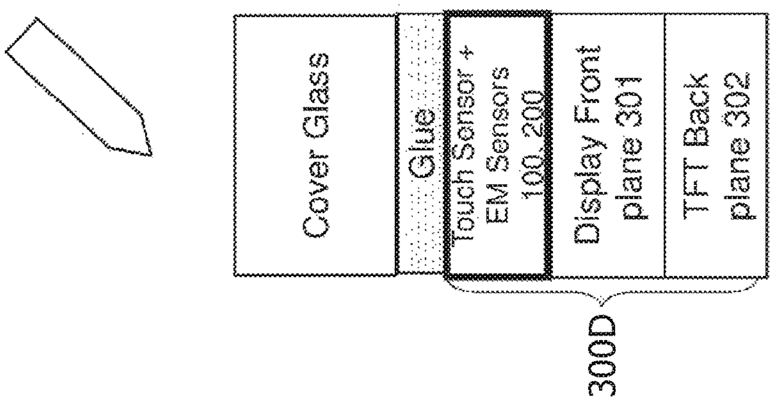
FIG. 22D is a diagram illustrating an example of a stack configuration in a case where the position detector according to the first to fifth embodiments of the present disclosure, a touch sensor for detecting a finger or the like by using the capacitance (self-capacitance or mutual capacitance) system, and a display device are combined with one another (or incorporated)

FIG. 22C and FIG. 22D relate to a configuration referred to as an in-cell type or an on-cell type, in which a touch sensor function is integrated with a part of the display 300.

FIG. 22C is based on a display configuration referred to as what is called an in-cell touch.

A display 300C is formed by integrating a TFT back plane layer 302 for controlling a display front plane layer 301 with a TX sensor coil group (first sensor coil group) 100 and an RX sensor coil group (second sensor coil group) 200.

A touch sensor is provided on the upper side of the display 300C. A cover glass is provided on the upper side of the touch sensor.

FIG. 22D is based on a display configuration referred to as what is called an on-cell touch.

A display 300D is provided with a TFT back plane layer 302 and a display front plane layer 301, the TFT back plane layer 302 controlling the front panel layer.

FIG. 22D represents what is called an on-cell touch panel configuration in which a capacitive type touch sensor is provided in a layer on the upper side of the display front plane layer 301 and within a module of the display 300D. A TX sensor coil group (first sensor coil group) 100 and an RX sensor coil group (second sensor coil group) 200 are formed so as to be integrated with the touch sensor.

Figure 22E:
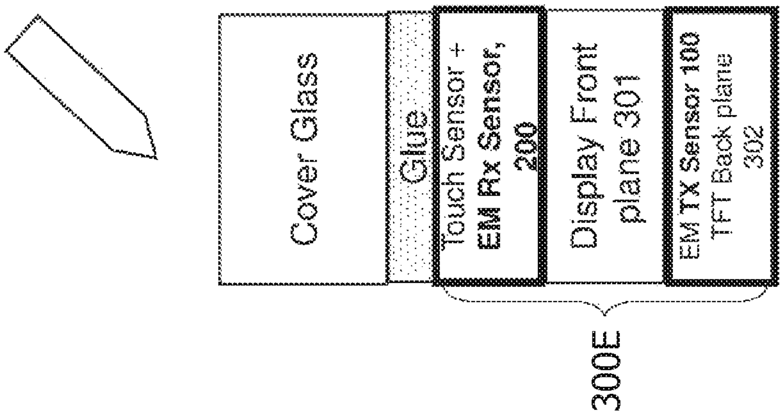
FIG. 22E is a diagram illustrating an example of a stack configuration in a case where the position detector according to the first to fifth embodiments of the present disclosure, a touch sensor for detecting a finger or the like by using the capacitance (self-capacitance or mutual capacitance) system, and a display device are combined with one another (or incorporated)
Figure 22F:
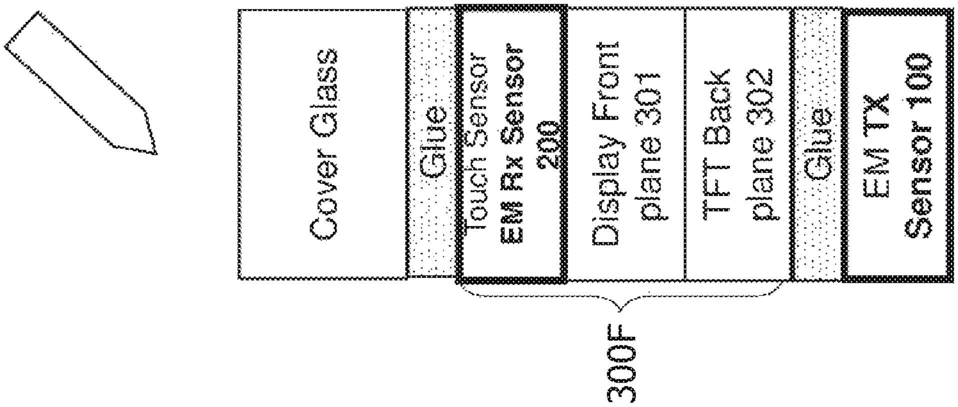
FIG. 22F is a diagram illustrating an example of a stack configuration in a case where the position detector according to the first to fifth embodiments of the present disclosure, a touch sensor for detecting a finger or the like by using the capacitance (self-capacitance or mutual capacitance) system, and a display device are combined with one another (or incorporated)

FIG. 22E and FIG. 22F have characteristics in that the TX sensor coil group (first sensor coil group) 100 and the RX sensor coil group (second sensor coil group) 200 are provided in different layers separated from each other.

In FIG. 22E, the TX sensor coil group (first sensor coil group) 100 is formed so as to be provided in a TFT back plane layer 302. The RX sensor coil group (second sensor coil group) 200 is provided in a layer, in which an on on-cell touch sensor (capacitive sensor) is provided, on the upper side of a display front plane layer 301. A cover glass is formed to be provided on the upper side of the layer.

In FIG. 22F, the TX sensor coil group (first sensor coil group) 100 is not provided in a TFT back plane layer 302, but the TX sensor coil group (first sensor coil group) 100 is provided on the lower side of a display 300F. The RX sensor coil group (second sensor coil group) 200 is provided in a layer, in which an on-cell touch sensor (capacitive sensor) is provided, on the upper side of a display front plane layer 301. A cover glass is formed to be provided on the upper side of the layer.

Details of TX Sensor Coil Group (First Sensor Coil Group) 100

Figure 23:
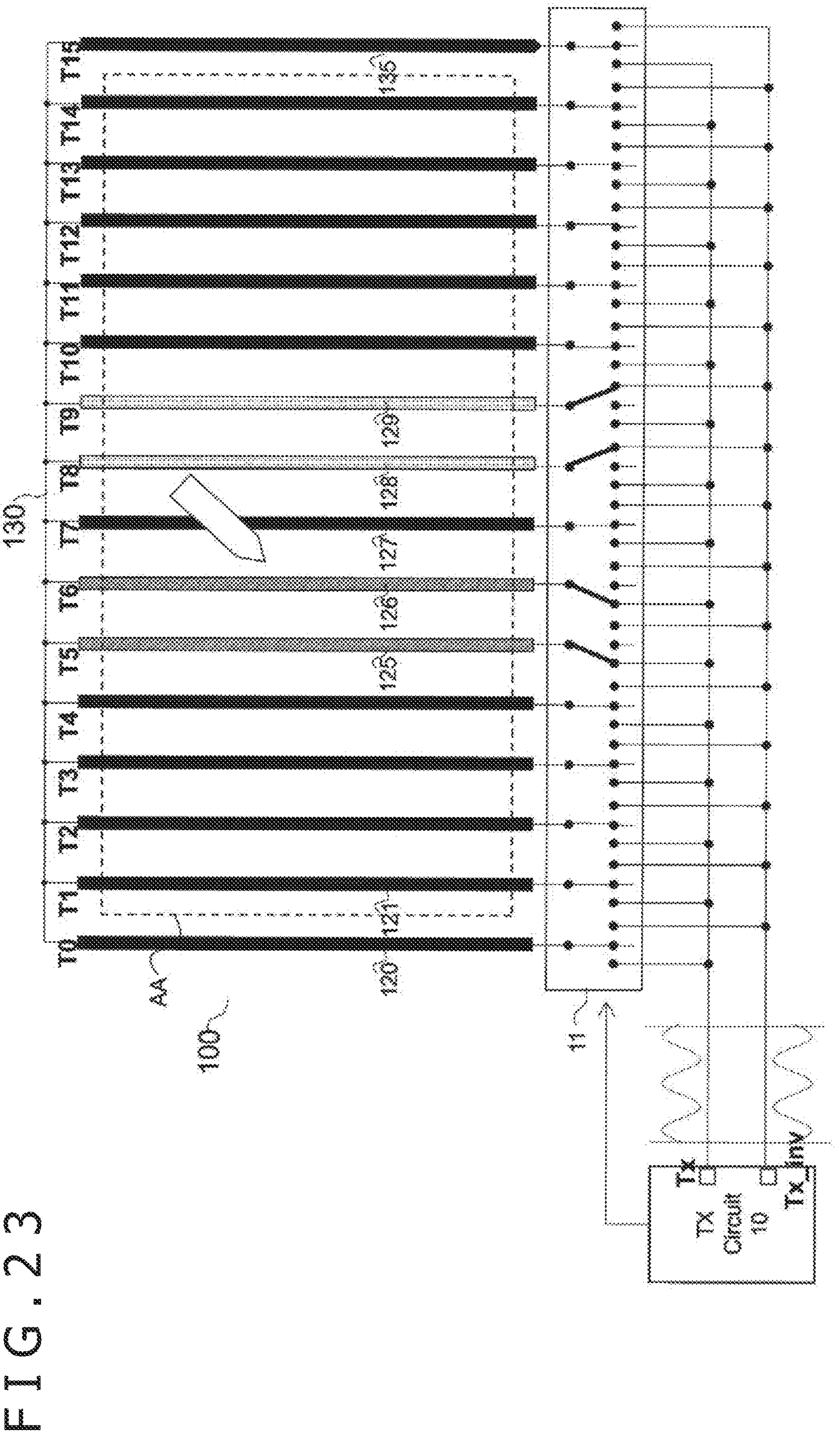
FIG. 23 is a diagram illustrating an example of a configuration of a TX sensor coil group in a position detector according to a sixth embodiment of the present disclosure.

FIG. 23 illustrates an example of a configuration of the TX sensor coil group (first sensor coil group) 100.

The configuration of the TX sensor coil group (first sensor coil group) 100 in the figure is effective in a case where the TX sensor coil group (first sensor coil group) 100 and the RX sensor coil group (second sensor coil group) 200 are provided in different layers separated from each other, and the TX sensor coil group (first sensor coil group) 100 is provided on the lower side of the display, as in FIG. 22F in particular.

The TX sensor coil group (first sensor coil group) 100 includes a TX electrode 120, . . . a TX electrode 135 respectively constituting TX sensor coils T0, T1, . . . T15 and a connecting conductor 130 that connects the TX electrode 120, . . . the TX electrode 135 to one another. The TX sensor coil group (first sensor coil group) 100 is formed in the form of a comb shape (SAW shape).

Here, the comb shape refers to a shape formed by a first wire and a plurality of second wires as described below.

The first wire is a wire extending in the first direction. The second wires are a plurality of wires extending in the second direction intersecting the first direction. The plurality of second wires are arranged side by side with each other at predetermined intervals in the first direction.

Further, the first wire and the plurality of second wires are electrically connected to each other.

Here, supposing for convenience that the plurality of second wires each has an end connected to the first wire as a terminal end, and another end as an open end, the terminal ends of the plurality of second wires are connected to the first wire while the other ends are open ends to thereby form a comb shape.

The open ends as the other ends of the plurality of second wires are connected to an integrated circuit to be used, for example, to supply a driving signal or detect a received signal.

The position detector 1E controls the switch 11 (S0, . . . S15) to, for example, bundle the TX electrode 128 and the TX electrode 129 and connect the TX electrode 128 and the TX electrode 129 to a TX_inv terminal of the TX circuit 10 while bundling the TX electrode 125 and the TX electrode 126 and connecting the TX electrode 125 and the TX electrode 126 to a TX terminal of the TX circuit 10.

The TX circuit 10 performs control such that current change amounts of the TX terminal and the TX_inv terminal are in opposite phase from each other. The TX circuit 10 thereby forms a strong transmission magnetic field between the bundle of the TX electrode 125 and the TX electrode 126 and the bundle of the TX electrode 128 and the TX electrode 129 (in the vicinity of the TX electrode 127) as compared with a case where no bundles are made and as compared with a case where TX_inv is set at a fixed potential.

Details of RX Sensor Coil Group (Second Sensor Coil Group) 200

Figure 24:
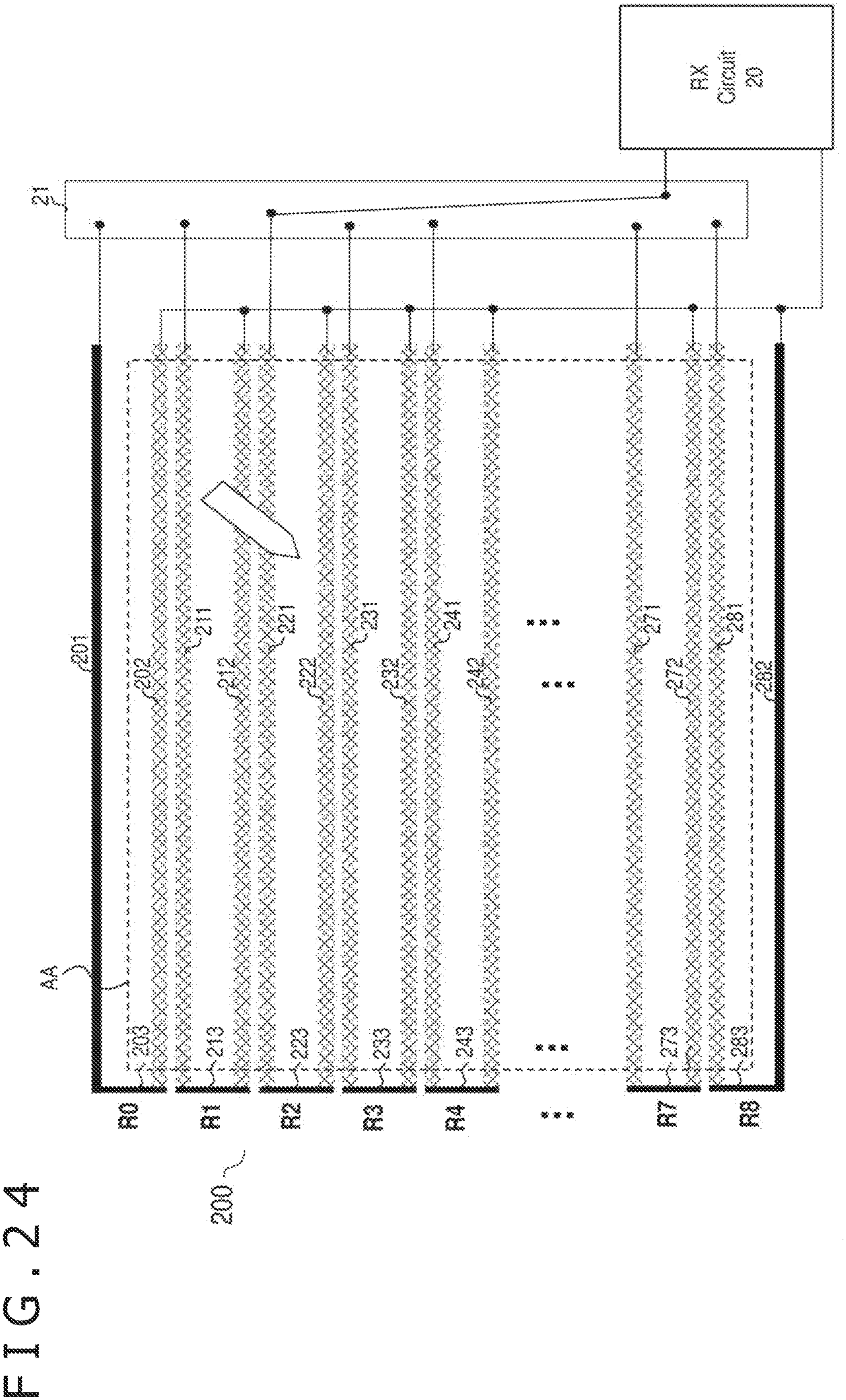
FIG. 24 is a diagram illustrating an example of a configuration of an RX sensor coil group in the position detector according to the sixth embodiment of the present disclosure.

FIG. 24 represents an example of a configuration of the RX sensor coil group (second sensor coil group) 200.

The RX sensor coil group (second sensor coil group) 200 in the figure is a sensor to be used on the upper side of the display (side closer to the pen), includes RX sensor coils R0 to R8, and has characteristics of (1) being substantially transparent within an active area AA, (2) being formed only on one side of a film, (3) having a gap between adjacent RX coil sensors without the adjacent RX coil sensors overlapping each other, and (4) being wound one turn (not wound a plurality of turns).

The RX sensor coil R0 located at an outermost position is constituted by an outside-AA long side portion 201 as an opaque metallic conductor disposed outside the active area AA, an AA long side portion 202 as a substantially transparent conductor (typically, a mesh conductor) disposed inside the active area AA, and a connecting conductor 203 as an opaque metallic conductor disposed outside the active area AA.

Similarly, the RX sensor coil R8 located at an outermost position is constituted by an outside-AA long side portion 282 as an opaque metallic conductor disposed outside the active area AA, an AA long side portion 281 as a substantially transparent conductor (typically, a mesh conductor) disposed inside the active area AA, and a connecting conductor 283 as an opaque metallic conductor disposed outside the active area AA.

The RX sensor coil R1 not located at an outermost position is constituted by an AA long side portion 211 as a substantially transparent conductor (typically, a mesh conductor) disposed inside the active area AA, an AA long side portion 212, and a connecting conductor 203 as an opaque metallic conductor disposed outside the active area AA to connect these AA long side portions to each other.

Similarly, the RX sensor coils R2, . . . R7 not located at an outermost position are also each constituted by two AA long side portions (221 and 222 or the like) as substantially transparent conductors (typically mesh conductors) disposed inside the active area AA and a connecting conductor (223 or the like) as an opaque metallic conductor disposed outside the active area AA to connect these AA long side portions to each other.

One end of each of the RX sensor coils of the RX sensor coil group (second sensor coil group) 200 is connected to the RX circuit 20 via the switch 21. Another end of each of the RX sensor coils is connected to a reference potential such as a GND.

In a case where a differential amplifier circuit is provided in the RX circuit 20, the one end and the other end of each of the RX sensor coils of the RX sensor coil group (second sensor coil group) 200 may be connected to the differential amplifier circuit.

Configuration of Integrated Sensor

FIGS. 25 to 29 are diagrams of assistance in explaining a configuration of the position detector 1E including an integrated sensor (Integrated/Universal Sensor Module) formed by integrating the TX sensor coil group (first sensor coil group) 100 and the RX sensor coil group (second sensor coil group) 200 with a touch sensor.

This configuration is useful to realize the stack configuration referred to as an on-cell touch, wherein the integrated sensor is provided on the upper side (pen side) of the display 300D as in FIG. 22D.

Figure 25:
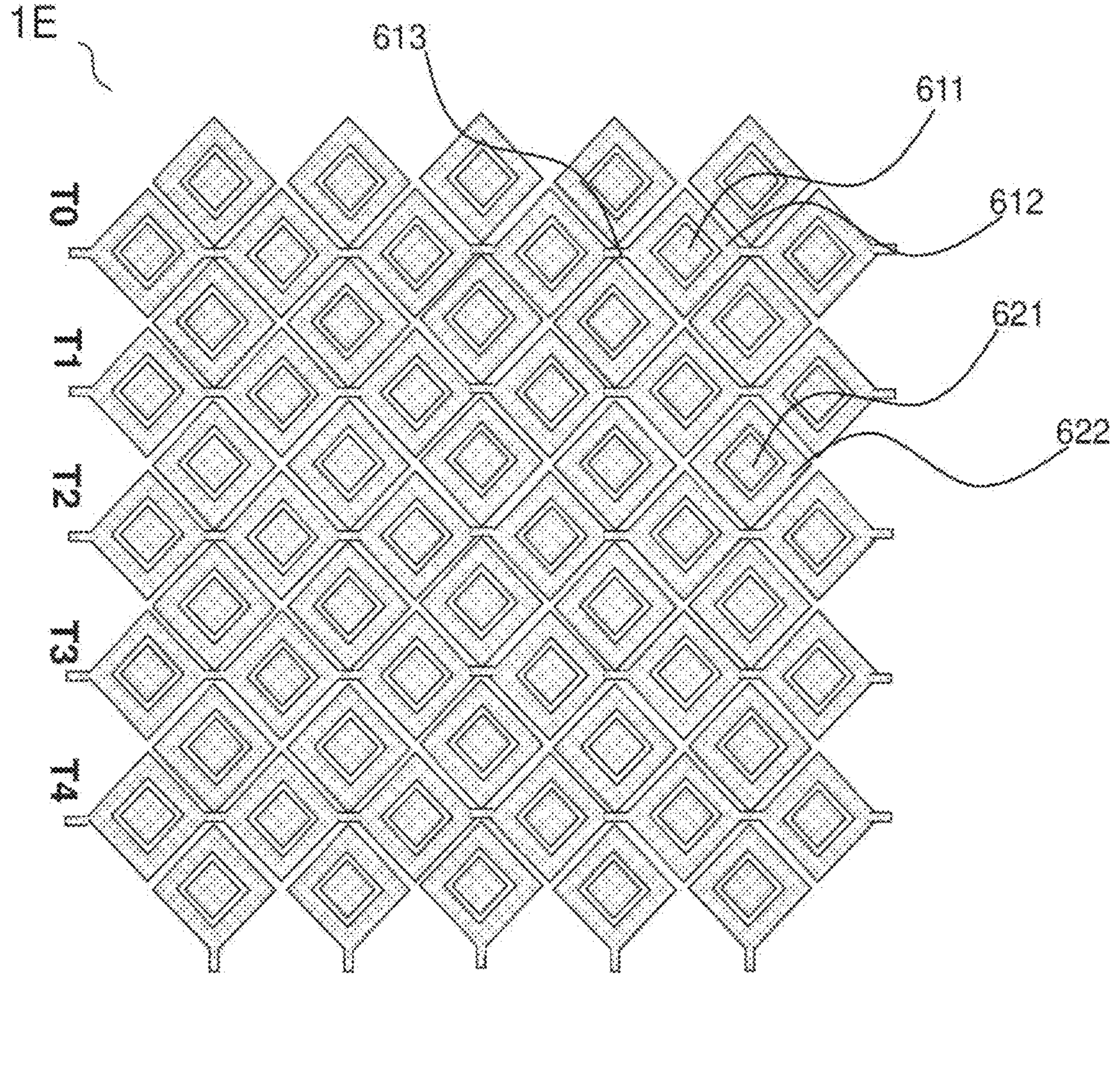
FIG. 25 is a diagram illustrating a configuration of the position detector according to the first to fifth embodiments of the present disclosure including an integrated sensor formed by integrating a TX sensor coil group and an RX sensor coil group with a touch sensor.

FIG. 25 is a diagram illustrating a mesh pattern example of a mesh electrode layer provided to one surface of a transparent substrate.

Mesh patterns forming TX sensor coils T0, . . . T5 are formed in the mesh electrode layer by island portions 611, peripheral portions 612 surrounding the peripheries of the island portions 611, and mesh connecting portions 613 connecting the peripheral portions 612 to each other in a direction in which the transmission coil electrode T0 extends.

Mesh patterns not forming the TX sensor coils T0, . . . T5 are insulated in the mesh electrode layer, are formed by island portions 621 and peripheral portions 622 surrounding the peripheries of the island portions 621, and are connected to each other by jumper wiring to be described later.

Figure 26:
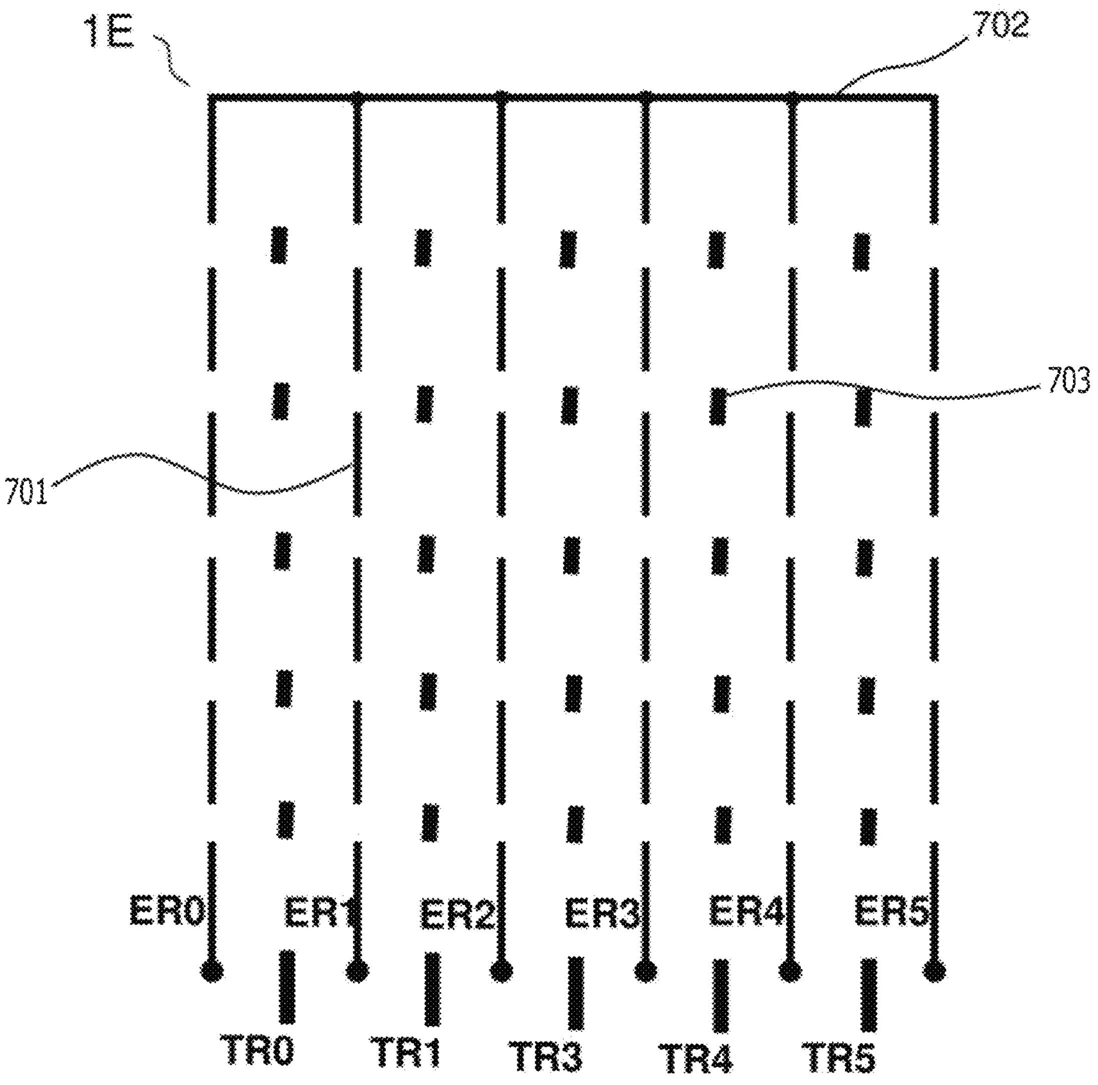
FIG. 26 is a diagram illustrating a configuration of the position detector according to the first to fifth embodiments of the present disclosure including the integrated sensor formed by integrating the TX sensor coil group and the RX sensor coil group with the touch sensor.

FIG. 26 represents a jumper configuration provided on another surface of the transparent substrate.

A jumper 701 is a wiring constituting an RX sensor coil ER1.

A jumper 702 is a jumper wiring that connects the coils of the RX sensor coil group (second sensor coil group) to one another.

A jumper 703 is a jumper for forming a touch electrode TR4 for performing touch detection by capacitance (mutual capacitance system).

Figure 27:
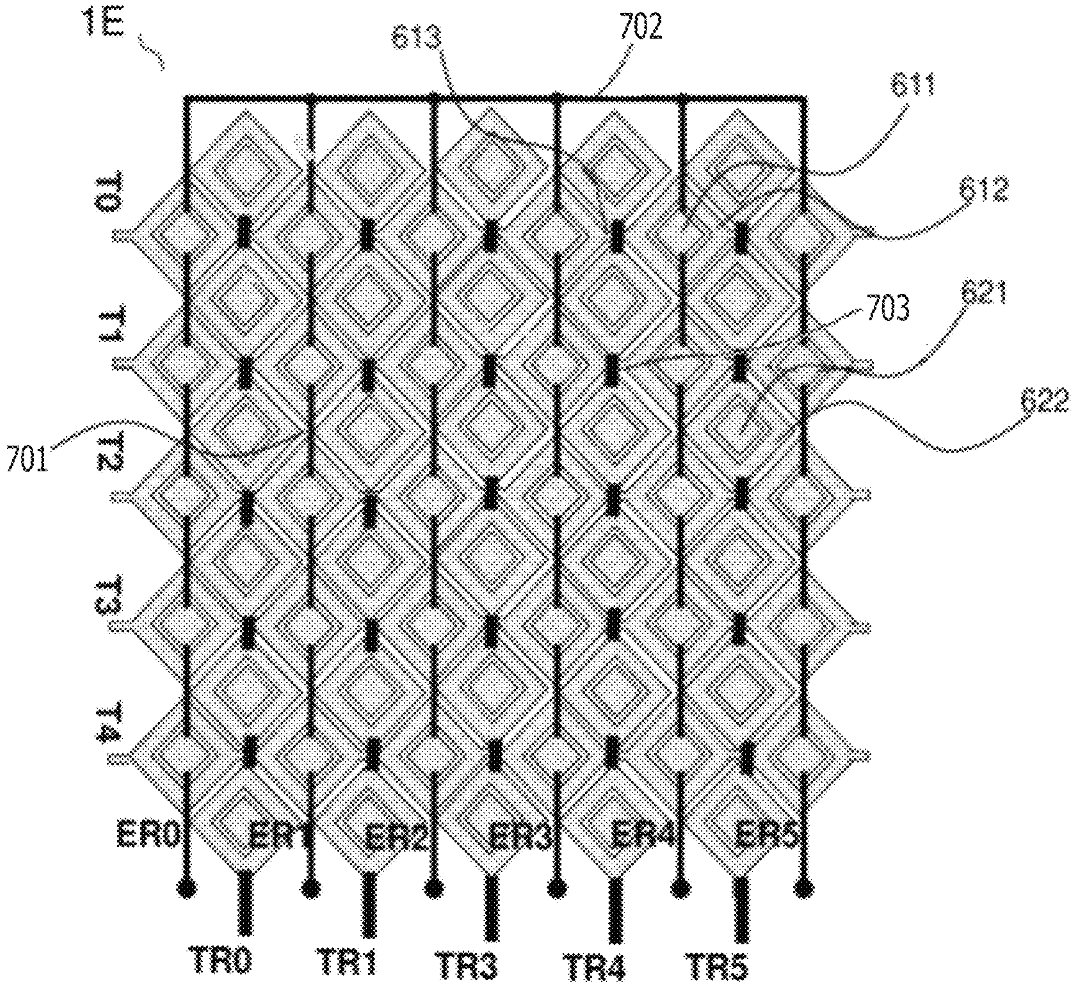
FIG. 27 is a diagram illustrating a configuration of the position detector according to the first to fifth embodiments of the present disclosure including the integrated sensor formed by integrating the TX sensor coil group and the RX sensor coil group with the touch sensor.

FIG. 27 is a diagram of the integrated sensor, in which the mesh electrode layer of FIG. 25 and the jumper wiring of FIG. 26 are superimposed.

The integrated sensor performs (1) a pen detection by an electromagnetic induction system and (2) a finger detection for detecting a finger or the like by a capacitance (mutual capacitance) system.

As for TX (driving), (1) the generation of a transmission magnetic field in the pen detection by the electromagnetic induction system and (2) the generation of a transmission electric field in the finger detection for detecting a finger or the like by a capacitance (mutual capacitance) system are performed by the TX sensor coils T0, . . . T4 commonly used in both systems.

As for RX (detection), (1) RX sensor coils ER0, . . . ER5 constituting the RX sensor coil group (second sensor coil group) 200 are provided for the detection of a pen signal, and (2) touch detection electrodes TR0, . . . TR4 are provided for the detection of a capacitive touch as RX electrodes of the mutual capacitance system, in a manner so as to coexist with the RX sensor coil group (second sensor coil group).

Operation at Time of Pen Detection by Electromagnetic Induction System

Figure 28:
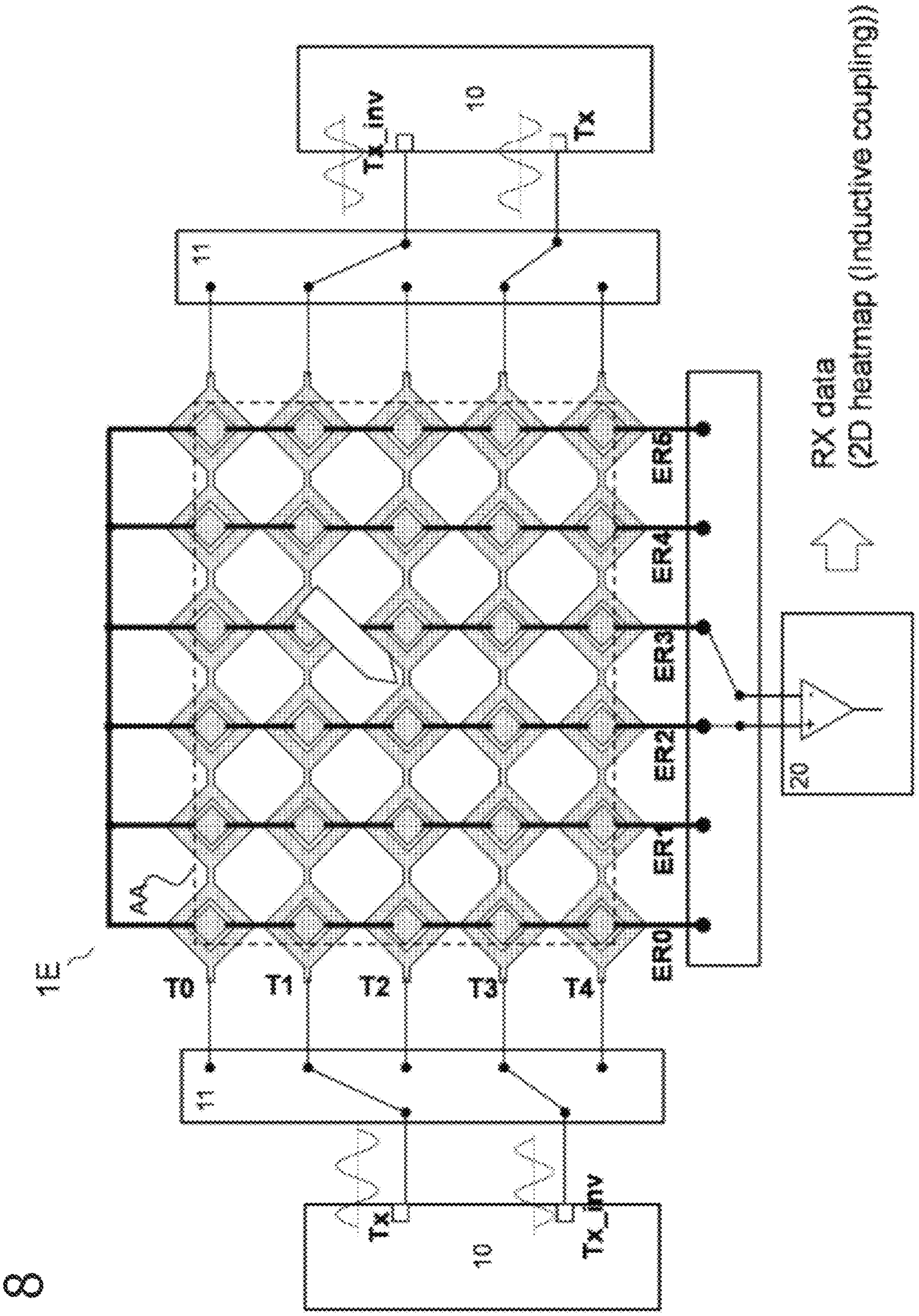
FIG. 28 is a diagram illustrating a configuration of the position detector according to the first to fifth embodiments of the present disclosure including the integrated sensor formed by integrating the TX sensor coil group and the RX sensor coil group with the touch sensor.

FIG. 28 is a diagram illustrating an operation of the position detector 1E in a mode in which the pen detection is performed by the electromagnetic induction system.

First, in a transmission period, a TX circuit 10 located on a left side in the figure

- drives one end of a sensor coil (T1 in the figure), which is selected by the switch 11 among the TX sensor coils T0, . . . T4 of the TX sensor coil group (first sensor coil group) 100, with a positive phase signal via a TX terminal, and
- drives one end of a sensor coil (T3 in the figure), which is selected by the switch 11, with an opposite phase signal that produces a current change in an opposite phase from a current change of the positive phase signal, via a TX_inv terminal, and at the same time, another TX circuit 10 located on a right side in the figure

- drives the other end of the sensor coil (T1 in the figure), which is selected by another switch 11, with an opposite phase signal that produces a current change in an opposite phase from the current change of the positive phase signal, via a TX_inv terminal, and
- drives the other end of the sensor coil (T3 in the figure), which is selected by the switch 11 among the TX sensor coils T0, . . . T4 of the TX sensor coil group (first sensor coil group) 100, with a positive phase signal via a TX terminal.

According to this configuration, a strong transmission magnetic field can be formed in the vicinity of the pen position (in the vicinity of T2 in the figure).

In a detection period after the transmission period, the RX circuit 20 connects the RX sensor coil ER2 and the RX sensor coil ER3, which logically form one loop coil, to both terminals of the differential amplifier circuit via the switch 21, and detects the signal level of the pen signal that passes through this loop coil.

Thereafter, two-dimensional heat map data (RX data) described in FIG. 1 and FIG. 8 is obtained, and the coordinates, inclination, inclination direction, and the like of the pen are derived on the basis of the two-dimensional heat map data.

Figure 29:
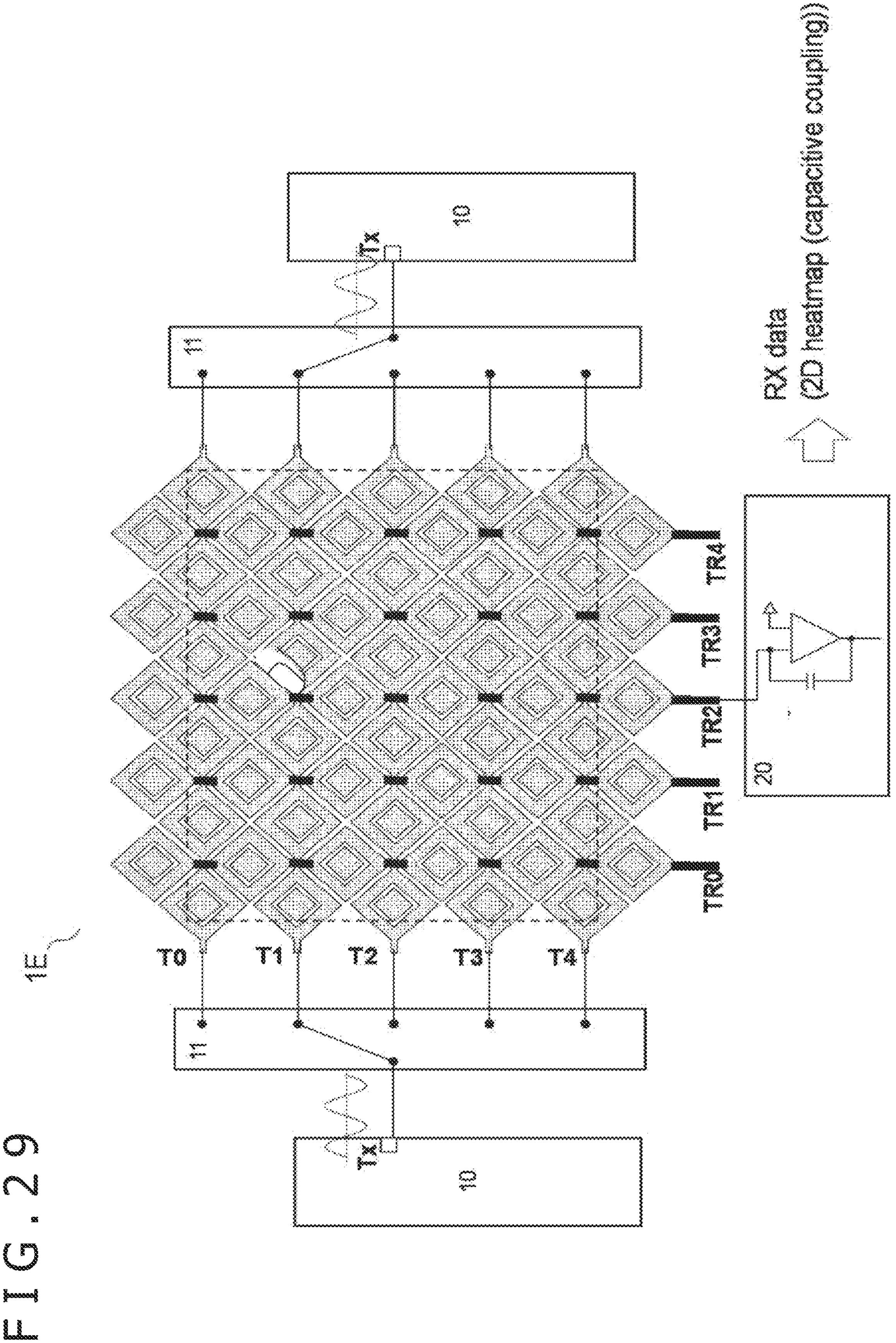
FIG. 29 is a diagram illustrating a configuration of the position detector according to the first to fifth embodiments of the present disclosure including the integrated sensor formed by integrating the TX sensor coil group and the RX sensor coil group with the touch sensor.

Operation at Time of Capacitance (Finger Touch) Detection by Capacitance (Mutual Capacitance) Detection System FIG. 29 is a diagram illustrating an operation of the position detector 1E at a time of capacitance (finger touch) detection by the capacitance (mutual capacitance) detection system.

Also at the time of a capacitance detecting operation, as at the time of the detection by the electromagnetic induction system, the TX sensor coil electrodes T0, . . . T4 constituting the TX sensor coil group (first sensor coil group) 100 are used.

The TX circuit 10 on the left side in the figure drives one end of the TX sensor coil electrode T1 selected by the switch 11 with a positive phase touch signal, and the TX circuit 10 on the right side in the figure drives the other end of the TX sensor coil electrode T1 selected by the switch 11 with a positive phase touch signal. A desired potential (TX signal) can be thereby supplied to the TX sensor coil electrode T1.

The RX circuit 20, using the RX touch electrode TR2 as selected, detects a change in mutual capacitance from a reference value at a cross point (an intersection point between T1 and TR2).

The RX circuit 20 detects a change in capacitance at each cross point to obtain the two-dimensional heat map data, and derives the position of a finger touch based on computation used in the capacitance detection such as center-of-gravity computation.

Thus, according to the position detector 1E using the integrated sensor of FIGS. 25 to 29, the mesh sensor pattern group provided in one metal mesh layer and the jumper wiring connecting these mesh sensor patterns can implement: (1) the generation of a transmission magnetic field to an electromagnetic induction type pen and the detection of a pen signal, and (2) the detection of a finger touch (change in capacitance) based on the capacitance (mutual capacitance) system.

Seventh Embodiment

A position detector 1F according to the present embodiment will be described with reference to FIGS. 1 and 30 to 33B.

Incidentally, the configuration of the position detector 1F is similar to that of the position detector 1B according to the third embodiment or the like, and therefore, detailed description thereof will be omitted.

The position detector 1F according to the present embodiment, which has the same hardware configuration, obtains the level of a pen signal as a response alternating magnetic field from the pen, or a signal level according to capacitive coupling with a finger, and obtains information regarding the position of the pen and information regarding the position of the finger.

The position detector 1F according to the present embodiment includes a first sensor coil group 100 including a plurality of conducting wires having a plurality of electrodes arranged in parallel with each other in a first direction, a second sensor coil group 200 including a plurality of conducting wires having a plurality of electrodes arranged in parallel with each other in a second direction intersecting the first direction, and an alternating magnetic field generating section 111 that generates an alternating magnetic field from the first sensor coil group 100. The position detector 1F includes a signal level obtaining section (RX circuit 20) that obtains, by using the second sensor coil group 200, a level of a pen signal which a position indicator, having stored the alternating magnetic field, generates as a response alternating magnetic field, or a signal level according to capacitive coupling with a finger. The position detector 1F includes an information deriving section (RX circuit 20) that derives information regarding a position of the pen or the finger by using a two-dimensional distribution of the level of the pen signal at each of points of intersection of the plurality of electrodes of the first sensor coil group 100 and the plurality of electrodes of the second sensor coil group 200 or the signal level according to the capacitive coupling with the finger. The position detector 1F includes a control section that makes the alternating magnetic field generating section 111 generate the alternating magnetic field by using the first sensor coil group 100 a predetermined number of times while changing the positions of the alternating magnetic field in the first direction, makes the signal level obtaining section (RX circuit 20) obtain the level of the pen signal which the pen, having stored the alternating magnetic field, generates as the response alternating magnetic field or the signal level according to the capacitive coupling with the finger, for the predetermined number of times, and determines the next order of scanning the predetermined number of times such that one conducting wire corresponding to a highest signal level from the pen or a highest signal level according to the capacitive coupling with the finger, among the plurality of conducting wires arranged in parallel with each other in the first direction in the first sensor coil group 100, is set as a start position.

Figure 32:
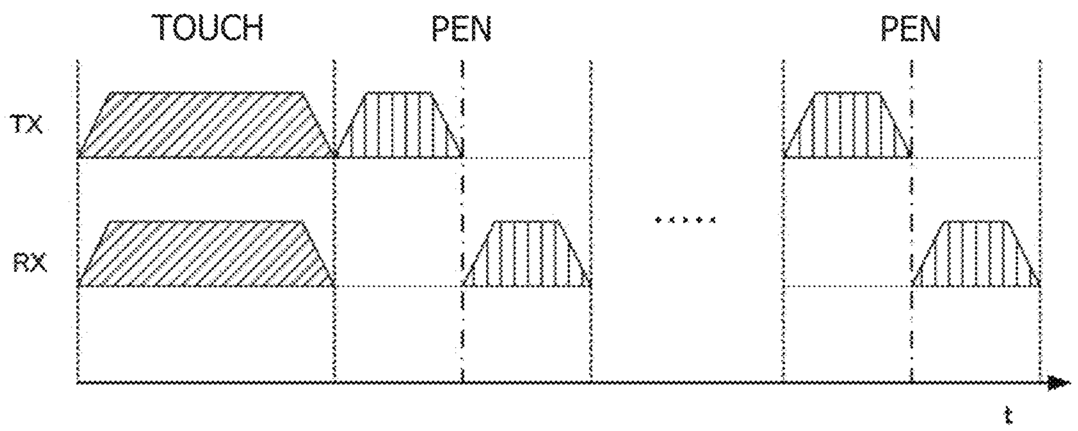
FIG. 32 is a timing diagram of processing to derive the coordinates of a pen or a finger according to the seventh embodiment of the present disclosure.

In addition, in the position detector 1F according to the present embodiment, as illustrated in FIG. 32, processing to derive position information of the pen and the finger is alternately performed. In the processing to derive the position information of the pen, alternating magnetic field generation processing of the alternating magnetic field generating section 111 is performed for a period until predetermined energy is stored in the pen, then is stopped, and thereafter, the signal level obtaining section (RX circuit 20) performs signal level obtainment processing to obtain the response alternating magnetic field generated by the energy stored in the pen. In the processing to derive the position information of the finger, the alternating magnetic field generation processing of the alternating magnetic field generating section 111 and the signal level obtainment processing of the signal level obtaining section (RX circuit 20) are continuously performed during the same period.

In addition, in the position detector 1F according to the present embodiment, in the processing to derive the position information of the finger, the first sensor coil group 100 becomes driving coils to generate the alternating magnetic field for the alternating magnetic field generating section 111, and the second sensor coil group 200 becomes receiving coils to receive a signal according to the capacitive coupling with the finger.

Figure 33A:
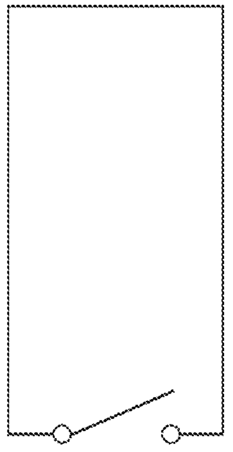
FIGS. 33A and 33B depict diagrams illustrating difference shapes of a sensor coil of a second coil group used in different coordinate derivation processing modes, according to the seventh embodiment of the present disclosure.
Figure 33B:
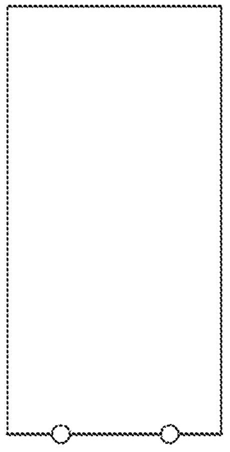

Further, as illustrated in FIGS. 33A and 33B, each sensor coil of the second sensor coil group 200 is formed in a U-shape. In the processing to derive the position information of the pen, the U-shape sensor coil operates as a coil (FIG. 33A). In the processing to derive the position information of the finger, open ends of the U-shape are short-circuited and the sensor coil functions as one receiving electrode (FIG. 33B).

Processing of Position Detector 1F

Figure 30:
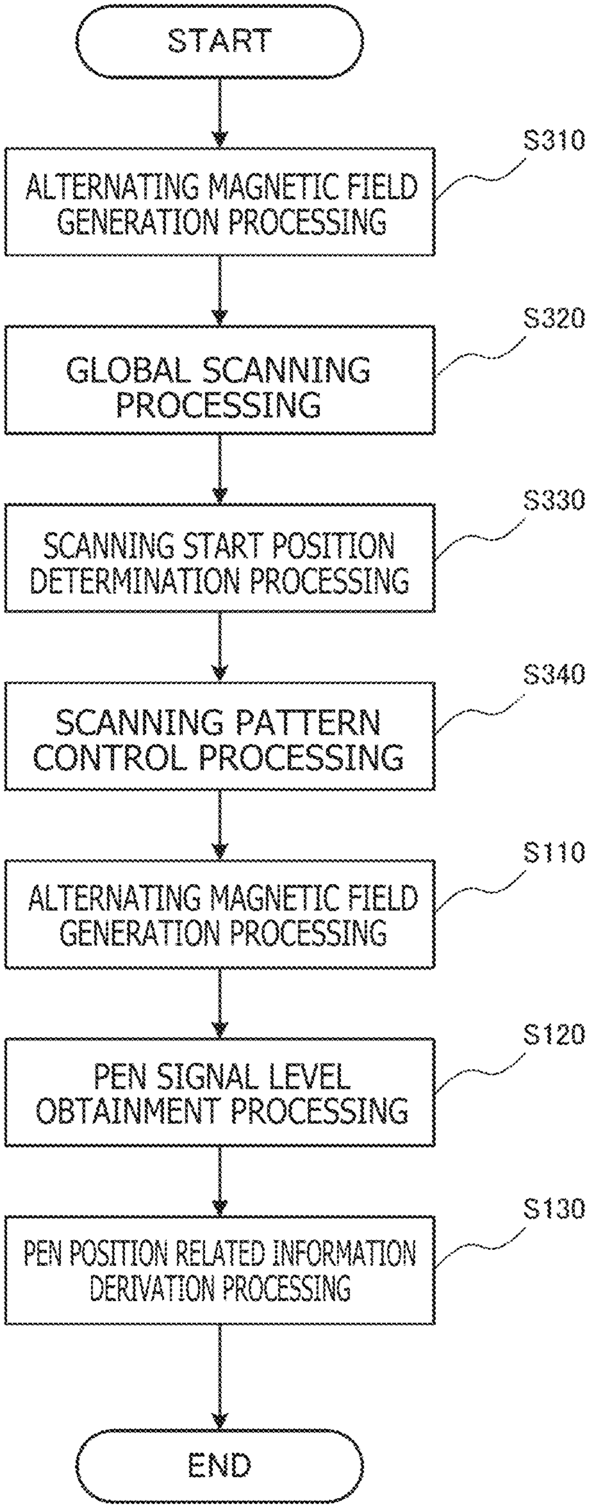
FIG. 30 is a diagram illustrating coordinate derivation processing of a position detector according to a seventh embodiment of the present disclosure.
Figure 31:
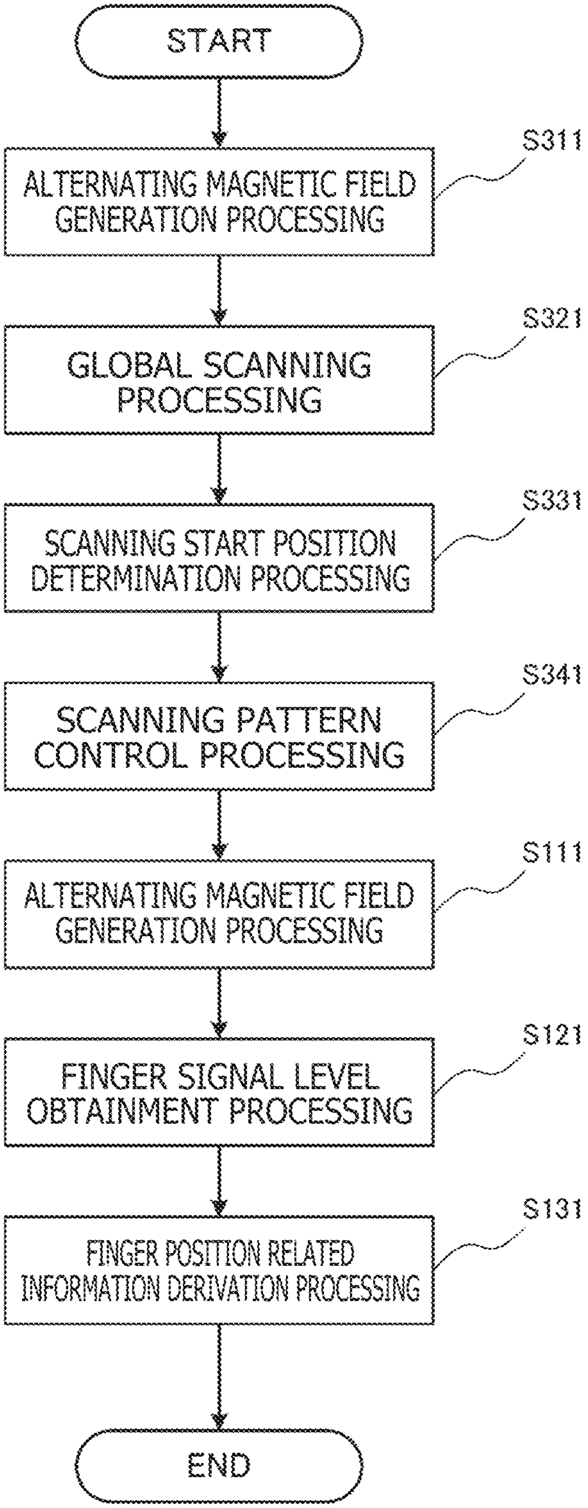
FIG. 31 is a diagram illustrating processing of deriving the coordinates of a finger according to the seventh embodiment of the present disclosure.

Processing of the position detector 1F according to the present embodiment will be described with reference to FIG. 30 and FIG. 31.

Processing in Case of Obtaining Position Information of Pen

Processing in a case of obtaining the position information of a pen in the position detector 1F according to the present embodiment will be described with reference to FIG. 30.

In a period of the processing to derive the position information of a pen, the alternating magnetic field generating section 111 generates the alternating magnetic field by using, for example, the plurality of conducting wires arranged in parallel with each other in the first direction of the sensor (for example, the TX sensor coil group (first sensor coil group) 100) a predetermined number of times while changing the positions of the alternating magnetic field in the first direction (for example, the direction in which the TX sensor coil group (first sensor coil group) 100 are arranged in parallel with each other) (step S310).

The global scanning section 112, for example, obtains the level of the pen signal which the pen, having stored the alternating magnetic field, generates as the response alternating magnetic field, for the predetermined number of times (step S320).

The scanning start position determining section 113 determines on the basis of a detection result of the global scanning section 112 that one conducting wire corresponding to a highest level of the signal from the pen and estimated to be one conducting wire at which the pen is located, among the plurality of conducting wires arranged in parallel with each other in the first direction of the sensor (for example, the TX sensor coil group (first sensor coil group) 100), is set as a start position (step S330).

The scanning pattern control section 114, for example, sets the scanning pattern such that the scanning order is determined so as to select a conducting wire, which is adjacent to a previously scanned conducting wire corresponding to a highest level of the signal from the pen.

In addition, the scanning pattern control section 114, for example, sets the scanning pattern such that the scanning order is determined to select a conducting wire, which is adjacent to a previously scanned conducting wire corresponding to a highest level of the signal from the pen, and to sequentially select conducting wires while skipping the previously scanned conducting wire(s) (step S340).

The position detector 1F selects one TX sensor coil of the TX sensor coil group (first sensor coil group) 100 for generating the transmission magnetic field, through switching by the switch 11 according to a processing result of step S340, and sends out the transmission magnetic field by driving the selected TX sensor coil using the TX circuit 10 (step S110).

After a certain transmission period, that is, after a period in which predetermined energy will be stored in the pen when the pen is present in the vicinity of the TX sensor coil, the position detector 1F obtains the level of the pen signal at the positions of all of the RX sensor coils.

The position detector 1F detects level values (33, 105, 118, 121, and 110 in FIG. 1) of the pen signal in regions in which the TX sensor coil T1 crosses the RX sensor coils R0, R1, R2, . . . R4 (which regions will hereinafter be referred to as coil cross point regions).

The position detector 1F obtains signal levels at respective coil cross points, that is, two-dimensional heat map data RX data by sequentially changing the selection of the TX sensor coil (step S120).

Processing in Case of Obtaining Position Information of Finger

Processing in a case of obtaining the position information of a finger in the position detector 1F according to the present embodiment will be described with reference to FIG. 31.

In a period of the processing to derive the position information of a finger, the alternating magnetic field generating section 111 generates the alternating magnetic field by using, for example, the plurality of conducting wires arranged in parallel with each other in the first direction of the sensor (for example, the TX sensor coil group (first sensor coil group) 100) a predetermined number of times while changing the positions of the alternating magnetic field in the first direction (for example, the direction in which the TX sensor coil group (first sensor coil group) 100 are arranged in parallel with each other) (step S311).

The global scanning section 112, for example, obtains the signal level according to the capacitive coupling with the finger for each of the predetermined number of times (step S321).

The scanning start position determining section 113 determines on the basis of a detection result of the global scanning section 112 that one conducting wire corresponding to a highest signal level according to the capacitive coupling with the finger and estimated to be one conducting wire at which the finger is located, among the plurality of conducting wires arranged in parallel with each other in the first direction of the sensor (for example, the direction in which the TX sensor coil group (first sensor coil group) 100 are arranged in parallel with each other), is set as a start position (step S331).

The scanning pattern control section 114, for example, sets the scanning pattern such that the scanning order is determined to select a conducting wire, which is adjacent to a previously scanned conducting wire corresponding to a highest signal level according to the capacitive coupling with the finger.

In addition, the scanning pattern control section 114, for example, sets the scanning pattern such that the scanning order is determined to select a conducting wire, which is adjacent to a previously scanned conducting wire corresponding to a highest signal level according to the capacitive coupling with the finger, and to sequentially select conducting wires while skipping the previously scanned conducting wire(s) (step S341).

The position detector 1F selects one TX sensor coil of the TX sensor coil group (first sensor coil group) 100 for generating the transmission magnetic field, through switching by the switch 11 according to a processing result of step S341, and sends out the transmission magnetic field by driving the selected TX sensor coil by the TX circuit 10 (step S111).

The position detector 1F obtains the signal level according to the capacitive coupling with the finger at the positions of all of the RX sensor coils within a period of obtaining the position information of the finger.

The position detector 1F detects signal level values (33, 105, 118, 121, and 110 in FIG. 1) according to the capacitive coupling with the finger in regions in which the TX sensor coil T1 crosses the RX sensor coils R0, R1, R2, . . . R4 (which regions will hereinafter be referred to as coil cross point regions).

The position detector 1F obtains signal levels at respective coil cross points, that is, two-dimensional heat map data RX data by sequentially changing the selection of the TX sensor coil (step S121).

Functions and Effects

As described above, the position detector 1F according to the present embodiment includes a first sensor coil group 100 including a plurality of conducting wires having a plurality of electrodes arranged in parallel with each other in a first direction, a second sensor coil group 200 including a plurality of conducting wires having a plurality of electrodes arranged in parallel with each other in a second direction intersecting the first direction, an alternating magnetic field generating section 111 that generates an alternating magnetic field from the first sensor coil group 100, and a signal level obtaining section (RX circuit 20) that obtains, by using the second sensor coil group 200, a level of a pen signal which a position indicator, having stored the alternating magnetic field, generates as a response alternating magnetic field or a signal level according to capacitive coupling with a finger. The position detector 1F includes an information deriving section (RX circuit 20) that derives information regarding a position of the pen or the finger by using a two-dimensional distribution of the level of the pen signal at each of points of intersection of the plurality of electrodes of the first sensor coil group 100 and the plurality of electrodes of the second sensor coil group 200 or the signal level according to the capacitive coupling with the finger. The position detector 1F includes a control section that makes the alternating magnetic field generating section 111 generate the alternating magnetic field by using the first sensor coil group 100 a predetermined number of times while changing the positions of the alternating magnetic field in the first direction, make the signal level obtaining section (RX circuit 20) obtain the level of the pen signal which the pen, having stored the alternating magnetic field, generates as the response alternating magnetic field or the signal level according to the capacitive coupling with the finger, for the predetermined number of times, and determine the next order of scanning the predetermined number of times such that one conducting wire corresponding to a highest signal level from the pen or a highest signal level according to the capacitive coupling with the finger, among the plurality of conducting wires arranged in parallel with each other in the first direction in the first sensor coil group 100, is set as a start position.

That is, the position detector 1F according to the present embodiment performs global scanning, and determines the next order of scanning the predetermined number of times such that one conducting wire corresponding to a highest level of the signal from the pen or a highest signal level according to the capacitive coupling with the finger, among the plurality of conducting wires arranged in parallel with each other in the first direction of the sensor, is set as a start position.

This is based on insight that when obtaining the position information of a pen, a finger, or the like moving at a fast speed, any delay in driving the sensor would cause jitter in the obtained data.

Specifically, it is known that when writing or drawing is performed by the pen at high speed, coordinate accuracy is degraded, and a drawn line becomes wavy, for example.

On the other hand, information that is important in the coordinate calculation is data corresponding to a highest signal strength immediately below the pen or the finger, and data more distant therefrom is less involved in the coordinate calculation.

It is therefore possible to improve the accuracy of deriving the coordinates by determining the next order of scanning the predetermined number of times such that one conducting wire corresponding to a highest level of the signal from the pen or a highest signal level according to the capacitive coupling with the finger, among the plurality of conducting wires arranged in parallel with each other in the first direction of the sensor, is set as a start position.

In addition, after the above-described processing, the plurality of conducting wires arranged in parallel with each other in the first direction of the sensor (for example, the TX sensor coils T0, T1, . . . T4) are used only for the generation of the alternating magnetic field, and the plurality of electrodes arranged in parallel with each other in the second direction intersecting the first direction (for example, the RX sensor coils R0, R1, . . . R4) are used to derive information regarding the position of the pen or the finger by using the two-dimensional distribution of the level of the pen signal or the signal level according to the capacitive coupling with the finger at each of the points of intersection of the plurality of conducting wires arranged in parallel with each other in the first direction of the sensor and the plurality of electrodes arranged in parallel with each other in the second direction intersecting the first direction.

Therefore, by using the two-dimensional distribution of the level of the pen signal or the signal level according to the capacitive coupling with the finger, it is possible to improve the accuracy of deriving the coordinates.

In addition, the same hardware configuration can perform control according to characteristics of obtaining the coordinate information of the pen and the coordinate information of the finger. It is therefore possible to detect highly accurate coordinate information while reducing cost.

In addition, in the position detector 1F according to the present embodiment, processing to derive position information of the pen and the finger is alternately performed. In the processing to derive the position information of the pen, alternating magnetic field generation processing of the alternating magnetic field generating section 111 is performed for a period until predetermined energy is stored in the pen, then is stopped, and thereafter, the signal level obtaining section (RX circuit 20) performs signal level obtainment processing to obtain the response alternating magnetic field generated by the energy stored in the pen. In the processing to derive the position information of the finger, the alternating magnetic field generation processing of the alternating magnetic field generating section 111 and the signal level obtainment processing of the signal level obtaining section (RX circuit 20) are continuously performed in the same period.

That is, as illustrated in FIG. 32, the processing to derive the position information of the pen and the finger is alternately performed. In the processing to derive the position information of the pen, the alternating magnetic field generation processing of the alternating magnetic field generating section 111 is performed for a period until predetermined energy is stored in the pen, then is stopped, and thereafter, the signal level obtaining section (RX circuit 20) performs the signal level obtainment processing to obtain the response alternating magnetic field generated by the energy stored in the pen. In the processing to derive the position information of the finger, the alternating magnetic field generation processing of the alternating magnetic field generating section 111 and the signal level obtainment processing of the signal level obtaining section (RX circuit 20) are continuously performed in the same period.

The same hardware configuration can perform control according to characteristics of obtaining the coordinate information of the pen and the finger. It is therefore possible to detect highly accurate coordinate information while reducing cost.

In addition, in the position detector 1F according to the present embodiment, in the processing to derive the position information of the finger, the first sensor coil group 100 becomes driving coils to generate the alternating magnetic field for the alternating magnetic field generating section 111, and the second sensor coil group 200 becomes receiving coils to receive a signal according to the capacitive coupling with the finger.

That is, even though the hardware configuration is the same, appropriate control can be performed according to a detection target. It is therefore possible to detect highly accurate coordinate information while reducing cost.

In the position detector 1F according to the present embodiment, each sensor coil of the second sensor coil group 200 is formed in a U-shape. In the processing to derive the position information of the pen, the U-shape sensor coil operates as a coil (FIG. 33A), and in the processing to derive the position information of the finger, open ends of the U-shape are short-circuited and the sensor coil functions as one receiving electrode (FIG. 33B).

That is, in detecting the position information of the finger, when the shape of a coil is a U-shape, the total length of the conducting wire forming the U-shape coil is lengthened, and detection sensitivity decreases due to a resulting capacitance.

However, in the position detector 1F according to the present embodiment, open ends of the U-shape are short-circuited to function as one receiving electrode. Thus, a decrease in the detection sensitivity does not occur.

It is therefore possible to detect highly accurate coordinate information while reducing cost.

Incidentally, the position detectors 1 and 1A to 1E according to the present disclosure can be realized by recording the processing of the TX circuits 10, 10A, 10B, 10C, and 10D on a recording medium readable by a computer system, and making the TX circuits 10 and 10A to 10E read and execute a program recorded on the recording medium. The computer system includes an OS and hardware such as a peripheral device.

In addition, the "computer system" includes a homepage providing environment (or a display environment) in a case of using a World Wide Web (WWW) system. In addition, the above-described program may be transmitted from the computer system in which the program is stored in a storage device or the like to another computer system via a transmission medium or by a transmitted wave in the transmission medium. Here, the "transmission medium" through which the program is transmitted refers to a medium having a function of transmitting information, such as a network (communication network) such as the Internet and a communication circuit (communication line) such as a telephone circuit.

In addition, the above-described program may be one for implementing a part of the functions described earlier. Further, the above-described program may be what is called a differential file (differential program) that can implement the functions described earlier in combination with a program already recorded in the computer system.

The embodiments of the present disclosure have been described above in detail with reference to the drawings. However, specific configurations are not limited to the embodiments, and include design modifications and the like within the scope of the present disclosure.

Implementation 1

A position detector including:

one or a plurality of processors;

one or a plurality of memories communicatably connected to the one or plurality of processors;

a first sensor coil group including a plurality of conducting wires having a plurality of electrodes arranged in parallel with each other in a first direction; and a second sensor coil group including a plurality of conducting wires having a plurality of electrodes arranged in parallel with each other in a second direction intersecting the first direction, the one or plurality of processors including an alternating magnetic field generating section that generates an alternating magnetic field from the first sensor coil group, a pen signal level obtaining section that obtains, by using the second sensor coil group, a level of a pen signal which a position indicator, having stored the alternating magnetic field, generates as a response alternating magnetic field, and an information deriving section that derives information regarding a position of the position indicator by using a two-dimensional distribution of the level of the pen signal at each of points of intersection of the plurality of conducting wires of the first sensor coil group and the plurality of electrodes of the second sensor coil group.

Implementation 2

A position detector including:

one or a plurality of processors;

one or a plurality of memories communicatably connected to the one or plurality of processors;

a first sensor coil group including a plurality of conducting wires having a plurality of electrodes arranged in parallel with each other in a first direction; and a second sensor coil group including a plurality of conducting wires having a plurality of electrodes arranged in parallel with each other in a second direction intersecting the first direction, the one or plurality of processors including an alternating magnetic field generating section that generates an alternating magnetic field from the first sensor coil group, a pen signal level obtaining section that obtains, by using the second sensor coil group, a level of a pen signal which a position indicator, having stored the alternating magnetic field, generates as a response alternating magnetic field, an information deriving section that derives information regarding a position of the position indicator by using a two-dimensional distribution of the level of the pen signal at each of points of intersection of the plurality of conducting wires of the first sensor coil group and the plurality of electrodes of the second sensor coil group, and a control section that controls operation by making the alternating magnetic field generating section generate the alternating magnetic field by using the first sensor coil group a predetermined number of times while changing the positions of the alternating magnetic field in the first direction, making the pen signal level obtaining section obtain the level of the pen signal which the pen, having stored the alternating magnetic field, generates as the response alternating magnetic field or a signal level according to capacitive coupling with a finger, for the predetermined number of times, and determining the next order of scanning the predetermined number of times such that one conducting wire corresponding to a highest signal level from the pen or a highest signal level according to the capacitive coupling with the finger, among the plurality of conducting wires arranged in parallel with each other in the first direction in the first sensor coil group, is set as a start position.

The invention claimed is:

1. A position detecting method in a position detector, the position detector including a first sensor coil group including a plurality of conducting wires having a plurality of electrodes arranged in parallel with each other in a first direction and a second sensor coil group including a plurality of conducting wires having a plurality of electrodes arranged in parallel with each other in a second direction intersecting the first direction, the position detecting method comprising:

a first step of the position detector generating an alternating magnetic field from the first sensor coil group;

a second step of the position detector obtaining a level of a pen signal which a pen, having stored the alternating magnetic field, generates as a response alternating magnetic field, by using at least the second sensor coil group;

a third step of the position detector deriving information regarding a position of the pen by using a two-dimensional distribution of the level of the pen signal at each of points of intersection of the plurality of electrodes of the first sensor coil group and the plurality of electrodes of the second sensor coil group;

a fourth step of the position detector obtaining a first reference position, which corresponds to a first peak in the two-dimensional distribution and which is a position indicated by a pen tip of the pen;

a fifth step of the position detector obtaining an upwardly displaced or downwardly displaced second reference position, which corresponds to a second peak in the two-dimensional distribution, the second peak being different from the first peak and having the same sign as the second peak; and a sixth step of the position detector deriving, on a basis of a direction of the second reference position with respect to the first reference position, a direction of an inclination of the pen on the sensor plane, which is an angle on the sensor plane formed by a projection of the pen on the sensor plane.

2. The position detecting method according to claim 1, wherein the third step includes a seventh step of the position detector deriving the an inclination of the pen with respect to a normal to the sensor plane on a basis of a level strength of the pen signal at the first reference position and a level strength of the pen signal at the second reference position.

3. The position detecting method according to claim 1, wherein the first step includes an eighth step of the position detector generating the alternating magnetic field by using the first sensor coil group a predetermined number of times while changing positions of the alternating magnetic field in the first direction, and a ninth step of the position detector obtaining the level of the pen signal which the pen, having stored the alternating magnetic field, generates as the response alternating magnetic field, for the predetermined number of times, and determining the next order of scanning the predetermined number of times such that one conducting wire corresponding to a highest level of the signal from the pen, among the plurality of conducting wires arranged in parallel with each other in the first direction in the first sensor coil group, is set as a start position.

* * * * *